(12) United States Patent
Furukawa et al.

(10) Patent No.: US 10,378,406 B2
(45) Date of Patent: Aug. 13, 2019

(54) EXHAUST EMISSION CONTROL SYSTEM AND PURIFICATION CONTROL DEVICE

(71) Applicant: DENSO CORPORATION, Kariya, Aichi-pref. (JP)

(72) Inventors: Kengo Furukawa, Kariya (JP); Yusuke Hongo, Kariya (JP); Jun Osaka, Kariya (JP); Yoshiho Uchiyama, Kariya (JP); Takamasa Itou, Kariya (JP); Wakichi Kondoh, Kariya (JP); Masaki Takeyama, Kariya (JP); Kohei Motoo, Kariya (JP)

(73) Assignee: DENSO CORPORATION, Kariya (JP)

( * ) Notice: Subject to any disclaimer, the term of this patent is extended or adjusted under 35 U.S.C. 154(b) by 173 days.

(21) Appl. No.: 15/150,911

(22) Filed: May 10, 2016

(65) Prior Publication Data

US 2016/0333763 A1 Nov. 17, 2016

(30) Foreign Application Priority Data

May 12, 2015 (JP) .................................. 2015-97054
Oct. 6, 2015 (JP) ................................ 2015-198600
Nov. 3, 2015 (JP) ................................ 2015-216222

(51) Int. Cl.
*F01N 3/20* (2006.01)

(52) U.S. Cl.
CPC ........ *F01N 3/2066* (2013.01); *F01N 2240/20* (2013.01); *F01N 2610/02* (2013.01); *F01N 2610/03* (2013.01); *F01N 2610/1453* (2013.01); *Y02T 10/24* (2013.01)

(58) Field of Classification Search
CPC ............. F01N 2610/02; F01N 2610/03; F01N 2610/1453; F01N 3/2066; F01N 2240/20; Y02T 10/24
See application file for complete search history.

(56) References Cited

U.S. PATENT DOCUMENTS

| 2003/0070419 | A1 | 4/2003 | Kako et al. |
| 2009/0158717 | A1 | 6/2009 | Kimura et al. |
| 2010/0242459 | A1 | 9/2010 | Tsujimoto et al. |
| 2011/0047984 | A1 | 3/2011 | Lee et al. |

(Continued)

FOREIGN PATENT DOCUMENTS

| EP | 1 256 700 | 11/2002 |
| JP | 50-078714 | 6/1975 |

(Continued)

*Primary Examiner* — Thai Ba Trieu
*Assistant Examiner* — Diem T Tran
(74) *Attorney, Agent, or Firm* — Nixon & Vanderhye P.C.

(57) ABSTRACT

An exhaust emission control apparatus is provided with a supply device, a catalyst, and a gas pressure reduction part. The supply device supplies a reducing agent to an exhaust passage. The catalyst purifies an exhaust gas by the use of the reducing agent. The gas pressure reduction part can make a gas pressure near the supply port lower than the gas pressure on the inside of a supply device body. A NOx catalyst adsorbs nitrogen oxide contained in the exhaust. NOx adsorbed by the NOx catalyst is desorbed from the NOx catalyst when the exhaust gas is purified. An ECU estimates an adsorption amount of NOx. Then, the ECU estimates a desorption amount of NOx desorbed from the NOx catalyst on the basis of the estimated adsorption amount of NOx.

12 Claims, 43 Drawing Sheets

(56) References Cited

U.S. PATENT DOCUMENTS

2011/0107749 A1 5/2011 Tsujimoto et al.
2014/0369890 A1 12/2014 Hirabayashi et al.

FOREIGN PATENT DOCUMENTS

| JP | 59-126016 | | 7/1984 |
|---|---|---|---|
| JP | 2001-059413 | | 3/2001 |
| JP | 2003129829 | * | 5/2003 |
| JP | 2004-284891 | | 10/2004 |
| JP | 2005-126260 | | 5/2005 |
| JP | 2007-064073 | | 3/2007 |
| JP | 2009-115057 | | 5/2009 |
| JP | 2011-106412 | | 6/2011 |
| JP | 2013-124569 | | 6/2013 |

* cited by examiner

EXHAUST EMISSION CONTROL SYSTEM AND PURIFICATION CONTROL DEVICE

CROSS REFERENCE TO RELATED APPLICATION

This application is based on Japanese Patent Applications No. 2015-97054 filed on May 12, 2015, No. 2015-198600 filed on Oct. 6, 2015 and No. 2015-216222 filed on Nov. 3, 2015, the disclosures of which are incorporated herein by reference.

TECHNICAL FIELD

The present disclosure relates to an exhaust emission control system that purifies nitrogen oxide contained in an exhaust gas emitted from an engine and a purification control device applied to the exhaust emission control system.

BACKGROUND

An exhaust emission control apparatus that purifies an exhaust gas of an internal combustion engine has been known conventionally.

An exhaust emission control apparatus described in a patent document 1 is provided with a supply device (fuel reformation device) that supplies an exhaust passage of an internal combustion engine with a reducing agent and a catalyst (selective reduction type catalyst) that is provided on a downstream side of the supply device in the exhaust passage. The supply device provided by the exhaust emission control apparatus supplies the exhaust passage with gas containing hydrogen, which is generated by reforming fuel, as a reducing agent. When the exhaust gas and the reducing agent, which flow in the exhaust passage, flow into the catalyst, NOx contained in the exhaust gas is reduced to $N_2$.

The supply device provided by the exhaust emission control apparatus described in the patent document 1 supplies the reducing agent to the exhaust passage by the use of the pressure of air introduced into the supply device from an air tank or a compressor. For this reason, when the driving condition of the internal combustion engine is brought into a high load and a gas pressure of the exhaust passage positioned on an upstream side of the catalyst is increased, an amount of the reducing agent supplied to the exhaust passage from the supply device is liable to be decreased by an increase in an energy consumption of the air tank or by an output limit of the air tank or the compressor.

Further, in the exhaust emission control apparatus described in the patent document 1, in the case where the amount of the reducing agent supplied to the exhaust passage from the supply device is increased, there is apprehension that the size of the air tank or the compressor is increased or that a power consumption of the compressor is increased.

In a patent document 2 is disclosed an exhaust emission control system of an internal combustion engine that desorbs nitrogen oxide adsorbed by a catalyst and that purifies an exhaust gas by the use of a reducing agent. In this exhaust emission control system, a desorption amount of the nitrogen oxide desorbed from the catalyst is estimated on the basis of a catalyst temperature, an adsorption amount of the nitrogen oxide, and a flow rate of passing gas passing through the catalyst.

In addition, in this exhaust emission control system, a data table is used for estimating the desorption amount of the nitrogen oxide. The exhaust emission control system can estimate a unique desorption amount of the nitrogen oxide for the catalyst temperature, the adsorption amount of the nitrogen oxide, and the flow rate of the passing gas passing through the catalyst, which are described above, on the basis of the data table.

In general, a catalyst used for the exhaust emission control system includes a catalyst having a plurality of adsorption states. In this catalyst, a desorption characteristic of the nitrogen oxide is different depending on the adsorption state. The inventor focuses on a difference in the desorption characteristic of the nitrogen oxide which varies according to the adsorption state of the catalyst.

The patent document 2 does not focus on the adsorption state of the nitrogen oxide in the catalyst, and the desorption amount estimated by the use of the data table does not reflect the adsorption state of the nitrogen oxide in the catalyst. For this reason, in an exhaust emission control system provided with a catalyst having a plurality of adsorption states, if the desorption amount is estimated by a method disclosed in the patent document 2, there is apprehension that an estimated desorption amount is a value deviated from an actual adsorption amount.

In a patent document 3 is disclosed an exhaust emission control apparatus that uses fuel as a reducing agent and that purifies nitrogen oxide contained in the exhaust gas by a catalyst. When this catalyst is continuously used, the catalyst is degraded. Hence, the exhaust emission control apparatus disclosed in the patent document 3 determines a degree of progress of degradation of the whole catalyst by sensing the temperature of the catalyst and corrects a supply amount of the fuel supplied to the catalyst as the reducing agent.

The inventors have focused on a fact that a catalyst continuously used has both of a portion in which degradation progresses and a portion in which degradation little progresses. As the result, the inventors have found a problem that in the exhaust emission control apparatus of the patent document 3, a decrease in performance of the catalyst caused by the degradation becomes noticeable more than necessary. Describing in detail, in the exhaust emission control apparatus of the patent document 3, the degradation of the catalyst is determined by considering the whole catalyst as one catalyst and the supply amount of the fuel that is the reducing agent is adjusted. For this reason, even if a portion in which degradation little progresses remains in the catalyst, the portion in which degradation little progresses cannot sufficiently perform an operation to purify the nitrogen oxide in the exhaust gas. As the result, the decrease in performance of the catalyst caused by the degradation becomes noticeable.

[Patent document 1] JP 2014-122550 A
[Patent document 2] JP 2002-332835 A
[Patent document 3] JP 2001-59413 A

SUMMARY

An object of the present disclosure is to provide an exhaust emission control apparatus that can increase a supply amount of a reducing agent supplied to an exhaust passage.

Another object of the present disclosure is to provide an exhaust emission control system that can estimate a desorption amount of nitrogen oxide with high accuracy and a purification control device applied to the exhaust emission control system.

Still another object of the present disclosure is to provide an exhaust emission control system that can restrain a performance of a catalyst from being decreased by the degradation of the catalyst and a purification control device applied to the exhaust emission control system.

An exhaust emission control apparatus of the present disclosure includes a supply device, a catalyst, and a gas pressure reduction part. The supply device has a supply device body in which a reducing agent flows and a supply port that supplies the reducing agent to an exhaust passage from the supply device body. The catalyst is provided on a downstream side of the supply device in the exhaust passage and purifies an exhaust emission by the use of the reducing agent. The gas pressure reduction part can change a speed of the exhaust gas flowing in the exhaust passage, thereby being able to reduce a gas pressure near the supply port as compared with the gas pressure on the inside of the supply device body.

In this way, the reducing agent can be sucked out to the exhaust passage through the supply port from the supply device body. For this reason, the exhaust emission control apparatus can increase a supply amount of the reducing agent.

An exhaust emission control system of the present disclosure includes: a catalyst that adsorbs nitrogen oxide contained in an exhaust gas emitted from an engine in a plurality of adsorption states and that desorbs the adsorbed nitrogen oxide when purifying the adsorbed nitrogen oxide; an adsorption amount estimation part that estimates an adsorption amount of the nitrogen oxide adsorbed by the catalyst by a method corresponding to the respective adsorption states; and a desorption amount estimation part that estimates a desorption amount of the nitrogen oxide desorbed from the catalyst on the basis of an estimated value of the adsorption amount estimated by the adsorption amount estimation part.

Even if the catalyst has the plurality of adsorption states, the adsorption amount estimation part estimates the adsorption amount of the nitrogen oxide by the method corresponding to the respective adsorption states of the catalyst. The desorption amount of the nitrogen oxide estimated by the desorption amount estimation part on the basis of the estimated value of the adsorption amount estimated by the adsorption amount estimation part in this way can be a value reflecting the actual adsorption state of the catalyst. Hence, the exhaust emission control system capable of estimating the desorption amount of the nitrogen oxide with high accuracy can be realized.

Further, a purification control device of the present disclosure is a purification control device applied to an exhaust emission control system including a catalyst that adsorbs nitrogen oxide contained in an exhaust gas emitted from an engine in a plurality of adsorption states and that desorbs the adsorbed nitrogen oxide when purifying the adsorbed nitrogen oxide. The purification control device includes: an adsorption amount estimation part that estimates an adsorption amount of the nitrogen oxide adsorbed by the catalyst by a method corresponding to the respective adsorption states; and a desorption amount estimation part that estimates a desorption amount of the nitrogen oxide desorbed from the catalyst on the basis of an estimated value of the adsorption amount of the nitrogen oxide estimated by the adsorption amount estimation part.

The actual adsorption states of the catalyst are reflected on the estimation of the adsorption amount of the nitrogen oxide, the desorption amount of the nitrogen oxide can be estimated with high accuracy.

An exhaust emission control system of the present disclosure includes: a fuel reformation device that generates a reducing agent to reduce nitrogen oxide contained in an exhaust gas emitted from an engine by reforming fuel used for the engine; a catalyst that purifies the nitrogen oxide in the exhaust gas by the use of the reducing agent supplied by the fuel reformation device; a plurality of degradation sensing parts that are arranged in the catalyst along a flow direction of the exhaust gas and that sense a physical quantity relating to degradation of the catalyst; a degradation estimation part that produces a degradation distribution of the catalyst in the flow direction on the basis of sensed values of the plurality of degradation sensing parts and that estimates a portion which is little degraded of the catalyst from the degradation distribution; and a reformation control part that controls a reformation of the fuel by the fuel reformation device in such a way that the reducing agent reaches the portion which is estimated to be little degraded by the degradation estimation part, in an active state.

The reducing agent to reduce the nitrogen oxide contained in the exhaust gas is generated by reforming the fuel by the fuel reformation device. Hence, it is possible to control a level of activity of the reducing agent supplied from the fuel reformation device. Further, the degradation estimation part produces the degradation distribution of the catalyst on the basis of the sensed values of the plurality of degradation sensing parts that are arranged along the flow direction of the exhaust gas and estimates the portion which is little degraded of the catalyst from the degradation distribution. If the fuel reformation device is controlled in such a way that the reducing agent in an active state reaches the portion which is little degraded of the catalyst, the portion which is little degraded of the catalyst can sufficiently exert an operation of purifying the nitrogen oxide in the exhaust gas by referentially using the activated reducing agent. As the result, it is possible to realize the exhaust emission control system that can restrain the performance of the catalyst from being decreased by the degradation of the catalyst.

A purification control device of the present disclosure is a purification control device applied to an exhaust emission control system including: a fuel reformation device that generates a reducing agent to reduce nitrogen oxide contained in an exhaust gas emitted from an engine by reforming fuel used for the engine; a catalyst that purifies the nitrogen oxide in the exhaust gas by the use of the reducing agent supplied by the fuel reformation device; and a plurality of degradation sensing parts that are arranged in the catalyst along a flow direction of the exhaust gas and that sense a physical quantity relating to degradation of the catalyst. The purification control device includes: an information acquisition part that acquires sensed values of the physical quantity from the plurality of degradation sensing parts; a degradation estimation part that produces a degradation distribution of the catalyst in the flow direction on the basis of the sensed values of the plurality of degradation sensing parts, which are acquired by the information acquisition part, and that estimates a portion which is little degraded of the catalyst from the degradation distribution; and a reformation control part that controls a reformation of the fuel by the fuel reformation device in such a way that the reducing agent reaches a portion, which is estimated to be little degraded by the degradation estimation part, in an active state.

The portion which is little degraded of the catalyst can sufficiently purify the nitrogen oxide by preferentially using the activated reducing agent, so that the performance of the catalyst can be restrained from being decreased by the degradation of the catalyst.

DETAILED DESCRIPTION

Hereinafter, an exhaust emission control apparatus according to a plurality of embodiments of the present disclosure will be described on the basis of the drawings. In this regard, the actually same configurations in the plurality of embodiments will be denoted by the same reference symbols and their descriptions will be omitted.

First Embodiment

Figure 1:
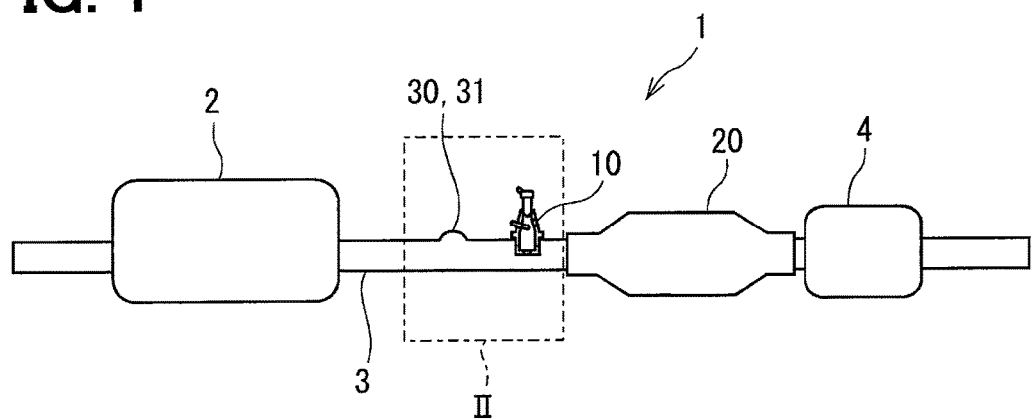
FIG. 1 is a configuration of an exhaust emission control apparatus according to a first embodiment of the present disclosure.
Figure 2:
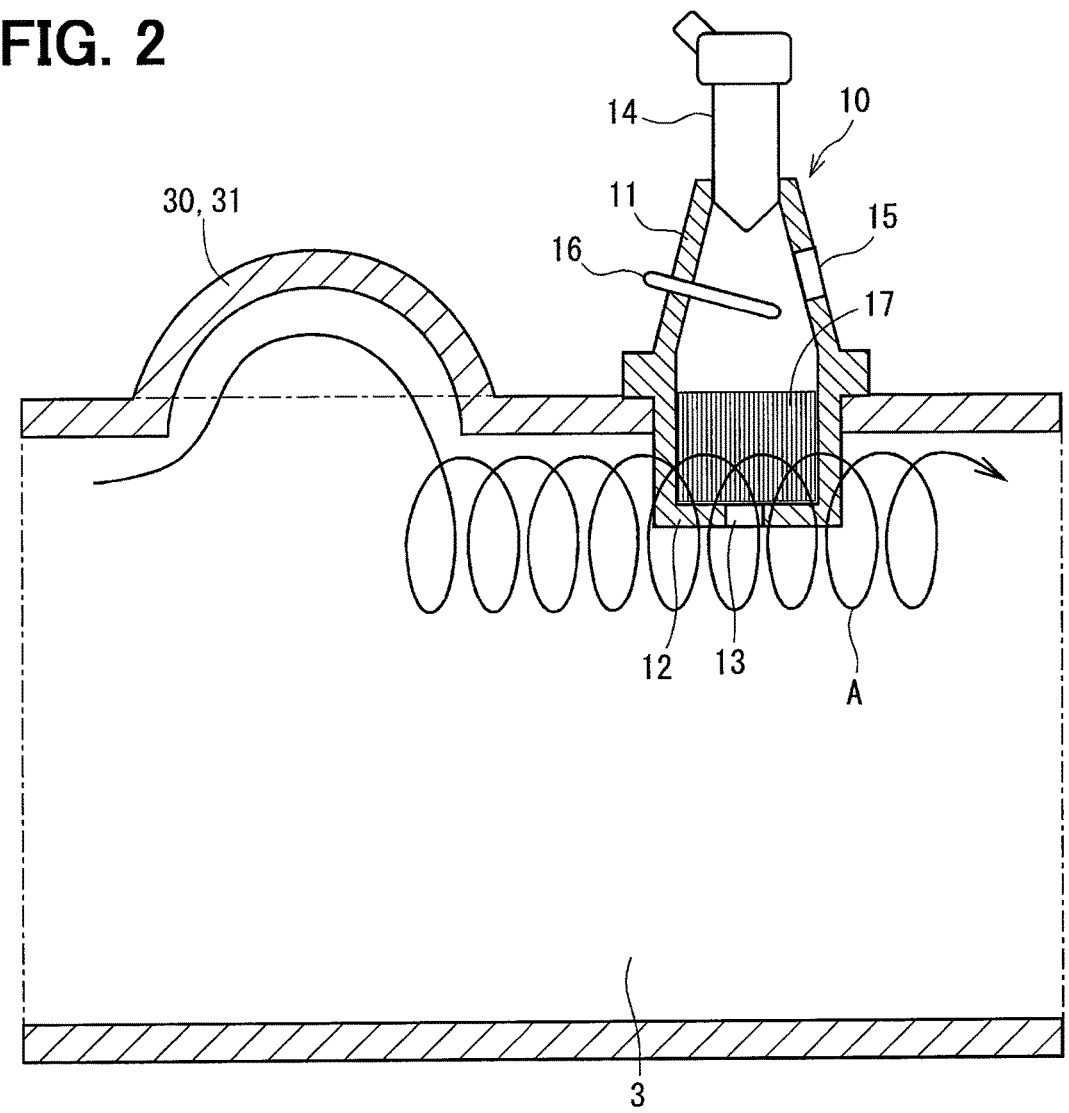
FIG. 2 is a section view of a portion II shown in FIG. 1.
Figure 3:
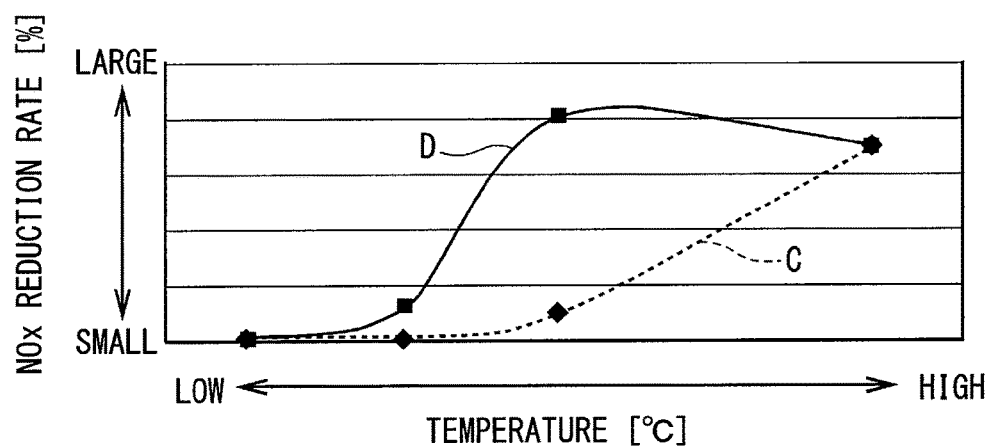
FIG. 3 is a graph to show a NOx reduction rate by the presence or absence of a reducing agent.

A first embodiment of the present disclosure will be shown in FIG. 1 to FIG. 3. An exhaust emission control apparatus 1 according to the present embodiment is provided in an exhaust passage 3 of an internal combustion engine 2 and purifies an exhaust gas emitted from the internal combustion engine 2.

The exhaust emission control apparatus 1 is provided with a supply device 10 to supply a reducing agent to the exhaust passage 3, a catalyst 20 provided on a downstream side of the supply device 10 in the exhaust passage 3, and a gas pressure reduction part 30.

As shown in FIG. 2, the supply device 10 includes a supply device body 11, a protruding part 12, a supply port 13, a fuel addition valve 14, a gas introduction port 15, a heater 16, and a reforming catalyst 17.

The supply device body 11 has a space, in which fuel and a reformed gas produced by reforming the fuel flow, formed on the inside thereof.

The protruding part 12 is a part protruding to the exhaust passage 3 from the supply device body 11. This protruding part 12 has the supply port 13 formed on the center side of the exhaust passage 3. In this regard, the supply port 13 may be provided on the downstream side of the exhaust passage 3 in the protruding part 12.

The fuel addition valve 14 injects and supplies the fuel to the space on the inside of the supply device body 11. The gas introduction port 15 is coupled to an air tank, a compressor, an intake passage, which are not shown in the drawing, or the exhaust passage 3, and introduces air or the exhaust gas into the space on the inside of the supply device body 11.

The heater 16 heats the fuel on the inside of the supply device body 11 to, for example, 400 to 600° C. The reforming catalyst 17 oxidizes the fuel to reform the fuel to a reformed gas containing aldehyde and the like. This reformed gas functions as a reducing agent when the exhaust gas flowing in the exhaust passage 3 is purified.

As shown in FIG. 1, the catalyst 20 is provided on the downstream side of the supply device 10 in the exhaust passage 3. A NOx occlusion reduction catalyst is shown as an example of the catalyst 20. The catalyst 20 oxidizes NOx contained in the exhaust gas to $NO_2$ and occludes $NO_2$ as nitrate ($NO_3^-$) and reduces the nitrate to $N_2$ by the reducing agent described above. In this way, the NOx contained in the exhaust gas is purified to $N_2$, $CO_2$, and $H_2O$ and is emitted to the atmosphere.

In this regard, the catalyst 20 is not limited to the catalyst described here but various kinds of NOx purification catalysts made of metal or non-metal can be employed as the catalyst 20.

The catalyst 20 of the first embodiment is provided on an upstream side of a turbine 4 that constructs a turbocharger provided in the exhaust passage 3. For this reason, the high-temperature exhaust gas emitted from the internal combustion engine 2 flows in the catalyst 20. Hence, an oxidation-reduction reaction is actively caused in the catalyst 20, which hence can increase a purification efficiency of the exhaust gas.

In this regard, a compressor constructing the turbocharger provided in the intake passage is omitted in FIG. 1.

As shown in FIG. 2, the gas pressure reduction part 30 of the first embodiment is a groove part 31 formed on a wall surface of the exhaust passage 3 on the upstream side of the supply device 10. The groove part 31 is formed of an inner wall of the exhaust passage 3 dented to the outside and has a cross section formed nearly in a semicircular shape. In this way, a speed difference is caused between a flow of the exhaust gas along the inner wall of the groove part 31 and a flow of the exhaust gas flowing near the center of the exhaust passage 3. For this reason, as shown by an arrow A in FIG. 2, a swirl is generated on the downstream side of the groove part 31. This swirl is generated at a position adjacent to the supply port 13 of the supply device 10.

When the swirl is generated in the flow of the exhaust gas, a gas pressure at the center of the swirl is reduced and hence the exhaust gas is drawn into the center of the swirl from the outside of the swirl. In this way, the gas pressure near the supply port 13 is made lower than the gas pressure on the inside of the supply device body 11, whereby the reducing agent is sucked out to the exhaust passage 3 from the supply port 13 of the supply device 10. In other words, the supply port 13 is formed at a position in which the swirl is generated by the gas pressure reduction part 30. Alternatively, the supply port 13 is formed at a position in which the gas pressure in the exhaust passage 3 is reduced by the exhaust gas being drawn into the swirl.

The reducing agent sucked out to the exhaust passage 3 from the supply device 10 is stirred with the exhaust gas by the swirl and flows into the catalyst 20. Then, the reducing agent reduces the nitrate occluded by the catalyst 20 to $N_2$.

Next, a result of an experiment to examine a NOx reduction rate by the presence or absence of a reducing agent will be shown in FIG. 3.

This experiment was conducted in the following manner: a mixed gas of a gas containing $N_2$, $O_2$, $CO_2$, $H_2O$, a gas containing $N_2$, $HC+N_2$, and a reducing agent, or a mixed gas of a gas containing $N_2$, $O_2$, $CO_2$, $H_2O$, and a gas containing $N_2$, $HC+N_2$ was supplied to a ring-shaped furnace provided with the catalyst 20, and the temperature of the ring-shaped furnace was changed and then the mixed gas emitted from the ring-shaped furnace was measured by a Fourier transform infrared spectrophotometer (FTIR). In this regard, in this experiment, the exhaust gas contained NOx and aldehyde was used as the reducing agent.

In the following description, the mixed gas of the gas containing $N_2$, $O_2$, $CO_2$, $H_2O$, the gas containing $N_2$, $HC+N_2$, and the reducing agent will be referred to as "a gas mixed with reducing agent", whereas the mixed gas of the gas containing $N_2$, $O_2$, $CO_2$, $H_2O$, and the gas containing $N_2$, $HC+N_2$ will be referred to as "a gas not-mixed with reducing agent".

A broken line C in FIG. 3 shows a reduction rate of NOx contained in the gas emitted from the ring-shaped furnace provided with the catalyst 20 and supplied with "the gas mixed with reducing agent"

In contrast to this, a solid line D in FIG. 3 shows a reduction rate of NOx contained in the gas emitted from the ring-shaped furnace provided with the catalyst 20 and supplied with "the gas not-mixed with reducing agent".

As the result of the experiment, it was found that in the case where the ring-shaped furnace is supplied with "the gas mixed with reducing agent", the reduction rate of NOx is higher at a lower temperature than in the case where the ring-shaped furnace is supplied with "the gas not-mixed with reducing agent".

The exhaust emission control apparatus 1 of the first embodiment produces the following operation and effect.

(1) In the first embodiment, the gas pressure reduction part 30 can change the speed of the exhaust gas flowing in the exhaust passage 3 and can reduce the gas pressure near the supply port 13 as compared with the gas pressure on the inside of the supply device body 11.

In this way, the reducing agent is sucked out to the exhaust passage 3 through the supply port 13 from the supply device body 11. For this reason, the exhaust emission control apparatus 1 can increase a supply amount of the reducing agent.

Further, the exhaust emission control apparatus 1 can easily supply the reducing agent to the exhaust passage 3 from the supply device 10 without utilizing a pressure difference or the like between the upstream side and the downstream side of the turbine 4 of the turbocharger provided in the exhaust passage 3. For this reason, the exhaust emission control apparatus 1 can be arranged near the internal combustion engine 2. In this way, the exhaust emission control apparatus 1 can increase the temperature of the exhaust gas flowing into the catalyst 20, which hence can increase the efficiency of the oxidation-reduction reaction in the catalyst 20 and hence can increase the reduction rate of NOx.

(2) In the first embodiment, the gas pressure reduction part 30 causes a speed difference in the flow of the exhaust gas in the exhaust passage 3, thereby generating the swirl in the flow of the exhaust gas in the exhaust passage 3. The supply port 13 of the supply device 10 is provided at a position in which the swirl is generated by the gas pressure reduction part 30 or at a position in which the gas pressure of the exhaust passage 3 is reduced by the exhaust gas being drawn in by the swirl.

In this way, the gas pressure at the center of the swirl is reduced and hence the exhaust gas is drawn into the center of the swirl from the outside of the swirl. For this reason, the reducing agent can be sucked out to the exhaust passage 3 from the supply port 13 of the supply device 10.

Further, the reducing agent sucked out to the exhaust passage 3 is stirred with the exhaust gas by the swirl, thereby being quickly mixed with the exhaust gas. Hence, a distance between the supply device 10 and the catalyst 20 can be made closer, whereby the size of the exhaust emission control apparatus 1 can be reduced.

(3) In the first embodiment, the gas pressure reduction part 30 is the groove part 31 that is provided on the wall surface of the exhaust passage 3 on the upstream side of the supply port 13 of the supply device 10 and that generates the swirl in the flow of the exhaust gas which is adjacent to the supply port 13. The groove part 31 as the gas pressure reduction part 30 can cause the speed difference in the flow of the exhaust gas in the exhaust passage 3 and can generate the swirl on the downstream side of the groove part 31. For this reason, the exhaust emission control apparatus 1 can generate the swirl by a simple configuration including the groove part 31 and can suck out the reducing agent to the exhaust passage 3 from the supply device 10.

In this regard, the groove part 31 provided on the wall surface of the exhaust passage 3 is not limited to a part whose cross section is nearly semicircular, as described above, but may be formed in an appropriate shape by an experiment or the like. Further, the number of the groove 31 may be one or plural.

Second Embodiment

Figure 4:
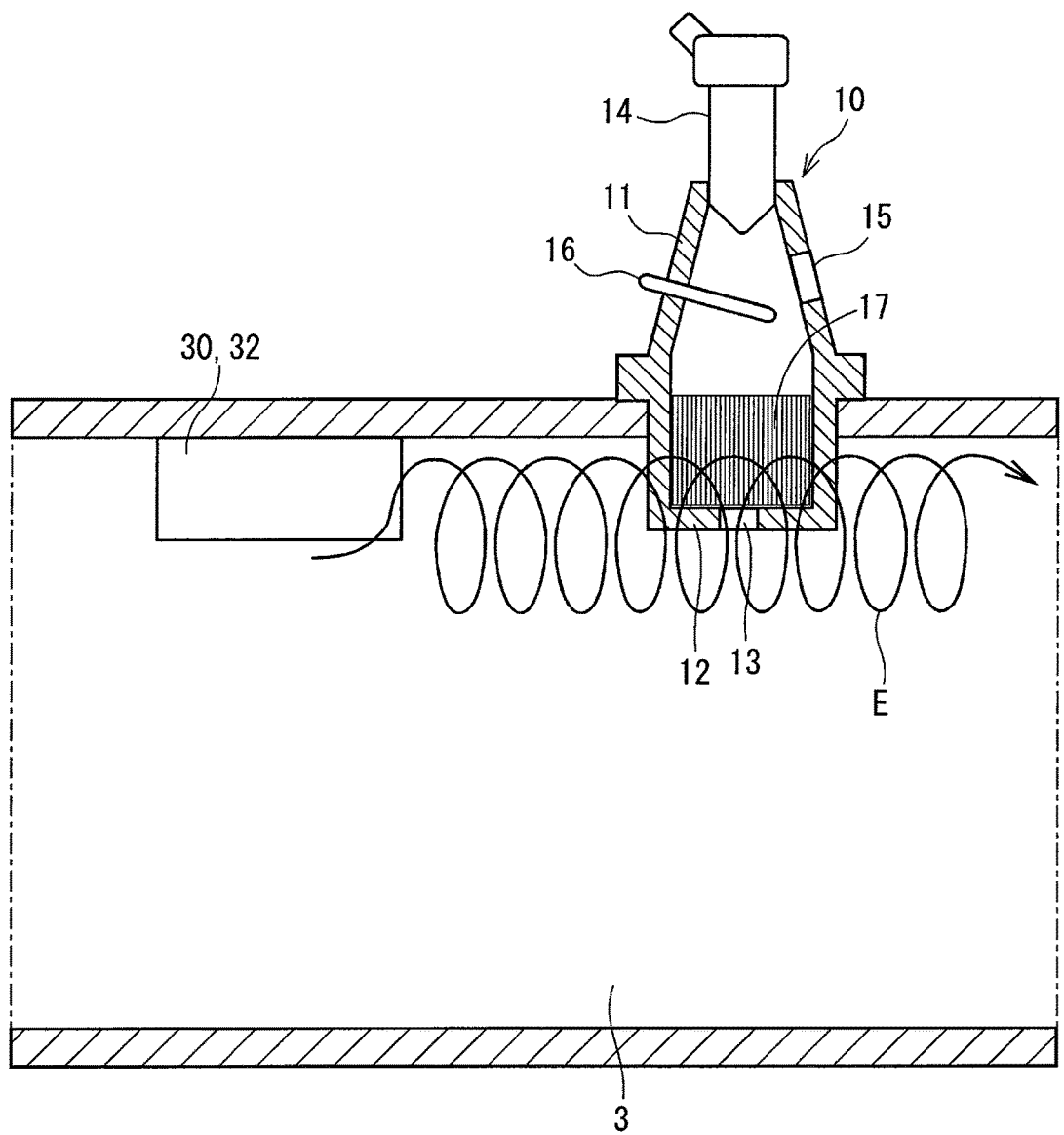
FIG. 4 is a partial section view of an exhaust emission control apparatus according to a second embodiment of the present disclosure.

A second embodiment of the present disclosure will be shown in FIG. 4. The gas pressure reduction part 30 of the second embodiment is a protruding part 32 provided on the wall surface of the exhaust passage 3 on the upstream side of the supply device 10. The protruding part 32 protrudes to the inside from the inner wall of the exhaust passage 3 and has a cross section formed nearly in a rectangular shape. This causes a speed difference between a flow of the exhaust gas along the protruding part 32 and a flow of the exhaust gas flowing near the central portion of the exhaust passage 3. For this reason, as shown by an arrow E in FIG. 4, a swirl is generated on the downstream side of the protruding pat 32. This swirl is generated at a position adjacent to the supply port 13 of the supply device 10.

Also in the second embodiment, the speed difference is caused in the flow of the exhaust gas of the exhaust passage 3 by the protruding part 32, so that the swirl is generated on the downstream side of the protruding part 32. For this reason, the exhaust emission control apparatus 1 can generate the swirl by a simple configuration including the protruding part 32 and can suck out the reducing agent to the exhaust passage 3 from the supply device 10.

In this regard, the protruding part 32 provided on the wall surface of the exhaust passage 3 is not limited to a part whose cross section is nearly rectangular, as described above, but may be formed in an appropriate shape by an experiment or the like. Further, the number of the protruding part 32 may be one or plural.

Third Embodiment

Figure 5:
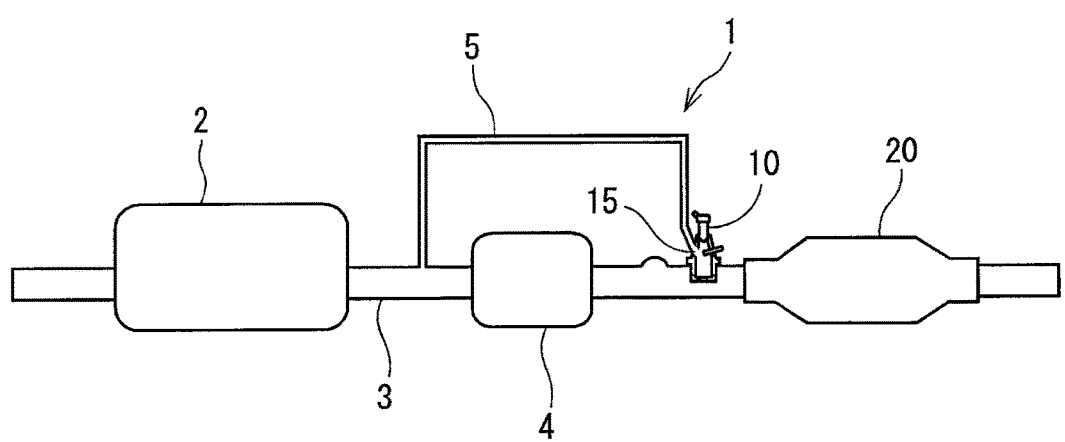
FIG. 5 is a configuration of an exhaust emission control apparatus according to a third embodiment of the present disclosure.

A third embodiment of the present disclosure will be shown in FIG. 5. In the third embodiment, the exhaust emission control apparatus 1 is provided on the downstream side of the turbine 4 of the turbocharger provided in the exhaust passage 3.

The exhaust passage 3 positioned on the upstream side of the turbine 4 and a gas introduction port 15 formed in the supply device 10 are made to communicate with each other by a communication passage 5. A gas pressure on the upstream side of the turbine 4 is higher than the gas pressure on the downstream side of the turbine 4. For this reason, the gas pressure on the inside of the supply device body 11 becomes higher than the gas pressure in the exhaust passage 3 which is provided on the downstream side of the turbine 4 and in which the supply port 13 of the supply device 10 is exposed. Hence, in the third embodiment, a supply amount of the reducing agent supplied to the exhaust passage 3 from the supply device 10 can be increased.

In this regard, also in the third embodiment, it is preferable that the exhaust passage 3 is provided with the gas pressure reduction part 30 and that the reducing agent is sucked out to the exhaust passage 3 from the supply device 10.

Fourth Embodiment

Figure 6:
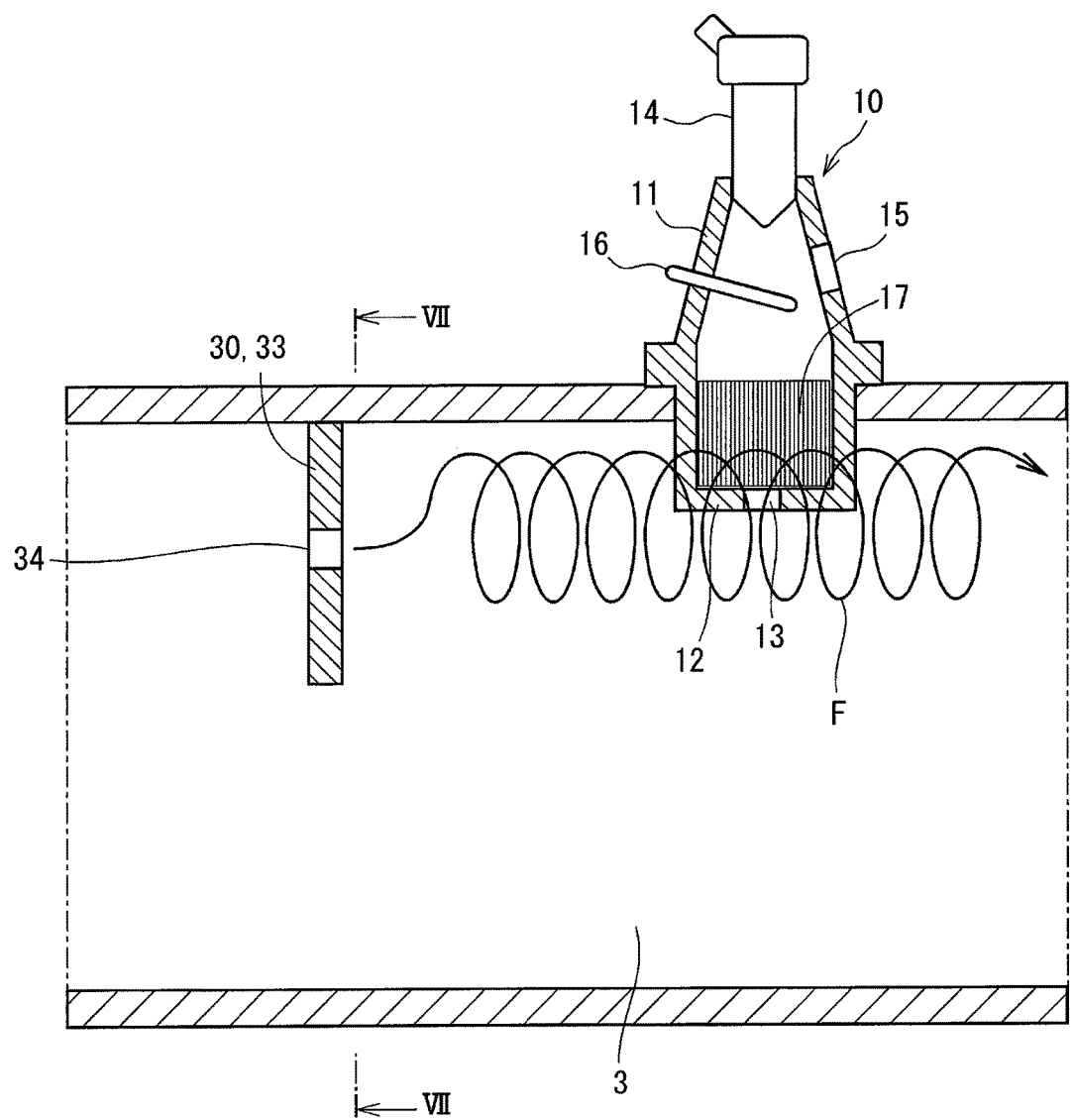
FIG. 6 is a partial section view of an exhaust emission control apparatus according to a fourth embodiment of the present disclosure.
Figure 7:
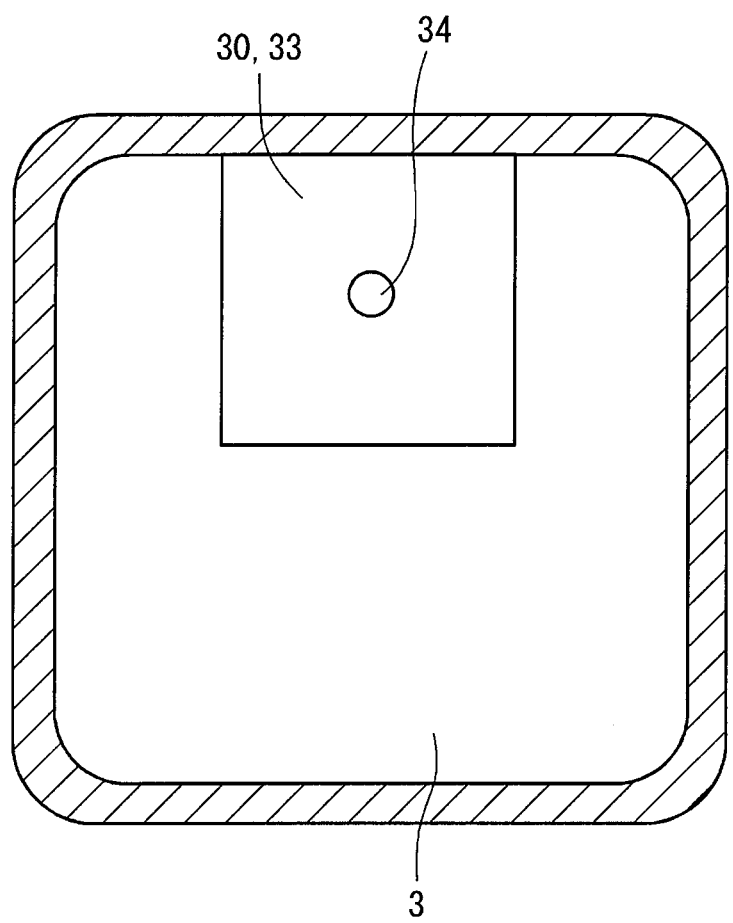
FIG. 7 is a section view taken on a line VII-VII of FIG. 6.

A fourth embodiment of the present disclosure will be shown in FIG. 6 and FIG. 7. The gas pressure reduction part 30 of the fourth embodiment is a structure 33 provided at a portion of the wall surface of the exhaust passage 3 on the upstream side of the supply device 10. The structure 33 is formed in the shape of a plate and has a hole 34 made in a thickness direction thereof. This causes a speed difference between a flow of the exhaust gas passing through the hole 34 of the structure 33 and a flow of the exhaust gas on the downstream side of the structure 33 at a position except for the hole 34 of the structure 33. For this reason, as shown by an arrow F in FIG. 6, a swirl is generated on the downstream side of the structure 33. This swirl is generated at a position adjacent to the supply port 13 of the supply device 10.

Also in the fourth embodiment, the speed difference is caused in the flow of the exhaust gas in the exhaust passage 3 by the structure 33, so that the swirl is generated on the downstream side of the structure 33. For this reason, the exhaust emission control apparatus 1 can generate the swirl by a simple configuration including the structure 33 and can suck out the reducing agent to the exhaust passage 3 from the supply device 10.

In this regard, the structure 33 provided on the wall surface of the exhaust passage 3 is not limited to a part formed in the shape of the plate, as described above, but may be formed in an appropriate shape by an experiment or the like.

In this regard, the cross section of the exhaust passage 3 is not limited to the rectangular shape but may be formed in a circular shape.

Fifth Embodiment

Figure 8:
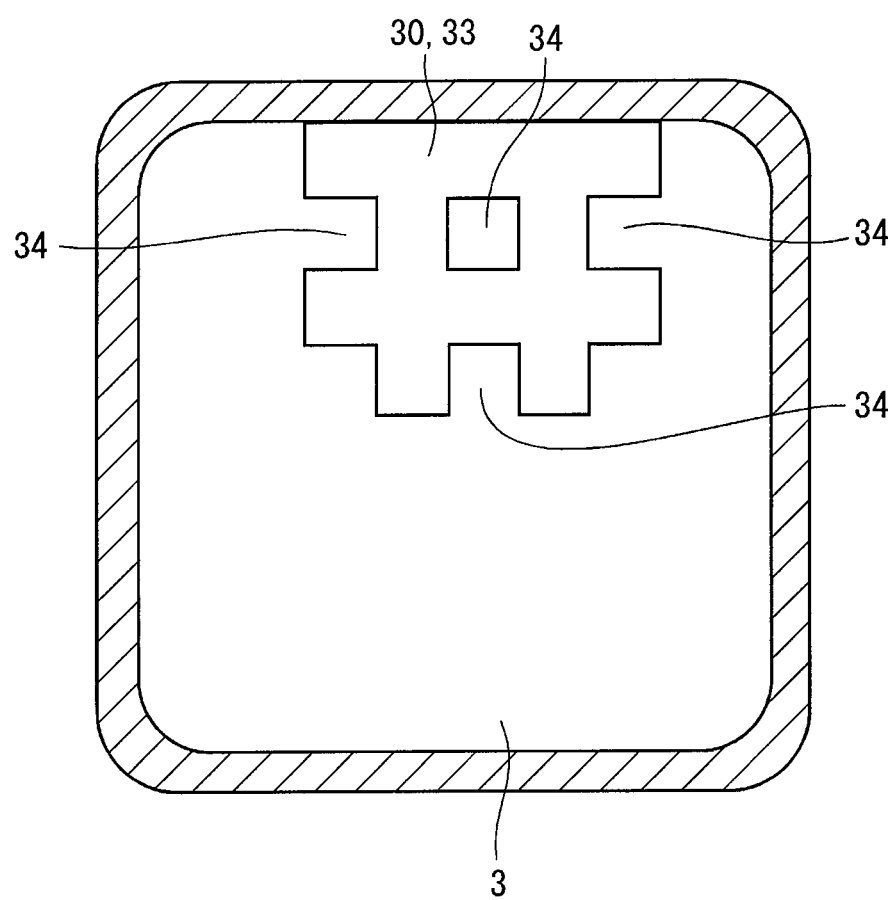
FIG. 8 is a partial section view of an exhaust emission control apparatus according to a fifth embodiment of the present disclosure.

A fifth embodiment of the present disclosure will be shown in FIG. 8. In the fifth embodiment, the structure 33 as the gas pressure reduction part 30 has a plurality of holes 34. This causes a speed difference between a flow of the exhaust gas passing through the plurality of holes 34 of the structure 33 and a flow of the exhaust gas on the downstream side of the structure 33 at a position except for the plurality of holes 34 of the structure 33. For this reason, a swirl is generated on the downstream side of the structure 33. This swirl is generated at a position adjacent to the supply port 13 of the supply device 10.

Also in the fifth embodiment, the exhaust emission control apparatus 1 can generate the swirl by a simple configuration including the structure 33 and can suck out the reducing agent to the exhaust passage 3 from the supply device 10.

In this regard, the structure 33 provided on the wall surface of the exhaust passage 3 is not limited to a part formed in the shape described above but may be formed in an appropriate shape by an experiment or the like. Further, the structure 33 may be formed in the shape of a mesh.

In this regard, the cross section of the exhaust passage 3 is not limited to the rectangular shape shown in FIG. 8 but may be formed in a circular shape.

Sixth Embodiment

Figure 9:
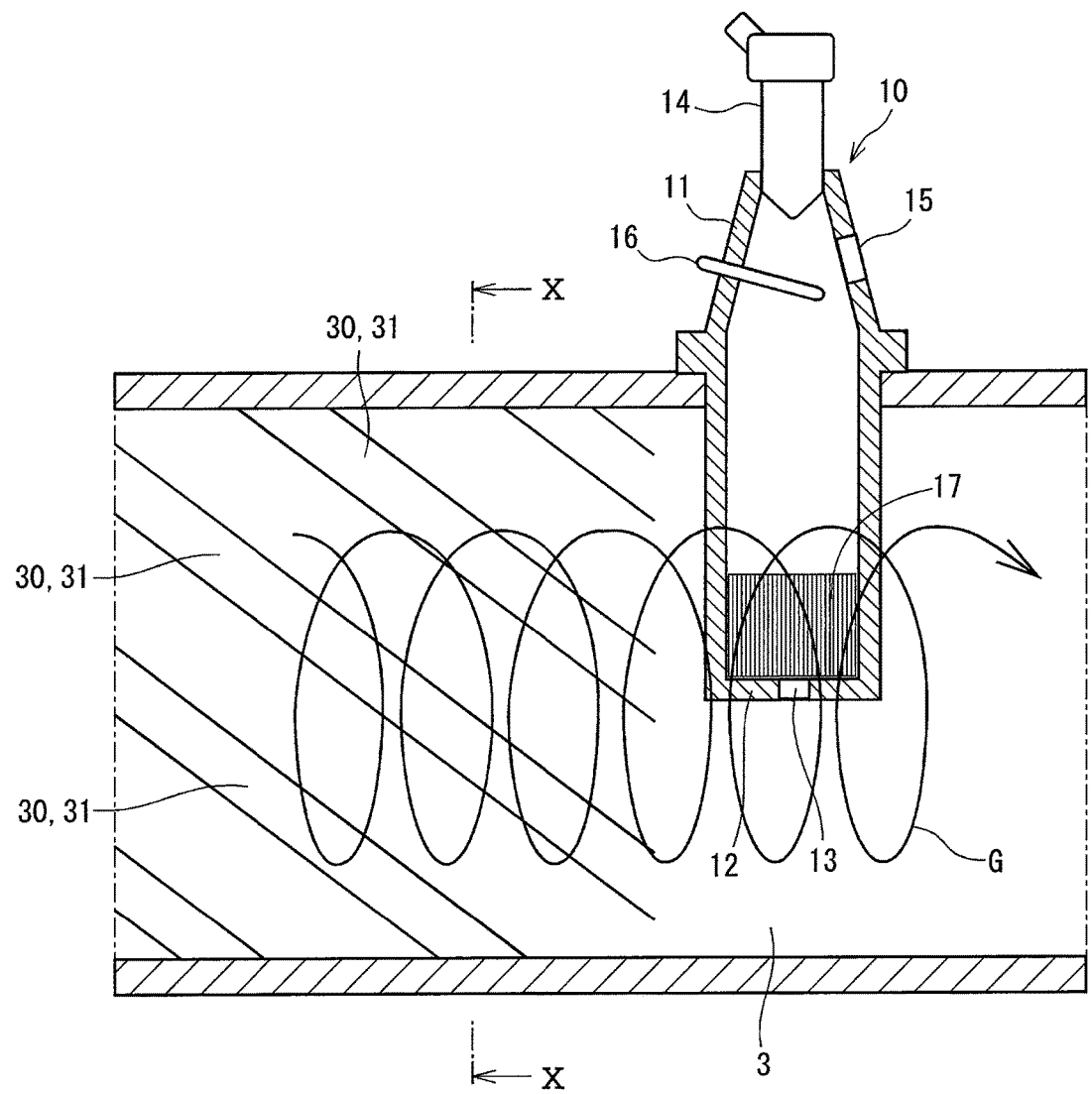
FIG. 9 is a partial section view of an exhaust emission control apparatus according to a sixth embodiment of the present disclosure.
Figure 10:
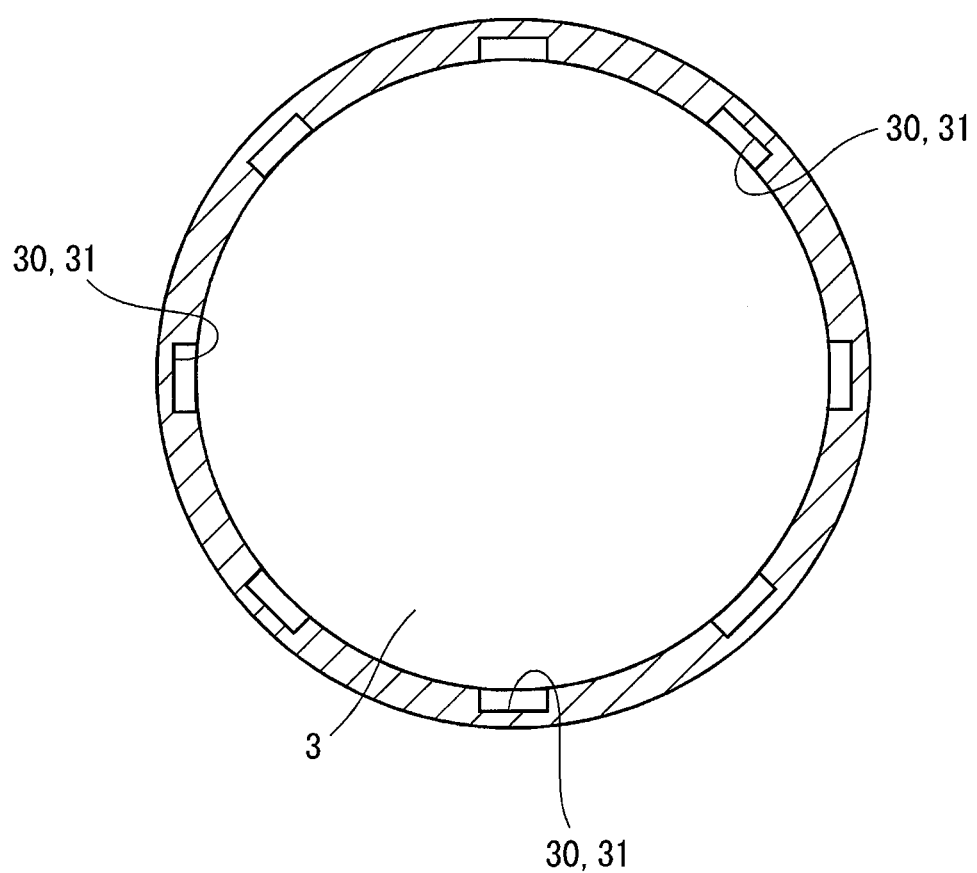
FIG. 10 is a section view taken on a line X-X of FIG. 9.

A sixth embodiment of the present disclosure will be shown in FIG. 9 and FIG. 10. The gas pressure reduction part 30 of the sixth embodiment is a plurality of groove parts 31 extended in a spiral shape on the inner wall of the exhaust passage 3 on the upstream side of the supply device 10. The groove parts 31 are formed nearly on the entire periphery of the inner wall of the exhaust passage 3. In this way, as shown by an arrow G in FIG. 9, a swirl is generated in the flow of the exhaust gas of the exhaust passage 3. The center of the swirl and a central axis of the exhaust passage 3 are nearly at the same position or near positions.

Further, in the sixth embodiment, the protruding part 12 of the supply device 10 is extended to or near a position of the center of the swirl, and the supply port 13 is formed at the position.

In the sixth embodiment, the gas pressure reduction part 30 generates a large swirl at a position of the central axis or at a position close to the central axis of the exhaust passage 3, whereby the reducing agent can be sucked out to the exhaust passage 3 from the supply device 10.

In this regard, in the sixth embodiment, the groove parts 31 formed in the spiral shape are provided on the inner wall of the exhaust passage 3. In place of this, the exhaust emission control apparatus 1 may be provided with spiral protruding parts 32 protruding to the inside from the inner wall of the exhaust passage 3.

Seventh Embodiment

Figure 11:
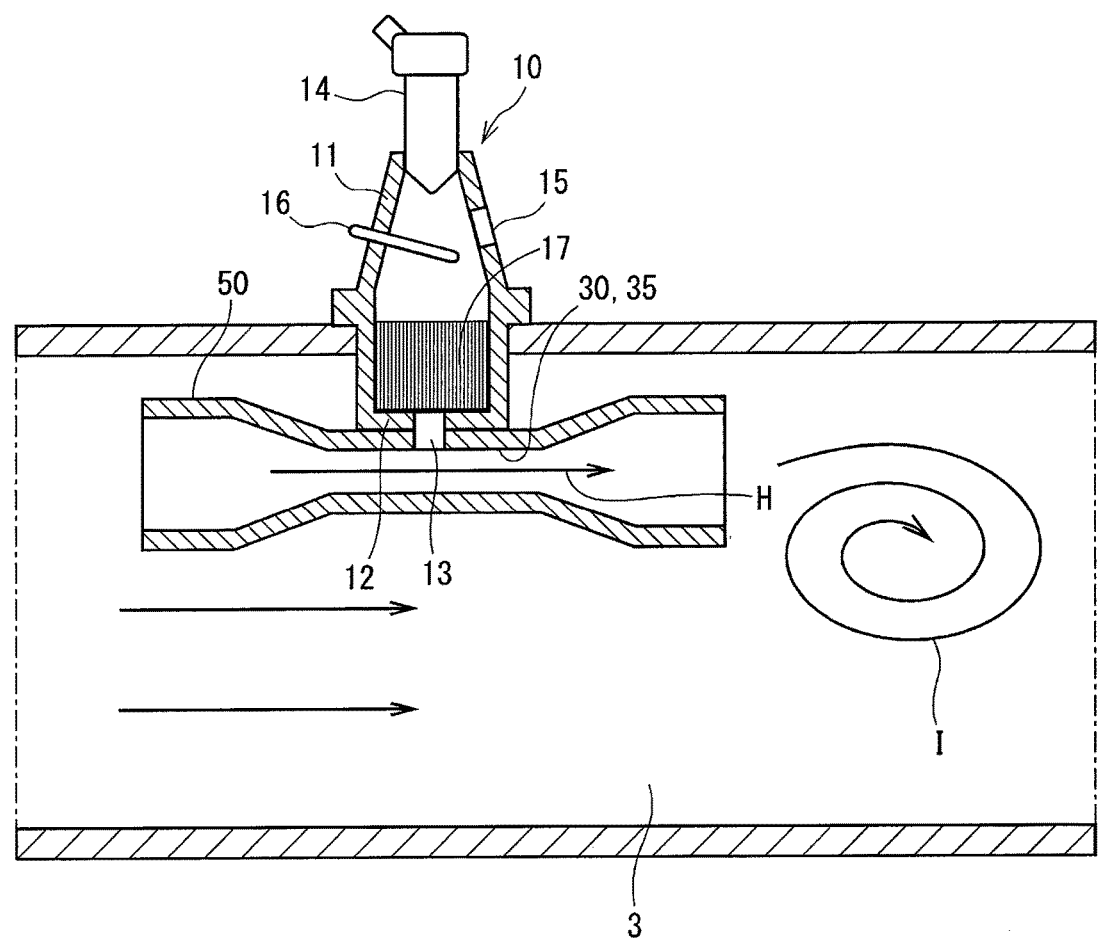
FIG. 11 is a partial section view of an exhaust emission control apparatus according to a seventh embodiment of the present disclosure.

A seventh embodiment of the present disclosure will be shown in FIG. 11. An exhaust emission control apparatus 1 of the seventh embodiment is provided with a small tube 50 on the inside of the exhaust passage 3. In the seventh embodiment, the gas pressure reduction part 30 is a venturi tube 35 formed on the inner wall of the small tube 50. As shown by an arrow H in FIG. 11, the venturi tube 35 can increase a flow speed of the exhaust gas flowing inside the venturi tube 35.

Further, on the downstream side of the venturi tube 35, a speed difference is caused between a flow of the exhaust gas emitted from the venturi tube 35 and a flow of the exhaust gas on the outside of the venturi tube 35. For this reason, as shown by an arrow I in FIG. 11, a swirl is generated on the downstream side of the venturi tube 35.

In the seventh embodiment, the protruding part 12 of the supply device 10 is coupled to the small tube 50, and the supply port 13 formed in the protruding part 12 communicates with a flow passage on the inside of the venturi tube 35. When the flow speed of the exhaust gas flowing in a flow passage of the venturi tube 35 becomes faster, the gas pressure of the venturi tube 35 becomes lower, so that the reducing agent is sucked out to the exhaust passage 3 from the supply port 13 of the supply device 10. In this way, the exhaust emission control apparatus 1 can increase a supply amount of the reducing agent supplied to the exhaust passage 3 from the supply device 10.

Further, in the seventh embodiment, the exhaust gas and the reducing agent can be stirred by the swirl generated on the downstream side of the small tube 50.

Eighth Embodiment

Figure 12:
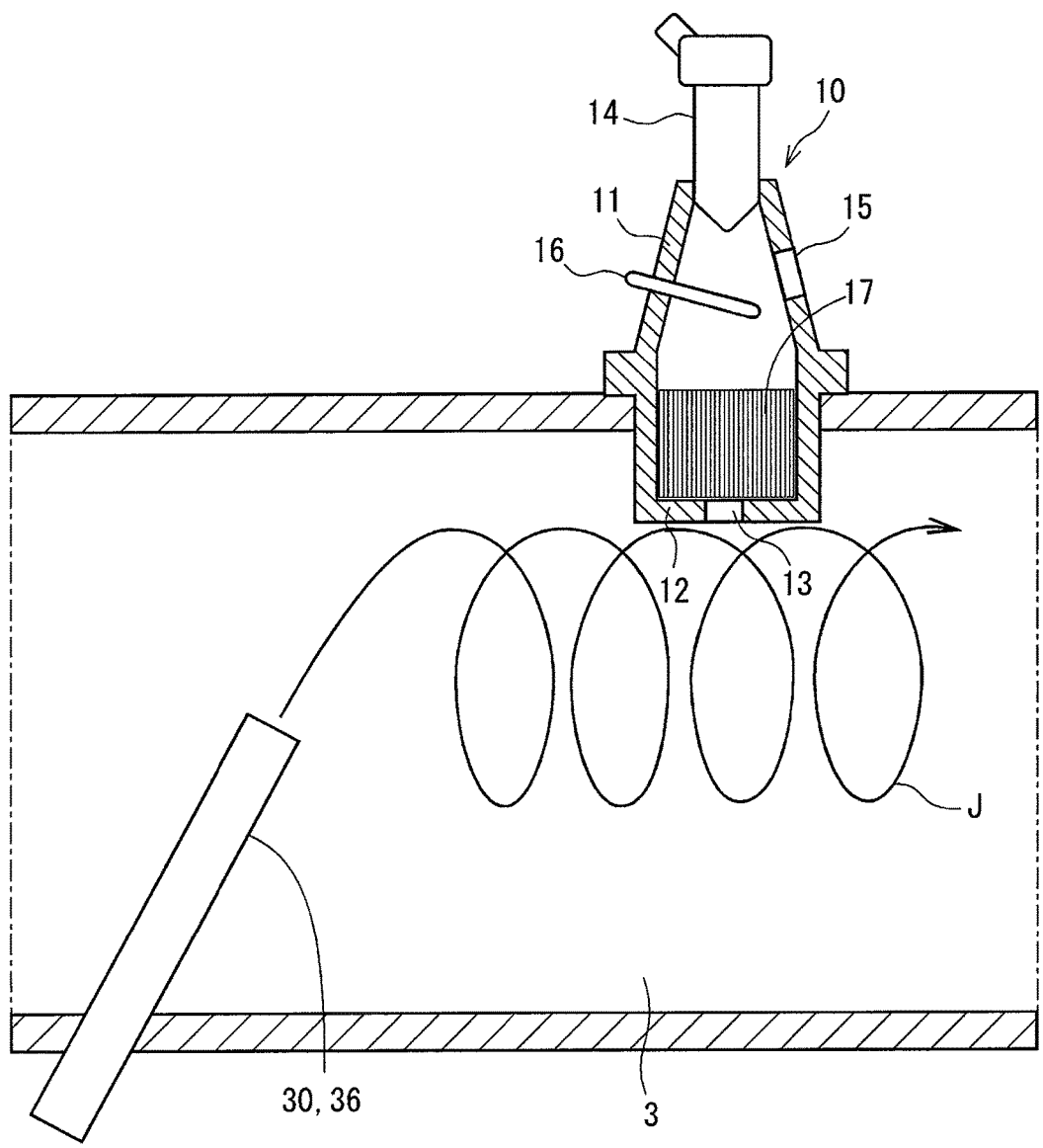
FIG. 12 is a partial section view of an exhaust emission control apparatus according to an eighth embodiment of the present disclosure.

An eighth embodiment of the present disclosure will be described in FIG. 12. In the eighth embodiment, the gas pressure reduction part 30 is a join pipe 36 that has one end coupled to the exhaust passage 3 and has the other end coupled to an air tank, a compressor, an intake passage, which are not shown in the drawing, or the exhaust passage 3. The join pipe 36 supplies the air or the exhaust gas to the exhaust passage 3. This causes a speed difference between a flow of the air or the exhaust gas supplied to the exhaust passage 3 from the join pipe 36 and a flow of the exhaust gas along a central axis of the exhaust passage 3. For this reason, as shown by an arrow J in FIG. 12, a swirl is generated near the supply port 13 of the supply device 10.

Also in the eighth embodiment, the exhaust emission control apparatus 1 generates the swirl by the air or the exhaust gas supplied to the exhaust passage 3 from the join pipe 36 and hence can suck out the reducing agent to the exhaust passage 3 from the supply device 10.

Ninth Embodiment

Figure 13:
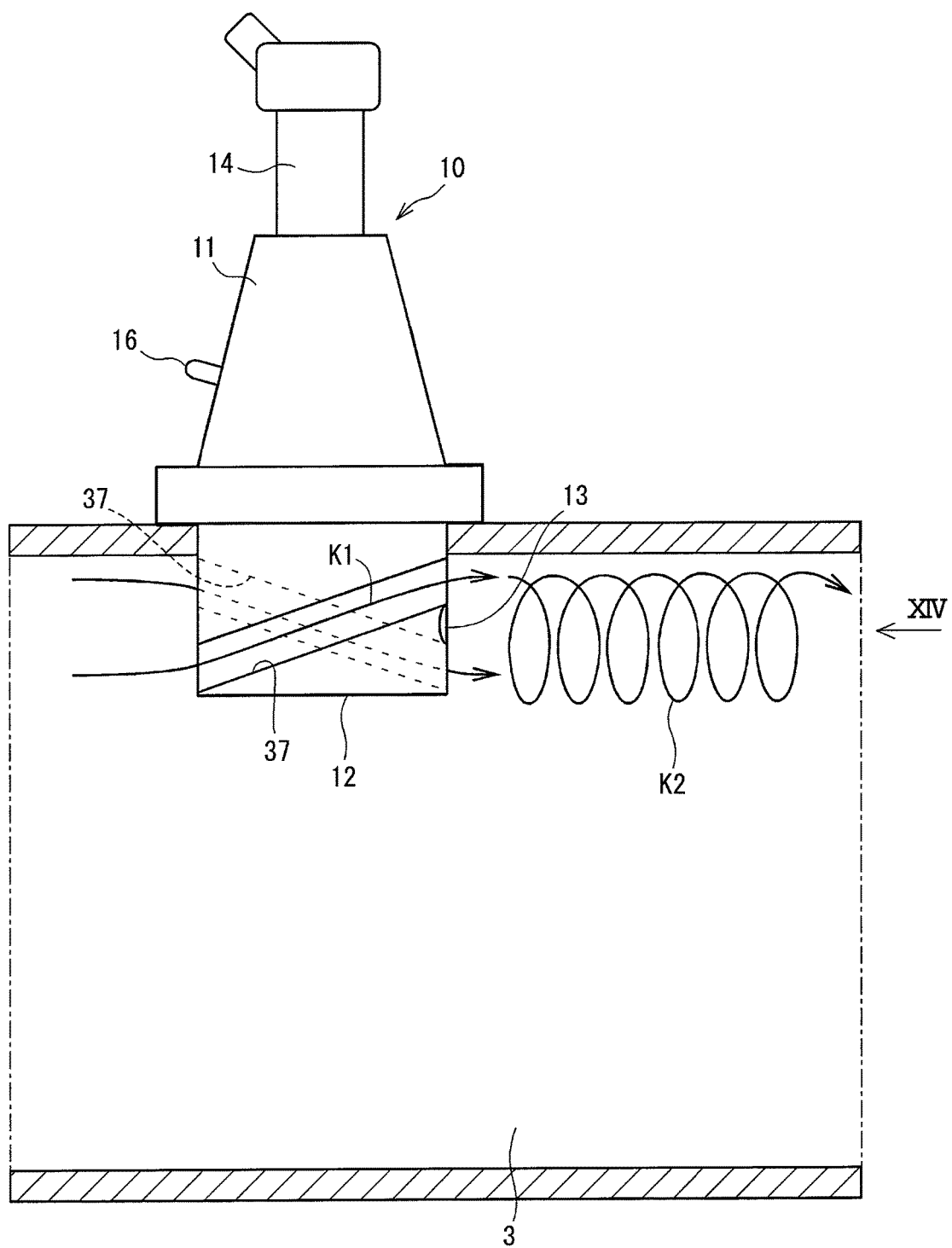
FIG. 13 is a partial section view of an exhaust emission control apparatus according to a ninth embodiment of the present disclosure.
Figure 14:
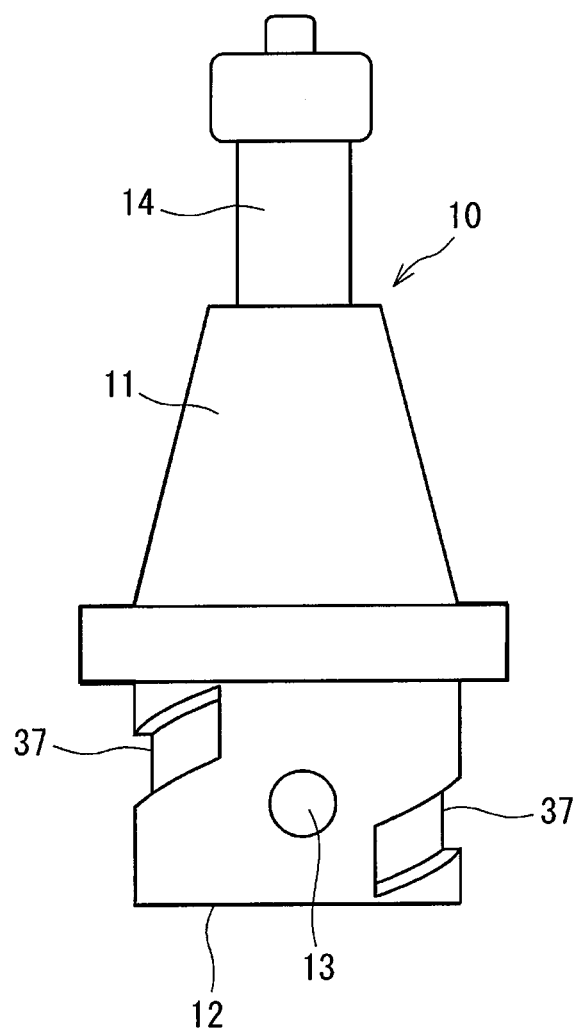
FIG. 14 is a view, when viewed from a direction shown by XIV of FIG. 3, of a supply device.

A ninth embodiment of the present disclosure will be shown in FIG. 13 and FIG. 14. In the ninth embodiment, the gas pressure reduction part 30 is a gas flow guide groove 37 formed on an outer wall of the protruding part 12. The gas flow guide groove 37 is formed in such a way as to be inclined to a central axis of the exhaust passage 3. Further, in the ninth embodiment, the supply port 13 of the supply device 10 is formed on the downstream side of the exhaust passage 3 in the protruding part 12.

As shown by arrows K1 and K2 in FIG. 13, the gas flow guide groove 37 can change a speed and a direction of the exhaust gas flowing along the outer wall of the protruding part 12 and can generate a swirl on the downstream side of the support port 13. In this way, the gas pressure in the center of the swirl becomes lower. Hence, the exhaust emission control apparatus 1 can suck out the reducing agent to the center of the swirl from the supply port 13 of the supply device 10.

In this regard, in the ninth embodiment, the gas flow guide groove 37 is formed on the outer wall of the protruding part 12. In place of this, the exhaust emission control apparatus 1 may be provided with a gas flow guide projection that projects to the outside from the outer wall of the protruding part 12.

10th Embodiment

Figure 15:
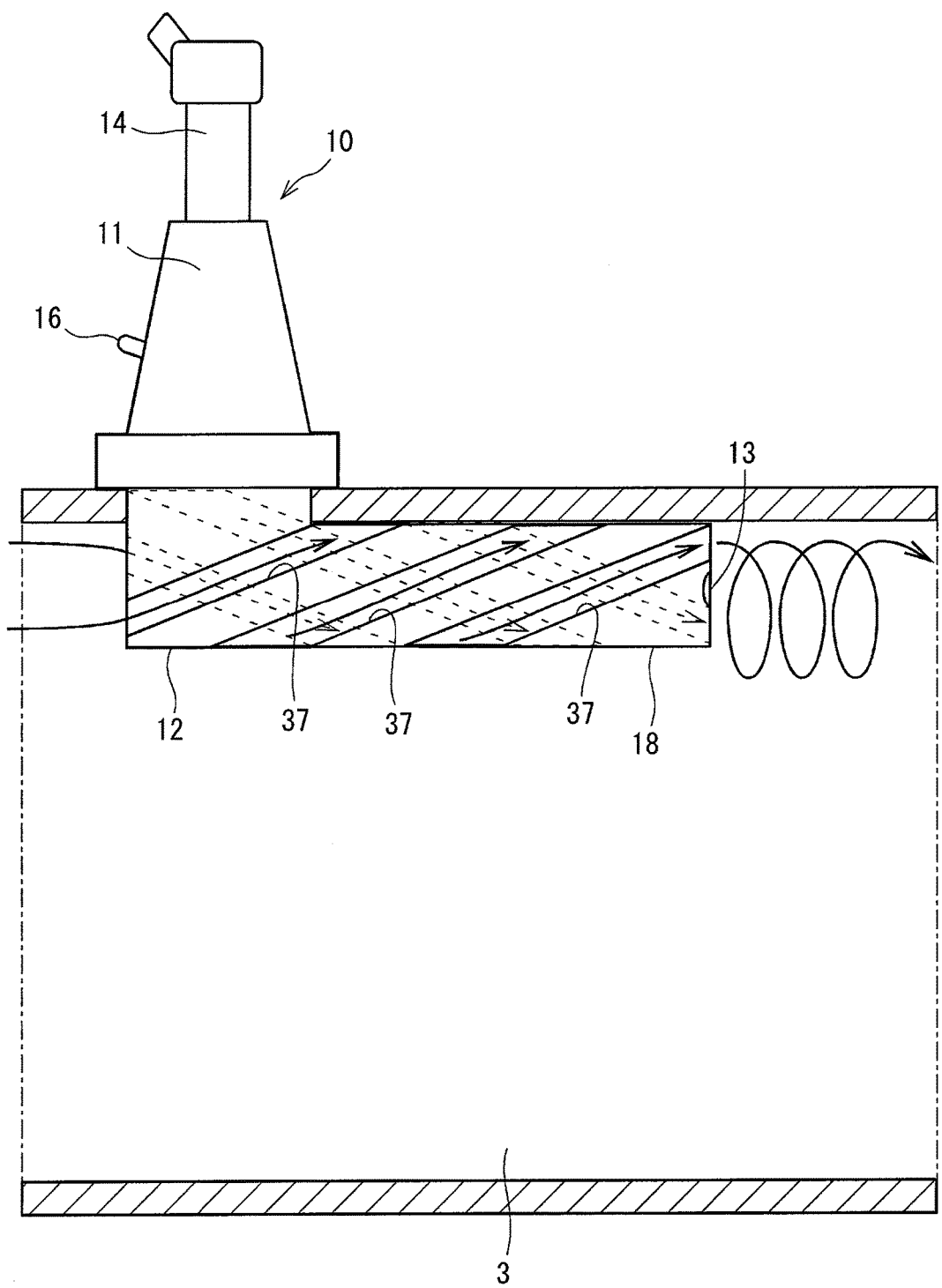
FIG. 15 is a partial section view of an exhaust emission control apparatus according to a 10th embodiment of the present disclosure.

A 10th embodiment of the present disclosure will be shown in FIG. 15. In the 10th embodiment, the protruding part 12 of the supply device 10 has an extending part 18 extending along the central axis of the exhaust passage 3. For this reason, the gas flow guide groove 37 formed on the outer wall of the protruding part 12 is formed in a longer shape in a central axis direction of the exhaust passage 3 than the gas flow guide groove 37 in the ninth embodiment described above. Further, the gas flow guide groove 37 may be formed in a spiral shape on the outer wall of the protruding part 12.

In the 10th embodiment, by greatly changing the speed and the direction of the exhaust gas flowing along the outer wall of the protruding part 12, the gas pressure in the center of a swirl generated on the downstream side of the support port 13 can be reduced. Hence, the exhaust emission control apparatus 1 can increase a supply amount of the reducing agent supplied to the exhaust passage 3 from the supply device 10.

11th Embodiment

Figure 16:
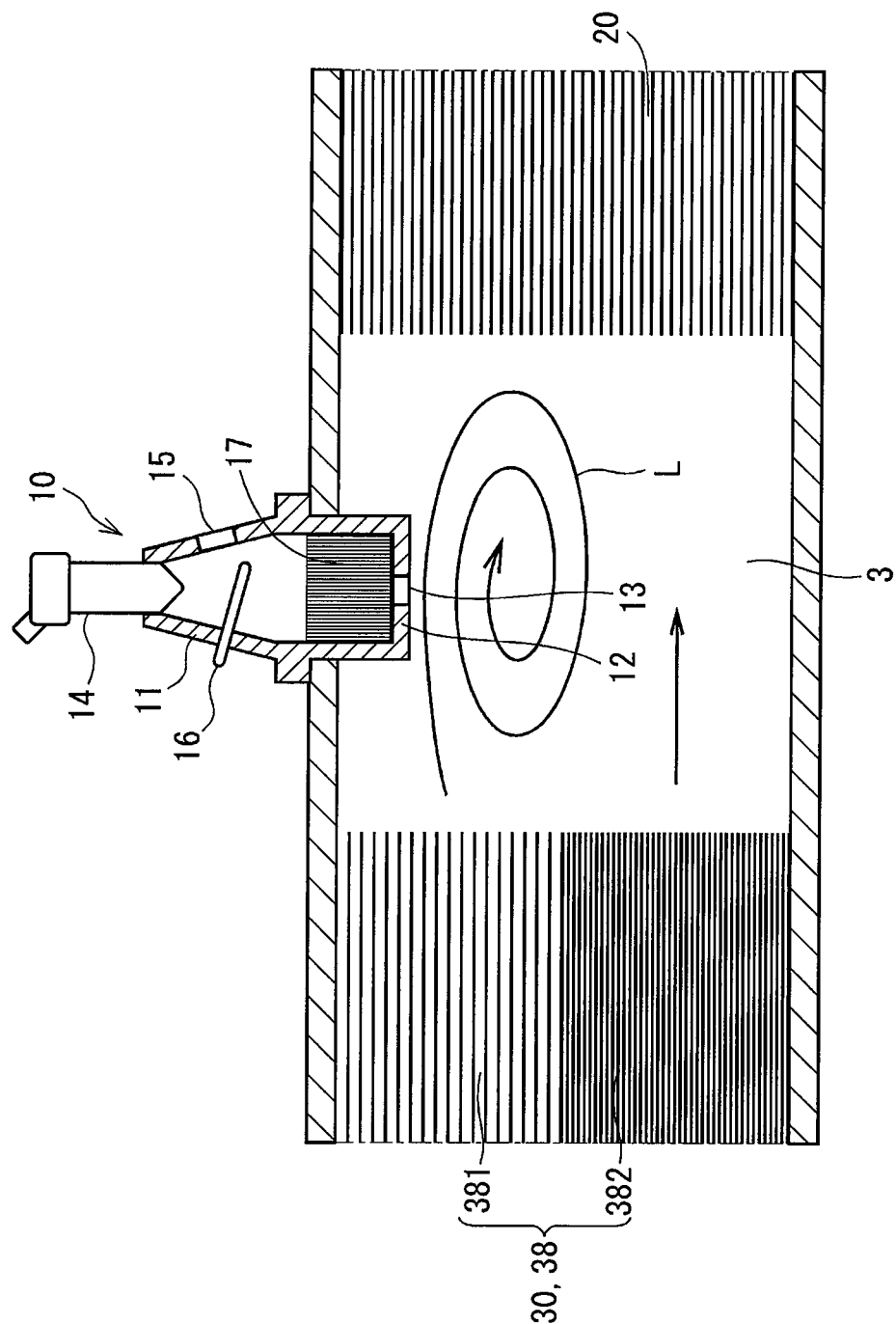
FIG. 16 is a partial section view of an exhaust emission control apparatus according to an 11th embodiment of the present disclosure.

An 11th embodiment of the present disclosure will be shown in FIG. 16. In the 11th embodiment, the gas pressure reduction part 30 is an upstream structure 38 formed in the exhaust passage 3 on the upstream side of the supply port 13 of the supply device 10. As the upstream structure 38 is given, for example, a diesel oxidation catalyst (DOC) or a diesel particulate filter (DPF).

In the upstream structure 38, a gas flow resistance at a portion 381 positioned on the supply port 13 side of the supply device 10 is made smaller and a gas flow resistance at a portion 382 positioned opposite to the supply port 13 is made larger. This causes a speed difference between a flow of the exhaust gas on the downstream side of the portion 381 having a smaller gas flow resistance and a flow of the exhaust gas on the downstream side of the portion 382 having a larger gas flow resistance. For this reason, as shown by an arrow L in FIG. 16, a swirl is generated on the downstream side of the upstream structure 38. This swirl is generated at a position adjacent to the supply port 13 of the supply device 10.

Also in the 11th embodiment, the exhaust emission control apparatus 1 can generate the swirl by the upstream structure 38 and can suck out the reducing agent to the exhaust passage 3 from the supply device 10.

12th Embodiment

Figure 17:
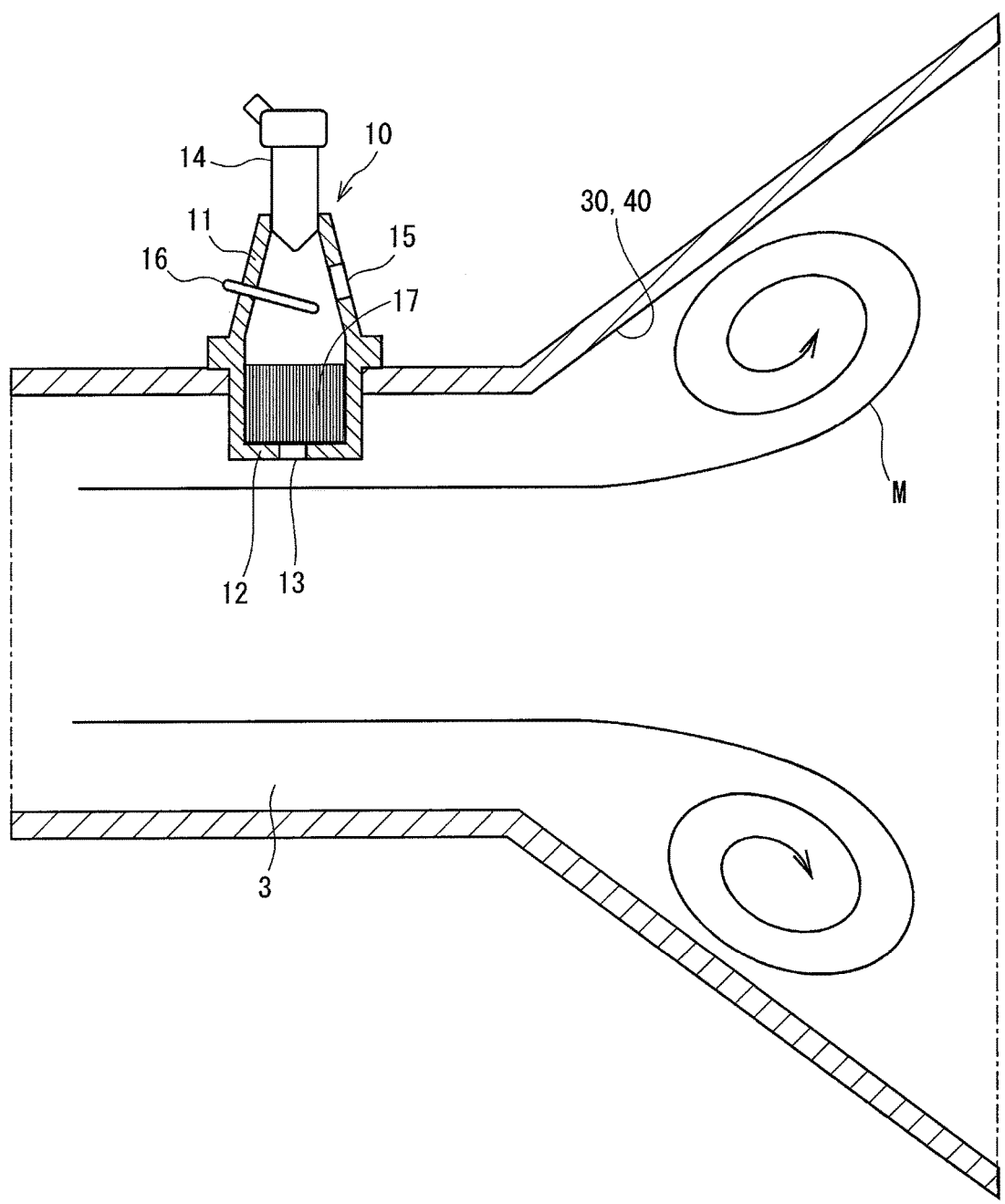
FIG. 17 is a partial section view of an exhaust emission control apparatus according to a 12th embodiment of the present disclosure.

A 12th embodiment of the present disclosure will be shown in FIG. 17. In the 12th embodiment, the gas pressure reduction part 30 is an expanding part 40 of the exhaust passage 3 in which an inside diameter of the exhaust passage 3 expands to the downstream side. The expanding part 40 has its inside diameter expanded at an angle in which the flow of the exhaust gas can be separated from the inner wall of the exhaust passage 3. This causes a speed difference between a separating portion in which the exhaust gas is separated from the inner wall of the exhaust passage 3 and a flow of the exhaust gas on the inside of the separating portion. Hence, as shown by an arrow M in FIG. 17, a swirl is generated in the expanding part 40. The gas pressure in the center of the swirl is reduced, so that the exhaust gas on the upstream side of the swirl is sucked in by the swirl. Hence, the flow speed of the exhaust gas on the upstream side of the swirl is increased.

The supply port 13 of the supply device 10 is formed at a portion in which the flow speed of the exhaust gas is made faster on the upstream side of the expanding part 40. In this way, the exhaust emission control apparatus 1 can suck out the reducing agent to the exhaust passage 3 from the supply device 10 by a reduction in the gas pressure which is caused by the flow speed of the exhaust gas being made faster.

13th Embodiment

Figure 18:
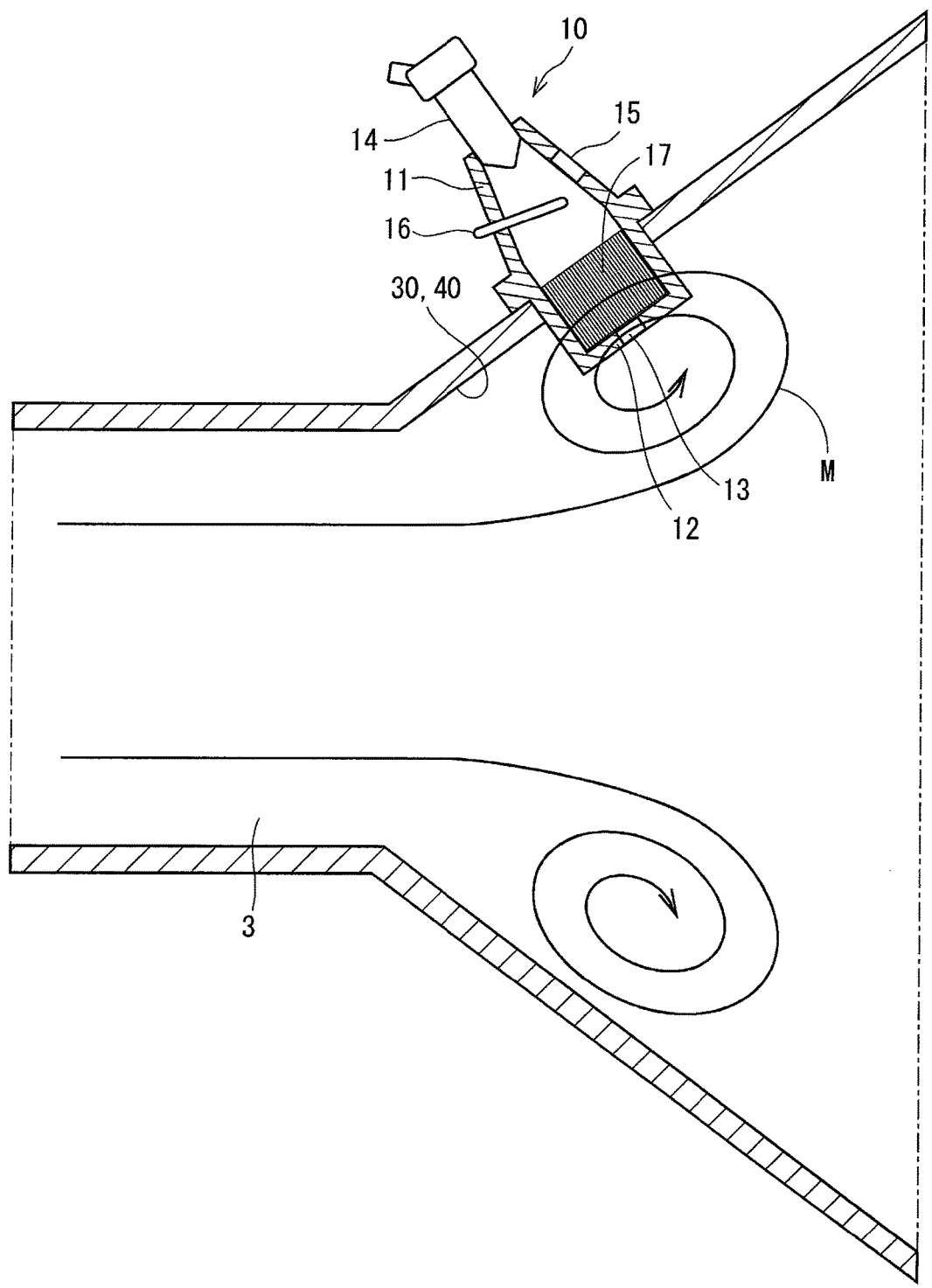
FIG. 18 is a partial section view of an exhaust emission control apparatus according to a 13th embodiment of the present disclosure.

A 13th embodiment of the present disclosure will be shown in FIG. 18. In the 13th embodiment, the supply port 13 of the supply device 10 is formed at a portion in which a swirl is generated by the expanding part 40 of the exhaust passage 3. In this way, the exhaust emission control apparatus 1 can suck out the reducing agent to the exhaust passage 3 from the supply device 10 by a reduction in the gas pressure at the center of the swirl.

14th Embodiment

Figure 19:
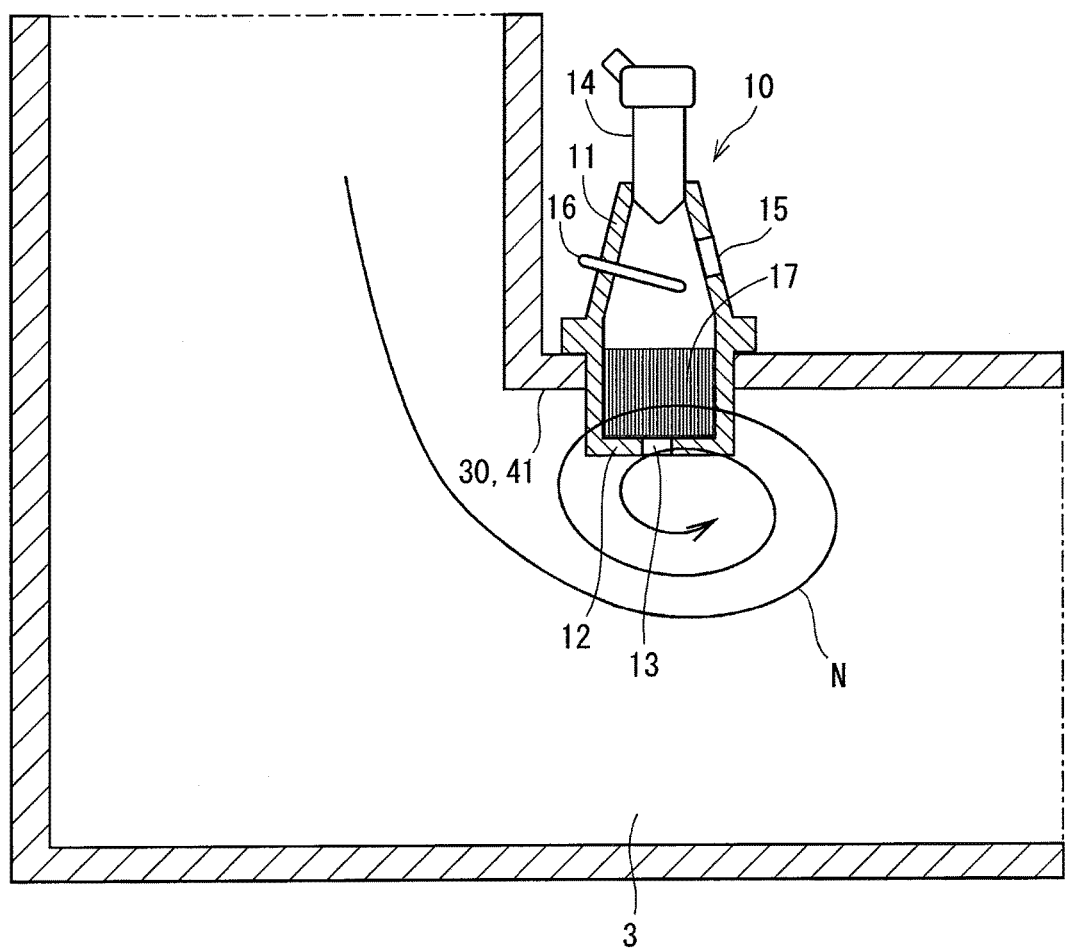
FIG. 19 is a partial section view of an exhaust emission control apparatus according to a 14th embodiment of the present disclosure.

A 14th embodiment of the present disclosure will be shown in FIG. 19. In the 14th embodiment, the gas pressure reduction part 30 is a curved part 41 of the exhaust passage 3. The curved part 41 is curved at an angle in which the flow of the exhaust gas is separated from the inner wall of the exhaust passage 3. This causes a speed difference between a flow of the exhaust gas at a separating portion in which the exhaust gas is separated from the inner wall of the exhaust passage 3 on the downstream side of the curved part 41 and a flow of the exhaust gas at a portion closer to a central axis side of the exhaust passage 3 than the separating portion. For this reason, as shown by an arrow N in FIG. 19, a swirl is generated on the downstream side of the curved part 41.

The supply port 13 of the supply device 10 is formed at a portion in which the swirl is generated on the downstream side of the curved part 41 of the exhaust passage 3. In this way, the exhaust emission control apparatus 1 can suck out the reducing agent to the exhaust passage 3 from the supply device 10 by a reduction in the gas pressure at the center of the swirl.

In this regard, the exhaust gas is sucked in by the swirl generated on the downstream side of the curved part 41, so that the flow speed of the exhaust gas on the upstream side of the swirl is made faster. For this reason, the supply port 13 of the supply device 10 may be formed at a portion in which the flow speed of the exhaust gas is made faster on the upstream side of the curved g part 41. In this way, the exhaust emission control apparatus 1 can suck out the reducing agent to the exhaust passage 3 from the supply device 10 by a reduction in the gas pressure which is caused by the flow speed of the exhaust gas being made faster.

15th Embodiment

Figure 20:
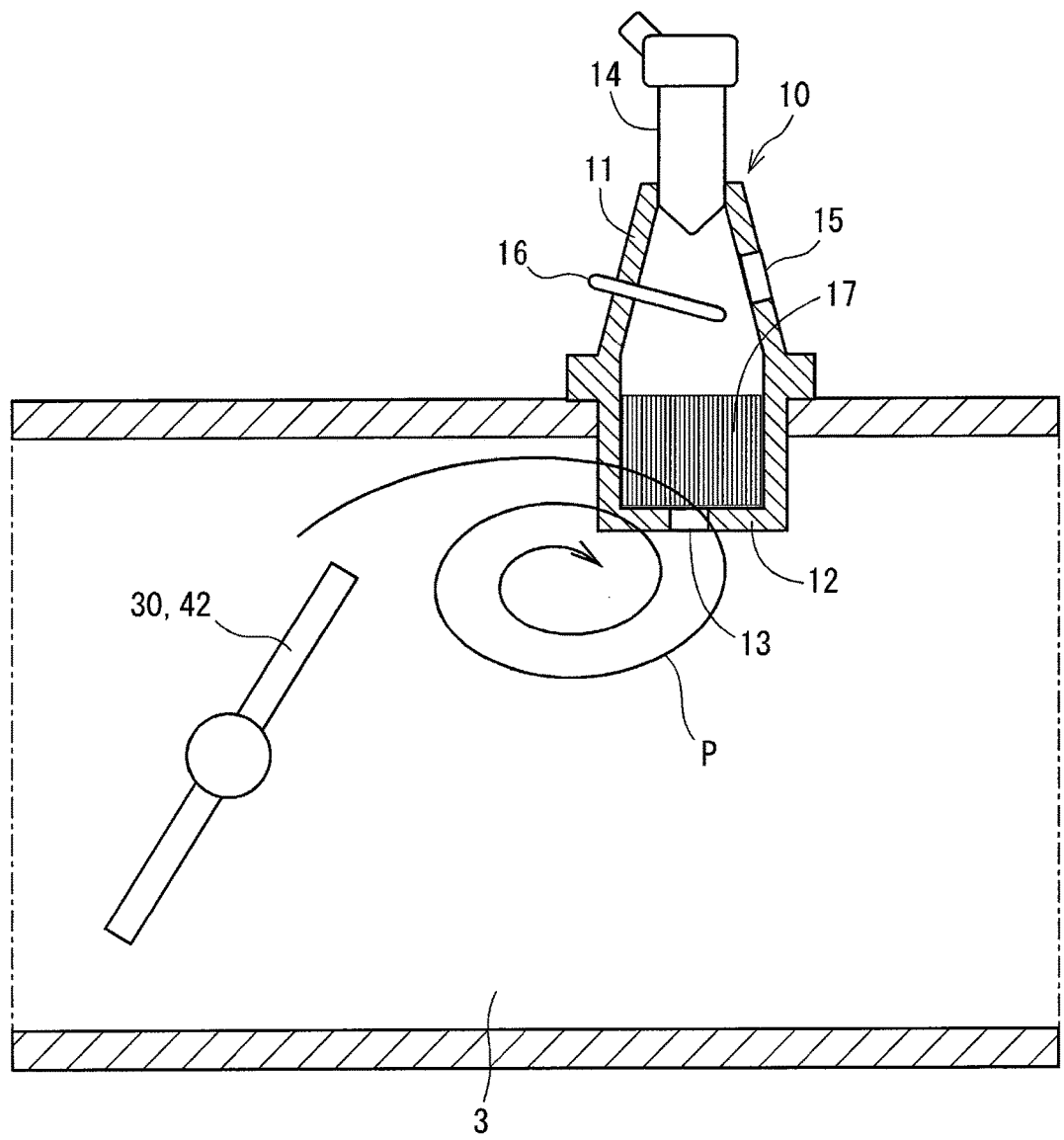
FIG. 20 is a partial section view of an exhaust emission control apparatus according to a 15th embodiment of the present disclosure.

A 15th embodiment of the present disclosure will be shown in FIG. 20. In the 15th embodiment, the gas pressure reduction part 30 is a gas flow control valve 42 that is provided in the exhaust passage 3 on the upstream side of the supply port 13 of the supply device 10. As the gas flow control valve 42 is given, for example, a valve provided at a portion in which an EGR passage provided by an exhaust gas recirculation (EGR) device is coupled to the exhaust passage 3. In this regard, the EGR passage will be omitted in the drawing.

By the gas flow control valve 42, a speed difference is caused between a flow of the exhaust gas passing through an opening formed between the inner wall of the exhaust passage 3 and the gas flow control valve 42 and a flow of the exhaust gas on the downstream side of the gas flow control valve 42. For this reason, as shown by an arrow P in FIG. 20, a swirl is generated on the downstream side of the gas flow control valve 42.

The supply port 13 of the supply device 10 is formed at a portion in which the swirl is generated by the gas flow control valve 42. The reducing agent is sucked out to the exhaust passage 3 from the supply device 10 by a reduction in the gas pressure at the center of the swirl.

In the 15th embodiment, the exhaust emission control apparatus 1 makes a configuration, which is arranged in the exhaust passage 3 for a purpose different from purifying the exhaust gas function, as the gas pressure reduction part 30 and has the supply port 13 of the supply device 10 formed at a position in which the swirl is generated on the downstream side of the gas pressure reduction part 30, thereby being able to suck out the reducing agent to the exhaust passage 3 from the supply device 10.

16th Embodiment

Figure 21:
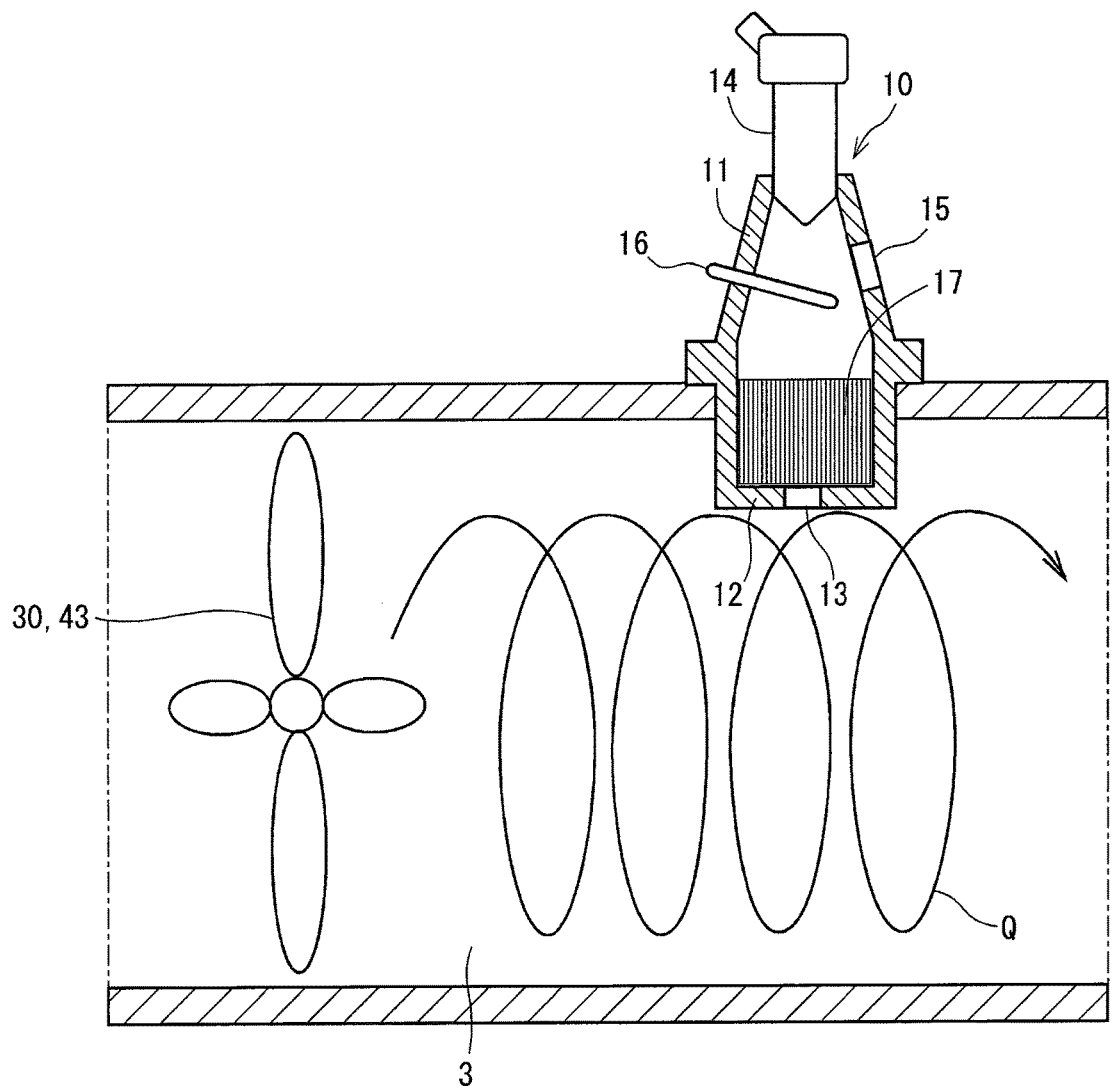
FIG. 21 is a partial section view of an exhaust emission control apparatus according to a 16th embodiment of the present disclosure.

A 16th embodiment of the present disclosure will be shown in FIG. 21. In the 16th embodiment, the gas pressure reduction part 30 is a turbine 43 that is provided in the exhaust passage 3 on the upstream side of the supply port 13 of the supply device 10. As the turbine 43 is given, for example, an energy recovery machine such as a generator or a turbocharger.

As shown by an arrow Q in FIG. 21, a swirl is generated on the downstream side of the turbine 43.

The supply port 13 of the supply device 10 is formed at a portion in which the swirl is generated by the turbine 43. The reducing agent is sucked out to the exhaust passage 3 from the supply device 10 by a reduction in the gas pressure at the center of the swirl.

Also in the 16th embodiment, the exhaust emission control apparatus 1 can make a configuration, which is arranged in the exhaust passage 3 for a purpose different from purifying the exhaust gas function, as the gas pressure reduction part 30 and can suck out the reducing agent to the exhaust passage 3 from the supply device 10.

17th Embodiment

Figure 22:
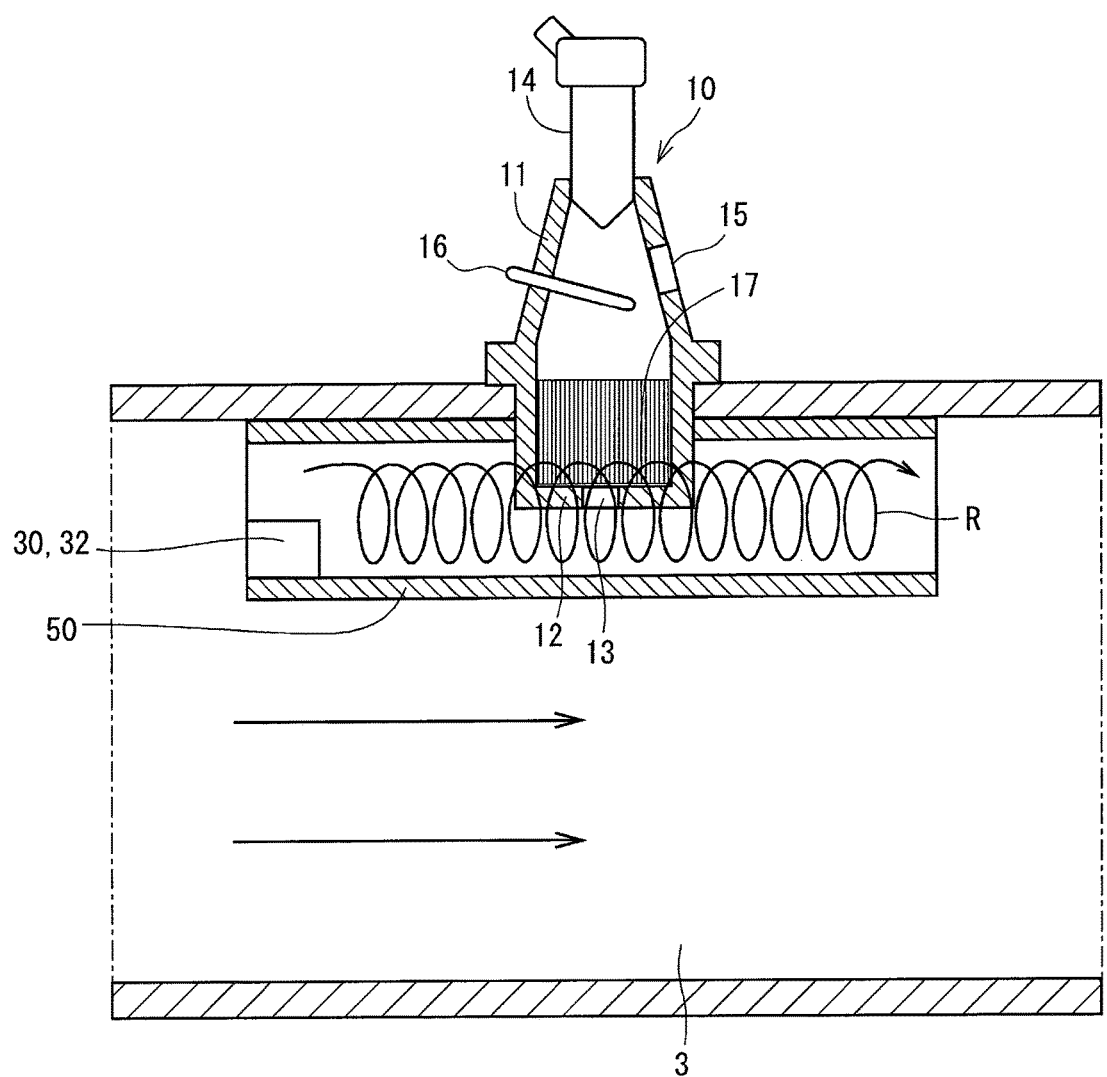
FIG. 22 is a partial section view of an exhaust emission control apparatus according to a 17th embodiment of the present disclosure.

A 17th embodiment of the present disclosure will be shown in FIG. 22. The exhaust emission control apparatus 1 of the 17th embodiment has a small tube 50 provided on the inside of the exhaust passage 3. In the 17th embodiment, the gas pressure reduction part 30 is a protruding part 32 provided on the inner wall of the small tube 50. As shown by an arrow R in FIG. 22, a swirl is generated on the downstream side of the protruding part 32 on the inside of the small tube 50.

The supply port 13 of the supply device 10 communicates with a flow passage on the inside of the small tube 50. For this reason, the reducing agent is sucked out from the supply port 13 of the supply device 10 to the center of the swirl generated on the inside of the small tube 50.

In the 17th embodiment, the gas pressure on the upstream side of the small tube 50 can be restrained from being increased in the exhaust passage 3 by the small tube 50 being provided at a portion of the exhaust passage 3.

Further, in the 17th embodiment, since the swirl is generated in the flow passage on the inside of the small tube 50, the gas pressure at the center of the swirl can be greatly reduced and a supply amount of the reducing agent supplied to the exhaust passage 3 from the supply device 10 can be increased.

Still further, in the 17th embodiment, the gas pressure reduction part 30 and the small tube 50 are combined with each other to make an assembly and the assembly can be easily fixed to the exhaust passage 3.

In this regard, in the 17th embodiment, the protruding part 32 as the gas pressure reduction part 30 is provided on the inside of the small tube 50. In place of this, the exhaust emission control apparatus 1 may have the configuration as the gas pressure reduction part 30, which is described in the first embodiment to the 16th embodiment, provided on the inside of the small tube 50.

18th Embodiment

Figure 23:
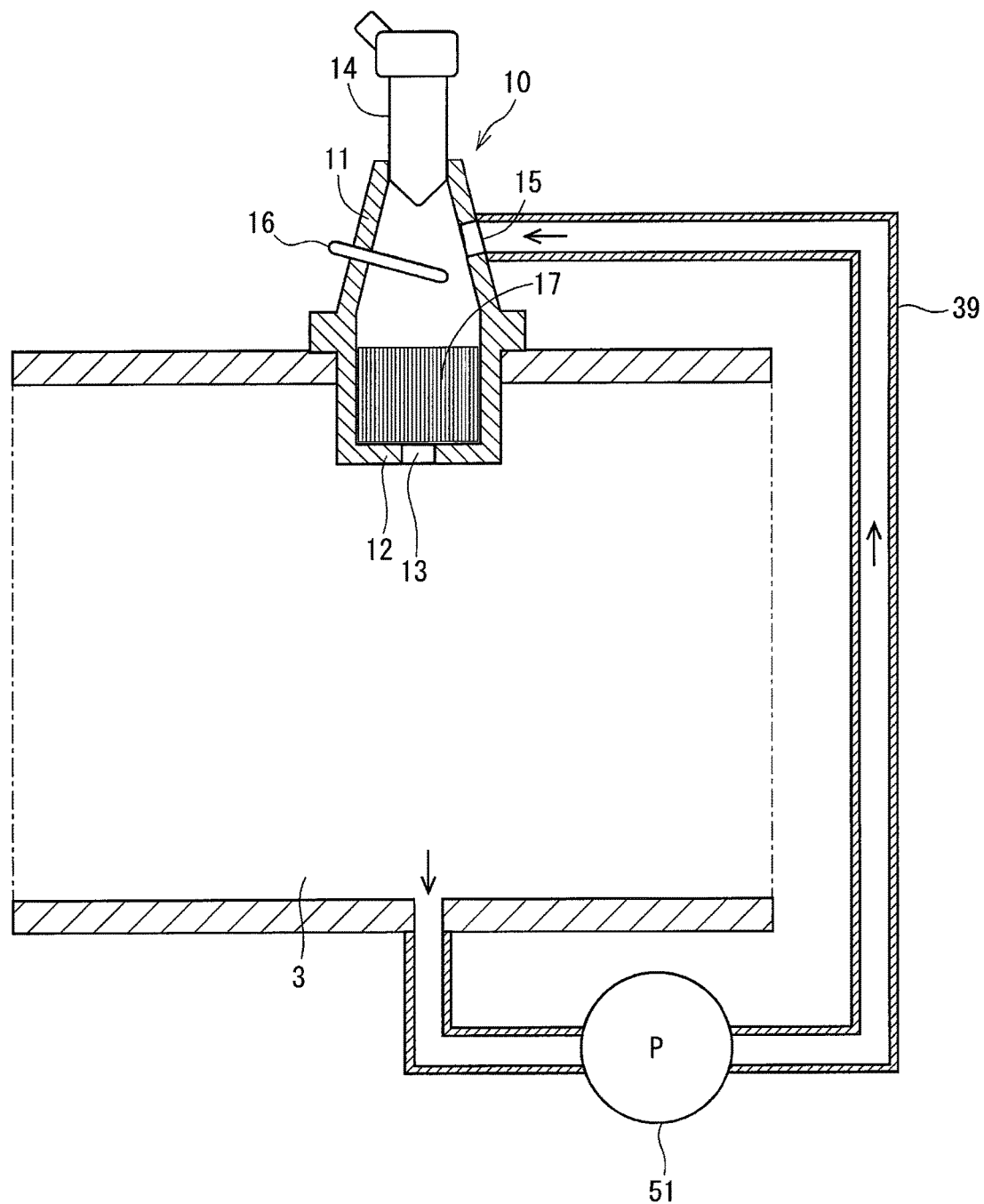
FIG. 23 is a partial section view of an exhaust emission control apparatus according to an 18th embodiment of the present disclosure.

An 18th embodiment of the present disclosure will be shown in FIG. 23. The exhaust emission control apparatus 1 of the 18th embodiment is provided with an introduction passage 39 and a pump 51.

The introduction passage 39 has one end coupled to the gas introduction port 15 of the supply device body 11 and has the other end coupled to the exhaust passage 3.

The pump 51 is provided in the introduction passage 39 and introduces the exhaust gas sucked out from the exhaust passage 3 into the supply device body 11. In this way, the gas pressure on the inside of the supply device body 11 is increased and hence the reducing agent is supplied to the exhaust passage 3 from the supply device 10.

Further, at the portion in which the other end of the introduction passage 39 is coupled to the exhaust passage 3, the exhaust gas is sucked out to the introduction passage 39 and hence the gas pressure is reduced. For this reason, the amount of the reducing agent supplied to the exhaust passage 3 from the supply device 10 can be increased.

Further, in the 18th embodiment, the pump 51 supplies the exhaust gas of the exhaust passage 3 to the supply device body 11, so that the amount of work of the pump 51 can be reduced. Hence, the exhaust emission control apparatus 1 can use the pump 51 of a smaller size. Further, the exhaust emission control apparatus 1 can reduce the power consumption of the pump 51.

19th Embodiment

Figure 24:
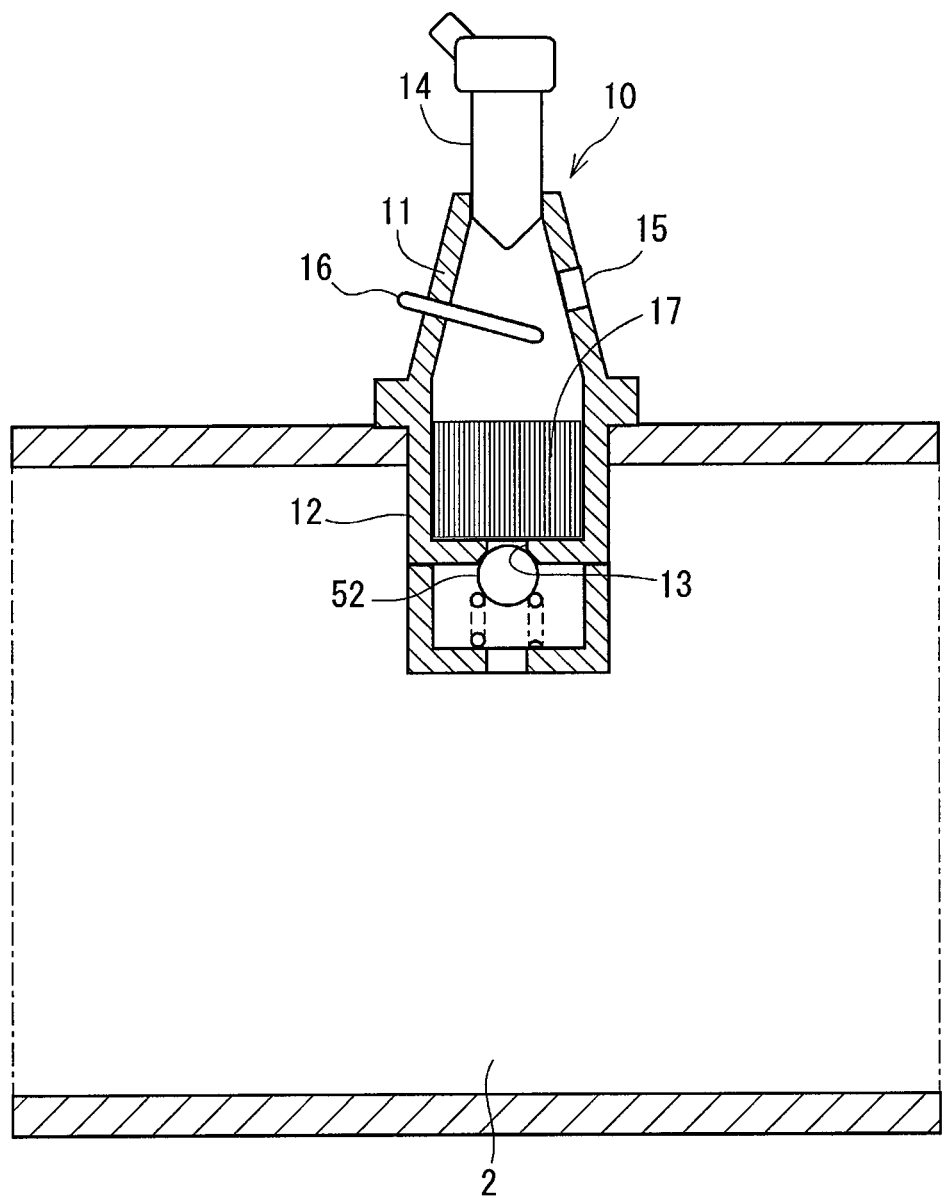
FIG. 24 is a partial section view of an exhaust emission control apparatus according to a 19th embodiment of the present disclosure.

A 19th embodiment of the present disclosure will be shown in FIG. 24. An exhaust emission control apparatus 1 of the 19th embodiment has a check valve 52 provided at the supply port 13 of the supply device 10. The check valve 52 allows the reducing agent to flow out to the exhaust passage 3 from the inside of the supply part 10. Further, the check valve 52 inhibits the exhaust gas from flowing to the inside of the supply device 10 from the exhaust passage 3.

In the 19th embodiment, it is possible to prevent the exhaust gas from flowing into the inside of the supply device 10 from the exhaust passage 3 by the pulsation of the exhaust gas which is caused when an exhaust valve provided in the internal combustion engine 2 is opened or closed.

Further, in the 19th embodiment, it is also possible to discharge the reducing agent to the exhaust passage 3 from the supply device 10 by using the pulsation of the exhaust gas.

Comparative Example

Figure 25:
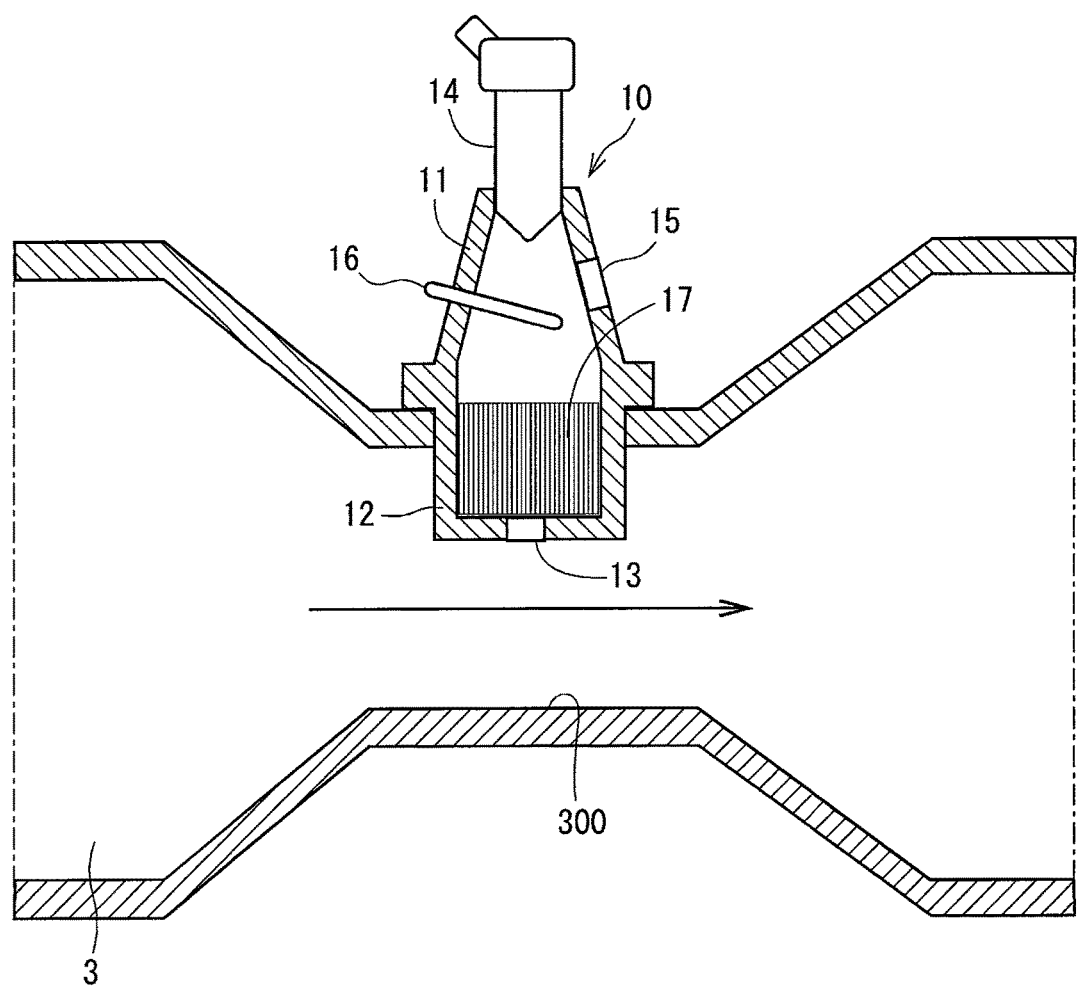
FIG. 25 is a partial section view of an exhaust emission control apparatus of a comparative example.

A comparative example to the present disclosure will be shown in FIG. 25. An exhaust emission control apparatus of the comparative example has an entire inner wall of an exhaust passage 3 formed of a venturi tube 300. The venturi tube 300 can increase a flow speed of an exhaust gas flowing on the inside thereof. A supply port 13 of a supply device 10 is formed at a portion in which a flow speed of the exhaust gas is made faster by the venturi tube 300. For this reason, a reducing agent is sucked out to the exhaust passage 3 from the supply device 10 by a reduction in a gas pressure caused by the flow speed of the exhaust gas being made faster.

However, in the configuration of the comparative example, the exhaust passage 3 has an entire cross section thereof formed of the venturi tube 300, so that the gas pressure on the upstream side of the venturi tube 300 is considered to be increased. Hence, the output of an internal combustion engine 2 is liable to be reduced.

In contrast to this, in the configurations of the first to 19th embodiments of the present disclosure, the gas pressure on the upstream side of the gas pressure reduction part 30 is restrained from being increased, so that the output of the internal combustion engine 2 is not liable to be reduced.

(1) In the embodiments described above, the NOx occlusion reduction catalyst is given as an example of the catalyst 20. In contrast to this, in the other embodiment, various kinds of catalysts such as a selective catalytic reduction (SCR) catalyst, a diesel oxidation catalyst (DOC), or a diesel PM-NOx reduction (DPNR) catalyst can be employed as the catalyst 20.

(2) In the embodiments described above, the reformed gas containing the aldehyde and the like which are produced by oxidizing the fuel is given as the example of the reducing agent. In contrast to this, in the other embodiment, various kinds of reducing agents such as the fuel or urea can be employed according to components contained in the exhaust gas and the material of the catalyst.

In this way, the present disclosure is not limited to the embodiments described above but can be carried out not only in a combination of the plurality of embodiments described above but also in various modes within a range not departing from the gist of the present invention.

20th Embodiment

Figure 26:
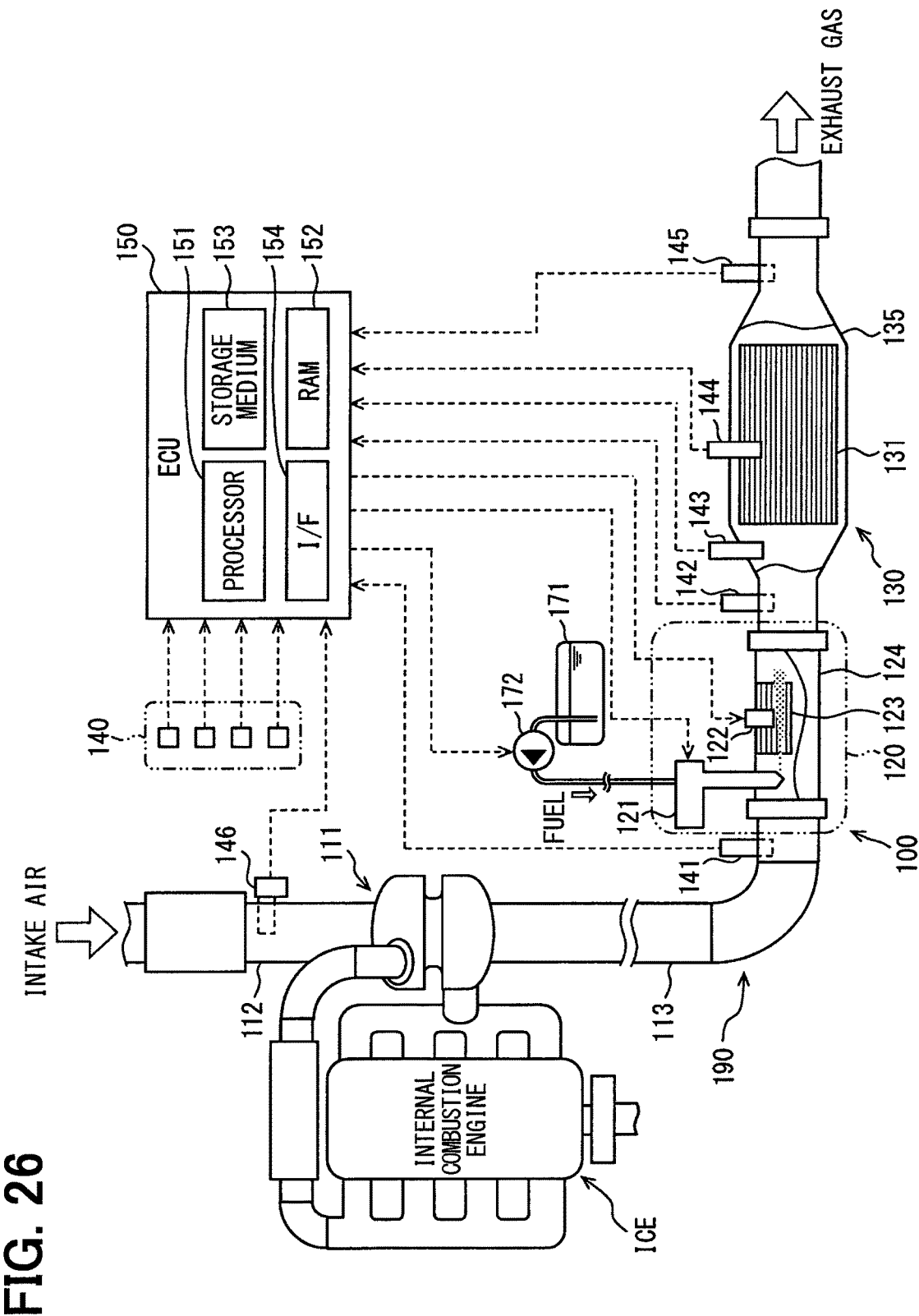
FIG. 26 is a general configuration, which is shown together with an internal combustion engine, of an exhaust emission control system according to a 20th embodiment.

An exhaust emission control system 100 according to a 20th embodiment shown in FIG. 26 is mounted in a vehicle together with an internal combustion engine ICE and the like. The internal combustion engine ICE is a diesel engine of a compression self-ignition type and a power source for driving the vehicle. The internal combustion engine ICE generates power by burning light oil.

The internal combustion engine ICE has an intake pipe 112 and an exhaust pipe 113 coupled to a supercharger 111 thereof. The intake pipe 112 forms an intake passage to make air flow into a compressor part of the supercharger 111. The exhaust pipe 113 forms an exhaust passage to make an exhaust gas flow into an exhaust emission control system 100 from a turbine part of the supercharger 111.

Here, in the following description, an upstream side and a downstream side are specified on the basis of a direction in which the air and the exhaust gas flows. In other words, the upstream side in the intake pipe 112 designates a side close to the compressor part, and the downstream side in the exhaust pipe 113 designates a side close to the turbine part.

The exhaust emission control system 100 is provided in an exhaust system 190 of the internal combustion engine ICE. The exhaust emission control system 100 is an aftertreatment system to purify substances generated by the combustion of the light oil in the internal combustion engine ICE. The exhaust emission control system 100 decomposes nitrogen oxide (NOx) in particular among substances contained in the exhaust gas emitted from the internal combustion engine ICE into nitrogen ($N_2$) to thereby purify the exhaust gas. The exhaust emission control system 100 is provided with a fuel reformation device 120, a NOx purification device 130, and an engine control unit (ECU) 150.

The fuel reformation device 120 is provided in the middle of the exhaust pipe 113. In the exhaust pipe 113, an aftertreatment device such as an oxidation catalyst and a diesel particulate trap filter are further provided between the supercharger 111 and the fuel reformation device 120.

The fuel reformation device 120 reforms the fuel (light oil) to thereby generate a reformed fuel. The reformed fuel is a material containing oxygen and is a reducing agent used for reducing NOx in a NOx purification device 130. The fuel used for generating the reducing agent by the fuel reformation device 120 is shared with the fuel used for generating power in the internal combustion engine ICE. The fuel reformation device 120 supplies the NOx purification device 130 with the reducing agent through the exhaust passage. The fuel reformation device 120 has a fuel injection valve 121, a housing 124, a temperature elevation part 122, and a reforming catalyst 123.

The fuel injection valve 121 is arranged at a position on the upstream side of the reforming catalyst 123 and is fixed to the exhaust pipe 113 or the housing 124. The fuel injection valve 121 is coupled to a fuel pump 172. The fuel injection valve 121 is supplied with the fuel stored in a fuel tank 171 by the fuel pump 172 being operated. The fuel injection valve 121 generates an electromagnetic force in an electromagnetic solenoid to thereby inject the fuel from a plurality of injection holes facing the exhaust passage. The fuel injection valve 121 supplies the fuel, which is passed through the injection holes and is atomized, to the reforming catalyst 123.

The housing 124 is formed of a thin metal plate in the shape of a container. The housing 124 houses the temperature elevation part 122 and the reforming catalyst 123. The housing 124 is coupled to the exhaust pipe 113 and forms a portion of the exhaust passage.

The temperature elevation part 122 is a heating body to generate heat when supplied with electric power. The temperature elevation part 122 is arranged integrally with the reforming catalyst 123. The quantity of heat generated by the temperature elevation part 122 is transmitted to the reforming catalyst 123 to thereby elevate the temperature of the reforming catalyst 123. The temperature elevation part 122 indirectly elevates the temperature of the fuel injected by the fuel injection valve 121, thereby bringing the fuel into a state in which the fuel is easily activated.

The reforming catalyst 123 is, for example, a monolith catalyst made by coating cordierite, which is formed for example in the shape of a honeycomb, with zeolite or aluminum oxide ($Al_2O_3$, hereinafter referred to as alumina).

Hydrocarbon that is a main component of the fuel is partially oxidized by a catalytic action of the reforming catalyst 123. As the result, the reforming catalyst 123 is supplied with the reformed fuel, in which partial oxide (for example, aldehyde) oxidized to an aldehyde group (CHO) or carbon monoxide (CO) and hydrogen ($H_2$) function as a reducing agent, from the fuel reformation device 120.

The NOx purification device 130 is constructed of a NOx catalyst 131, a housing 135, which houses the NOx catalyst 131 and is made of metal, and the like. The NOx catalyst 131 is a monolith catalyst which has a carrier 132 and a catalytic metal 133 and which is formed in the shape of a honeycomb. The carrier 132 is made of, for example, alumina or the like. The carrier 132 becomes a base material to carry the catalytic metal 133. The catalytic metal 133 is, for example, silver (Ag). The catalytic metal 133 is positioned on the surface of the carrier 132 and accelerates the reduction reaction of NOx.

In this regard, for the carrier 132 can be used not only alumina described above but also one substance or a plurality of substances of zeolite, silica, titania, ceria, and zirconia. Further, for the catalytic metal 133 can be used not only silver described above but also copper (Cu), platinum (Pt), palladium (Pd), nickel (Ni), iridium (Ir), and radium (Ra). Further, cobalt (Co), osmium (Os), ruthenium (Ru), iron (Fe), rhenium (Re), technetium (Tc), manganese (Mn), and titanium (Ti) may be used for the catalytic metal 133. In addition, the metals described above may be carried by the carrier 132 in the state of oxide. Further, a plurality of metals described above may be carried by the carrier 132 in the state of a simple substance or an oxide.

In the case where a catalyst temperature is low (less than approximately 200° C.), the NOx catalyst 131 adsorbs NOx in the exhaust gas flowing into the NOx purification device 130. The NOx catalyst 131 adsorbs NOx in a plurality of adsorption states. The NOx catalyst 131 changes the adsorption states in sequence according to the total amount of NOx adsorbed by the carrier 132 and the catalytic metal 133.

Figure 27:
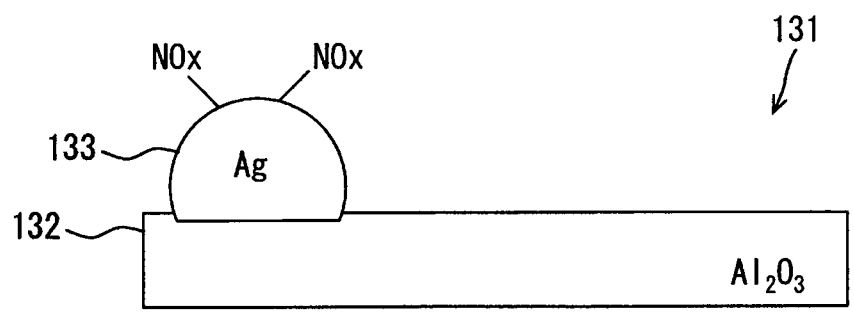
FIG. 27 schematically illustrates an adsorption state of a NOx catalyst.
Figure 28:
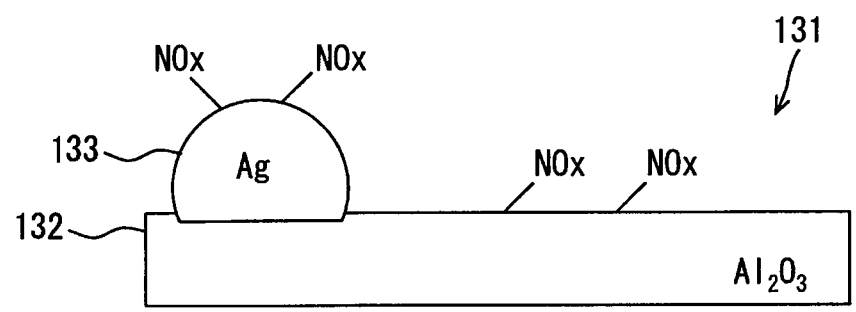
FIG. 28 schematically illustrates another adsorption state of a NOx catalyst.
Figure 29:
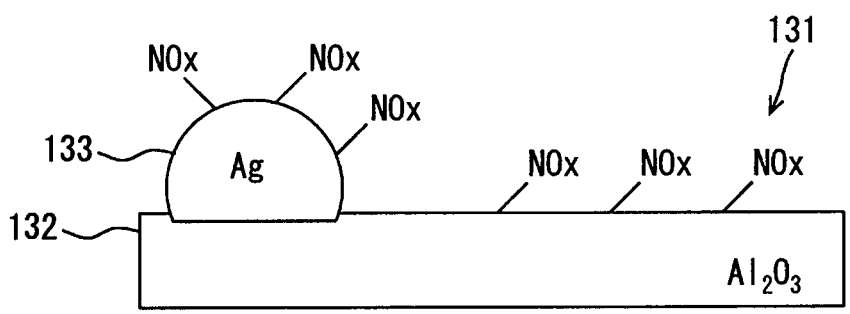
FIG. 29 schematically illustrates still another adsorption state of a NOx catalyst.

When describing in detail the adsorption states, as shown in FIG. 27, in the case where the amount of NOx adsorbed by the NOx catalyst 131 is small, NOx newly flowing into the NOx catalyst 131 is first adsorbed mainly only by the catalytic metal 133 among the catalytic metal 133 and the carrier 132. Then, when the adsorption amount of NOx adsorbed by the catalytic metal 133 is increased, as shown in FIG. 28, NOx, which further newly flows into the NOx catalyst 131, starts to be adsorbed mainly by the carrier 132 among the catalytic metal 133 and the carrier 132. When the adsorption amount of NOx is further increased from this state, as shown in FIG. 29, NOx, which still further newly flows into the NOx catalyst 131, is adsorbed by both of the catalytic metal 133 and the carrier 132.

In the case where the catalyst temperature becomes higher (approximately 200° C. or more), the NOx catalyst 131 desorbs the adsorbed NOx. The desorbed NOx reacts with the reformed fuel supplied from the fuel reformation device 120 by the catalytic action of the NOx catalyst 131. The reformed fuel functions as a reducing agent, whereby NOx is reduced to nitrogen. Although the exhaust gas contains not only NOx but also oxygen ($O_2$), the reformed fuel selectively reacts with NOx also in the presence of oxygen.

Figure 30:
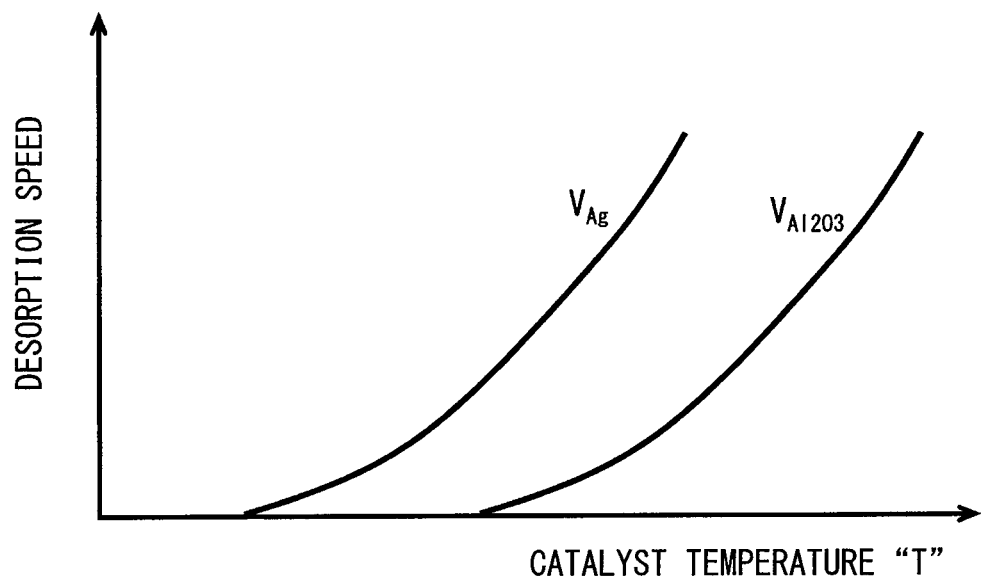
FIG. 30 is a graph to show a correlation between a catalyst temperature and a desorption speed for each of a catalytic metal and a carrier.

The desorption amount of NOx desorbed from the NOx catalyst 131, as shown by desorption characteristic data in FIG. 30, is increased as the catalyst temperature is increased. In addition, the desorption characteristic of NOx is different between the carrier 132 and the catalytic metal 133. Desorption of NOx from the catalytic metal 133 is started at a lower catalyst temperature than desorption of NOx from the carrier 132. Further, a desorption speed of NOx from the catalytic metal 133 is higher than a desorption speed of NOx from the carrier 132.

The ECU 150 is a control unit that comprehensively performs a control relating to the internal combustion engine ICE. The ECU 150 is constructed mainly of a microcomputer including a processor 151, a RAM 152, a storage medium 153, and an input/output interface 154 of a measurement signal and a control signal. The ECU 150 is coupled to a plurality of in-vehicle sensors 140. The in-vehicle sensors 140 include sensors that sense operating information of a driver, which is inputted to an accelerator and a steering wheel, and sensors that sense driving information relating to the internal combustion engine ICE such as a revolution speed and an intake temperature. In addition, the ECU 150 has not only the fuel injection valve 121, the temperature elevation part 122, and the fuel pump 172 but also exhaust gas sensors 141, 142, an exhaust temperature sensor 143, a catalyst temperature sensor 144, a NOx sensor 145, and an airflow meter 146 coupled thereto as configurations relating to an after-treatment.

Each of the exhaust gas sensors 141, 142 is constructed of a combination of an $O_2$ sensor, which outputs a signal responsive to an oxygen concentration in the exhaust gas, and a NOx sensor which outputs a signal responsive to a NOx concentration in the exhaust gas. The exhaust gas sensor 141 is arranged on the upstream side of the reforming catalyst 123 and senses the oxygen concentration and the NOx concentration in the exhaust gas flowing into the reforming catalyst 123. The exhaust gas sensor 142 is arranged on the downstream side of the reforming catalyst 123 and senses the oxygen concentration and the NOx concentration in the exhaust gas flowing into the NOx catalyst 131.

Each of the exhaust temperature sensor 143 and the catalyst temperature sensor 144 is a thermocouple or a thermistor. The exhaust temperature sensor 143 is arranged on the upstream side of the NOx catalyst 131 and outputs a measurement signal responsive to the temperature of the exhaust gas flowing into the NOx catalyst 131. The catalyst temperature sensor 144 is fixed to the housing 135 and outputs a measurement signal responsive to the catalyst temperature of the NOx catalyst 131. The NOx sensor 145 is arranged on the downstream side of the NOx catalyst 131 and outputs a measurement signal responsive to the NOx concentration in the exhaust gas passing through the NOx catalyst 131.

The airflow meter 146 is provided in the intake pipe 112. The airflow meter 146 is a sensor having a platinum heating wire and outputs a measurement signal responsive to a flow speed of air flowing in the intake passage. A flow rate of an intake air supplied to the internal combustion engine ICE is acquired by the ECU 150 on the basis of the measurement signal of the airflow meter 146.

Figure 31:
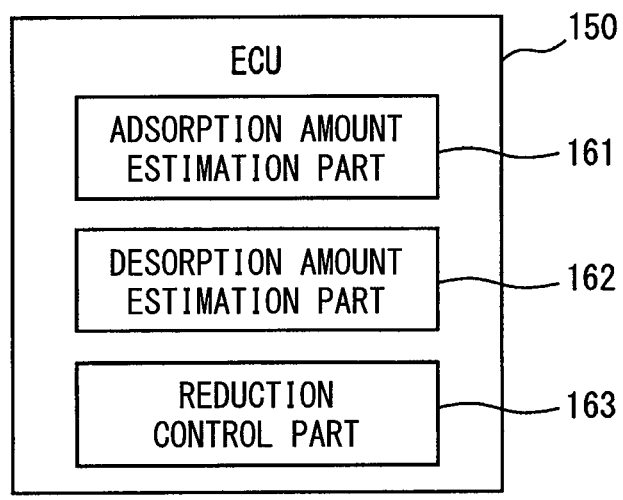
FIG. 31 illustrates function blocks for an after-treatment constructed in an ECU.

The ECU 150 performs an exhaust emission control processing program by the processor 151, thereby constructing an adsorption amount estimation part 161, a desorption amount estimation part 162, and a reduction control part 163, which are shown in FIG. 31, as function blocks relating to an after-treatment of NOx. Hereinafter, each of the function blocks constructed in the ECU 150 will be described in detail on the basis of FIG. 31 and FIG. 26.

The adsorption amount estimation part 161 estimates an adsorption amount of NOx adsorbed by the NOx catalyst 131 by an adsorption amount estimation processing (see FIG. 35), which will be described later, by a method corresponding to each adsorption state of the NOx catalyst 131. As described above, the NOx catalyst 131 switches the adsorption state according to the total amount of adsorbed NOx, in other words, according to the adsorption amount of NOx adsorbed by each of the catalytic metal 133 and the carrier 132. Hence, the adsorption amount estimation part 161 individually calculates the adsorption amount of NOx adsorbed by each of the catalytic metal 133 and the carrier 132 of the NOx catalyst 131 and switches an adsorption state to be assumed according to the calculated adsorption amount of NOx.

Specifically, the adsorption amount estimation part 161 has a first threshold value a1 and a second threshold value a2 previously set therein. The first threshold value a1 is a threshold value to indicate a critical point in which a material to absorb NOx newly flowing into the NOx catalyst 131 is switched from the catalytic metal 133 to the carrier 132. The second threshold value a2 is a threshold value to indicate a critical point in which a material to absorb NOx further newly flowing into the NOx catalyst 131 is switched from the carrier 132 to both of the catalytic metal 133 and the carrier 132.

Firstly, in the case where the adsorption amount of NOx adsorbed by the catalytic metal 133 is less than the first threshold value a1, on the assumption of an adsorption state in which all NOx newly flowing into the NOx catalyst 131 is actually adsorbed by the catalytic metal 133, the adsorption amount estimation part 161 estimates the adsorption amount of NOx adsorbed by the catalytic metal 133 (see FIG. 27). In this case, the adsorption amount of NOx adsorbed by the catalytic metal 133 is actually equal to the total adsorption amount of NOx in the NOx catalyst 131.

Further, in the case where the adsorption amount of NOx adsorbed by the catalytic metal 133 is not less than the first threshold value a1, on the assumption of an adsorption state in which all NOx newly flowing into the NOx catalyst 131 is adsorbed by the carrier 132, the adsorption amount estimation part 161 estimates the adsorption amount of NOx adsorbed by the carrier 132 (see FIG. 28). The adsorption amount estimation part 161 continuously assumes the adsorption state in which NOx is adsorbed by the carrier 132 until the adsorption amount of NOx adsorbed by the carrier 132 becomes not less than the second threshold value a2.

Then, in the case where the adsorption amount of NOx adsorbed by the carrier 132 is not less than the second threshold value a2, on the assumption of an adsorption state in which NOx newly flowing into the NOx catalyst 131 is adsorbed by both of the catalytic metal 133 and the carrier 132, the adsorption amount estimation part 161 estimates the adsorption amount of NOx adsorbed by both of the catalytic metal 133 and the carrier 132 (see FIG. 29). In this case, a ratio in which NOx is adsorbed by each of the catalytic metal 133 and the carrier 132 (hereinafter referred to as an adsorption ratio) is controlled by the adsorption amount estimation part 161 according to the adsorption state of the NOx catalyst 131. Detection parameters used for determining the adsorption ratio include the catalyst temperature of the NOx catalyst 131, the flow rate of the exhaust gas flowing into the NOx catalyst 131 (hereinafter referred to as a catalyst inflow gas), the oxygen concentration, the NOx concentration, and the adsorption amount of NOx already adsorbed by the catalytic metal 133 and the carrier 132.

The desorption amount estimation part 162 performs a desorption amount estimation processing (see FIG. 34), which will be described later, thereby estimating a desorption amount of NOx desorbed from the NOx catalyst 131. An estimation of the desorption amount by the desorption amount estimation part 162 is performed on the basis of the adsorption amount of NOx adsorbed by each of the catalytic metal 133 and the carrier 132, which is estimated by the adsorption amount estimation part 161. When describing in detail, the desorption characteristic of NOx from the NOx catalyst 131, as described above, is different between the catalytic metal 133 and the carrier 132. The desorption speed of NOx from each of the catalytic metal 133 and the carrier 132 can be calculated on the basis of the following mathematical expressions 1, 2.

$$v_{Ag} \propto \alpha_{Ag}[NOx]_{Ag} e^{-\frac{E_{Ag}}{RT}} \quad \text{[Mathematical expression 1]}$$

$$v_{Al2O3} \propto \alpha_{Al2O3}[NOx]_{Al2O3} e^{-\frac{E_{Al2O3}}{RT}} \quad \text{[Mathematical expression 2]}$$

In the mathematical expressions described above, a is an appropriate parameter and [NOx] is the adsorption amount of NOx and E is an activation energy and R is a gas constant and T is a catalyst temperature. An individual estimated value estimated by the adsorption amount estimation part 161 is used for [NOx], and a value measured by the catalyst temperature sensor 144 is used for T. Then, the desorption amount of NOx from the NOx catalyst 131 is calculated by the following mathematical expression 3.

$$\text{Desorption amount of NOx} = \int v_{Ag} + v_{Al2O3} \quad \text{[Mathematical expression 3]}$$

Figure 33:
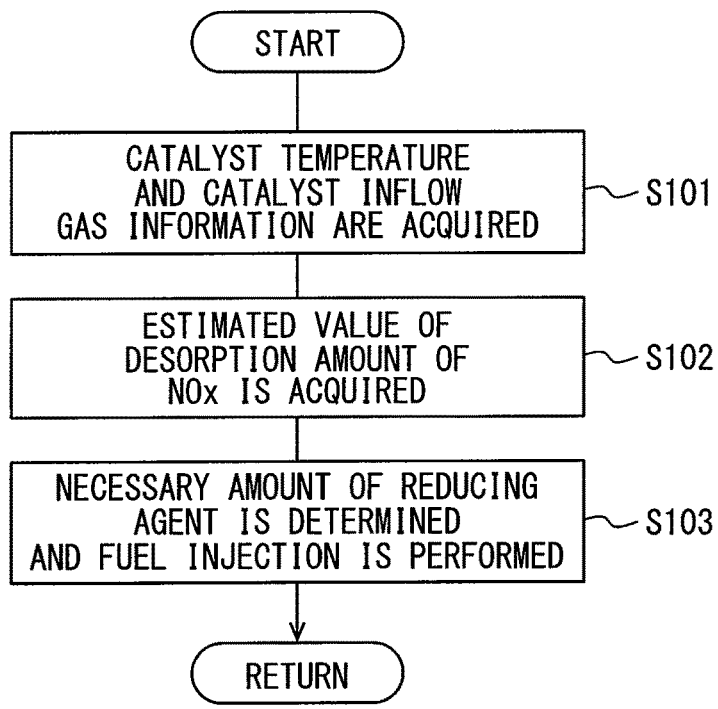
FIG. 33 is a flow chart to show a main processing performed by a reduction control part.

The reduction control part 163 performs a reduction control processing (see FIG. 33), which will be described later, thereby setting the supply amount of the reformed fuel supplied to the NOx catalyst 131 from the fuel reformation device 120 by the use of the desorption amount of NOx estimated by the desorption amount estimation part 162. For this reason, the reduction control part 163 acquires the catalyst temperature and the information of the catalyst inflow gas. The information of the catalyst inflow gas includes, for example, a gas flow rate, an oxygen concentration, and a NOx concentration. In this regard, to the gas flow rate is diverted the value of the intake flow rate based on the measurement of the airflow meter 146.

Figure 32:
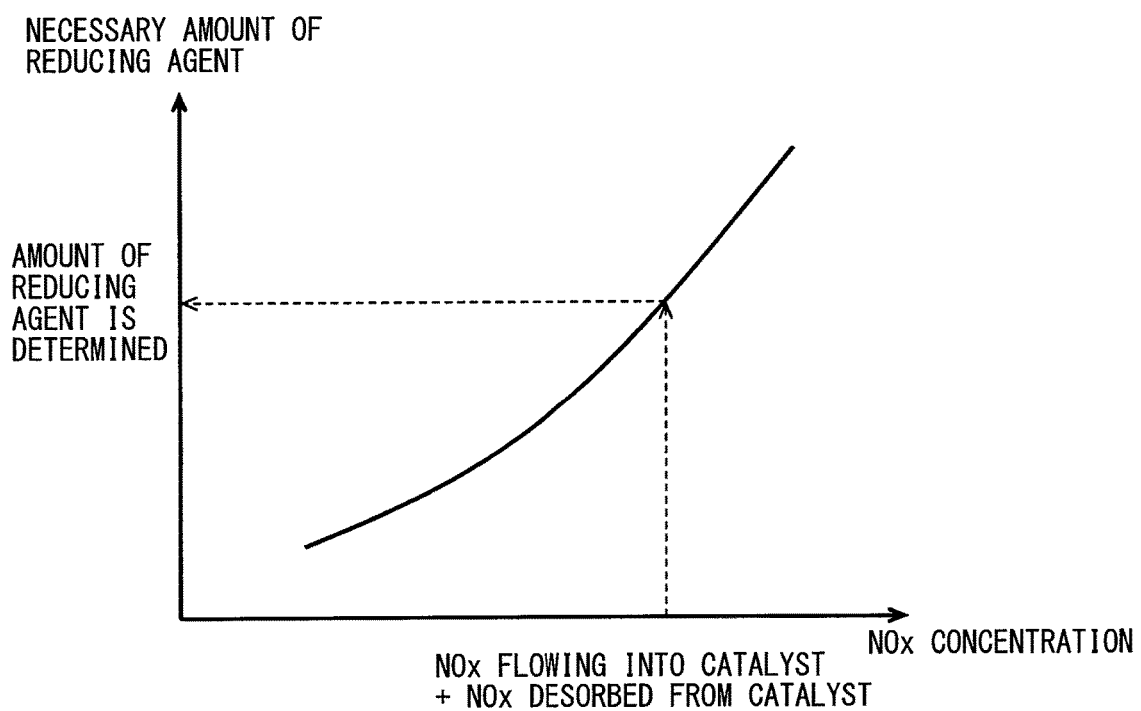
FIG. 32 is a graph to show a supply amount setting map used for determining a supply amount of a reducing agent from a NOx concentration.

The reduction control part 163 sets the supply amount of the reformed fuel on the basis of a supply amount setting map (see FIG. 32) stored in a storage medium 153. The supply amount setting map is a control map to show a correlation between the NOx concentration in the exhaust gas and an amount of reducing agent necessary for reducing NOx contained in the exhaust gas. A plurality of supply amount setting maps are made for each of the catalyst temperature, the gas flow rate, and the oxygen concentration and are stored in the storage medium 153.

When the reduction control part 163 sets the supply amount of the reducing agent, the reduction control part 163 selects the supply amount setting map corresponding to the newest catalyst temperature, the newest gas flow rate, and the newest oxygen concentration. In addition, the reduction control part 163 estimates the NOx concentration in the NOx purification device 130 by the use of the estimated desorption amount of NOx and the gas flow rate and the NOx concentration of the catalyst inflow gas. Then, the reduction control part 163 determines an amount of reducing agent corresponding to the estimated NOx concentration on the basis of the selected supply amount setting map.

The reduction control part 163 controls the supply of the reformed fuel by the fuel reformation device 120 in such a way that the determined reducing agent amount is to be supplied to the NOx catalyst 131. The reduction control part 163 increases or decreases a fuel amount supplied to the exhaust passage by the control signal outputted to the fuel injection valve 121 and the fuel pump 172. Further, the reduction control part 163 elevates the temperature of the reforming catalyst 123 by the control signal outputted to the temperature elevation part 122. A level of activity of the reformed fuel passing the reforming catalyst 123 is controlled by this control of the temperature elevation part 122.

In addition, in the case where an abnormal value of the NOx concentration is sensed by the NOx sensor 145 arranged on the downstream side of the NOx catalyst 131, the reduction control part 163 starts an urgent forcible desorption control. The abnormal value is a value of the NOx concentration set in advance and a value, for example, in the case of assuming a scene in which a large amount of NOx is emitted by an abnormal operation of the internal combustion engine ICE. As described above, in the case where the large amount of NOx is emitted, a large error is liable to be caused in a cumulative value of the adsorption amount of NOx calculated by the adsorption amount estimation part 161. Hence, the reduction control part 163 increases the supply amount of the reducing agent supplied by the fuel reformation device 120 in order not only to reduce NOx in the exhaust gas but also to actually desorb all NOx adsorbed by the NOx catalyst 131. As described above, the adsorption amount estimation part 161 can once reset the estimation of the adsorption amount of NOx.

Next, each processing performed by each of the adsorption amount estimation part 161, the desorption amount estimation part 162, and the reduction control part 163 is arranged and will be described on the basis of flow charts shown in FIGS. 33 to 35 and FIG. 37 with reference to FIG. 26 and FIG. 31. First, on the basis of the flow chart in FIG. 33, the reduction control processing will be described in detail. When the operation of the internal combustion engine ICE is started, the reduction control processing is started by the reduction control part 163 and then is repeatedly performed until the internal combustion engine ICE is stopped.

In S101, the catalyst temperature and the catalyst inflow gas information are acquired, and then a procedure proceeds to S102. In S102, the estimated value of the desorption amount of NOx estimated by the desorption amount estimation processing (see FIG. 34), which will be described later, is acquired from the desorption amount estimation part 162, and then the procedure proceeds to S103. In S103, the necessary supply amount of the reducing agent is determined by the use of the supply amount setting map (see FIG. 32). Then, the fuel injection valve 121 is made to perform a fuel injection by which the reducing agent of the determined supply amount is supplied to the NOx catalyst 131, and then the procedure returns to S101.

Next, the desorption amount estimation processing for calculating an estimated value which is acquired in S102 of the reduction control processing will be described in detail on the basis of the flow chart shown in FIG. 34. When the operation of the internal combustion engine ICE is started, the desorption amount estimation processing is started by the desorption amount estimation part 162 and is repeatedly performed until the internal combustion engine ICE is stopped.

In S111, just like S101, the catalyst temperature and the catalyst inflow gas information are acquired, and then the procedure proceeds to S112. In S112, the adsorption state of NOx and the estimated value of the adsorption amount of NOx, which are estimated by the adsorption amount estimation processing (see FIG. 35), which will be described later, are acquired from the adsorption amount estimation part 161, and then the procedure proceeds to S113. In S113, the desorption amount of NOx desorbed from the NOx catalyst 131 is estimated on the basis of the mathematical expressions 1 to 3 described above, and then the procedure returns to S111. The estimated value of the desorption amount in S113 is acquired by the desorption amount estimation part 162 in S102.

Figure 35:
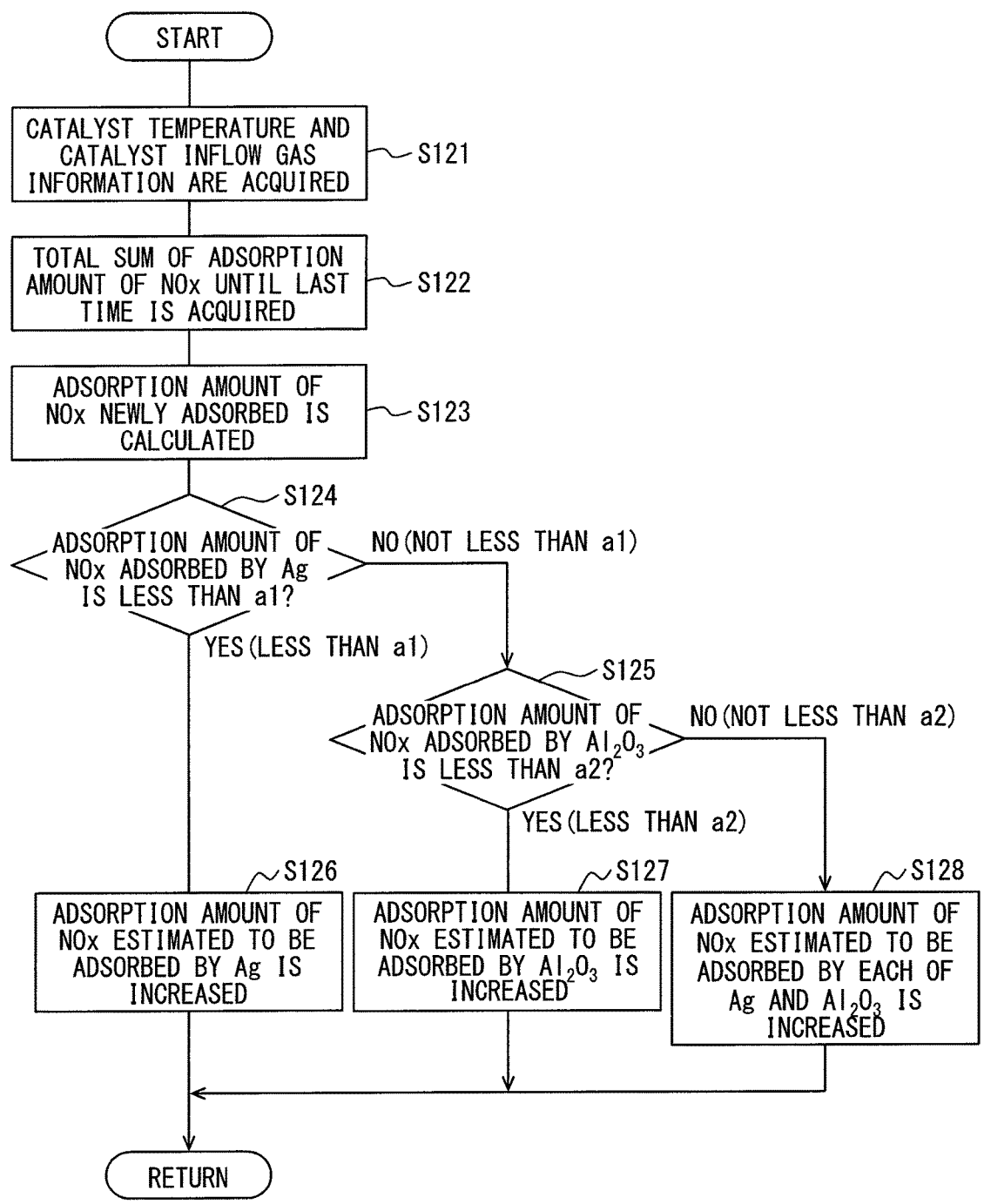
FIG. 35 is a flow chart to show an adsorption amount estimation processing performed by an adsorption amount estimation part.

Next, the adsorption amount estimation processing for calculating an estimated value, which is acquired by in S112 of the desorption amount processing, will be described in detail on the basis of the flow chart shown in FIG. 35. When the operation of the internal combustion engine ICE is started, the adsorption amount estimation processing is started by the adsorption amount estimation part 161 and is repeatedly performed until the internal combustion engine ICE is stopped.

In S121, just like S101, the catalyst temperature and the catalyst inflow gas information are acquired, and then the procedure proceeds to S122. In S122, the total adsorption amount of NOx estimated by the adsorption amount estimation processing until the last time is acquired, and then the procedure proceeds to S123.

Figure 36:
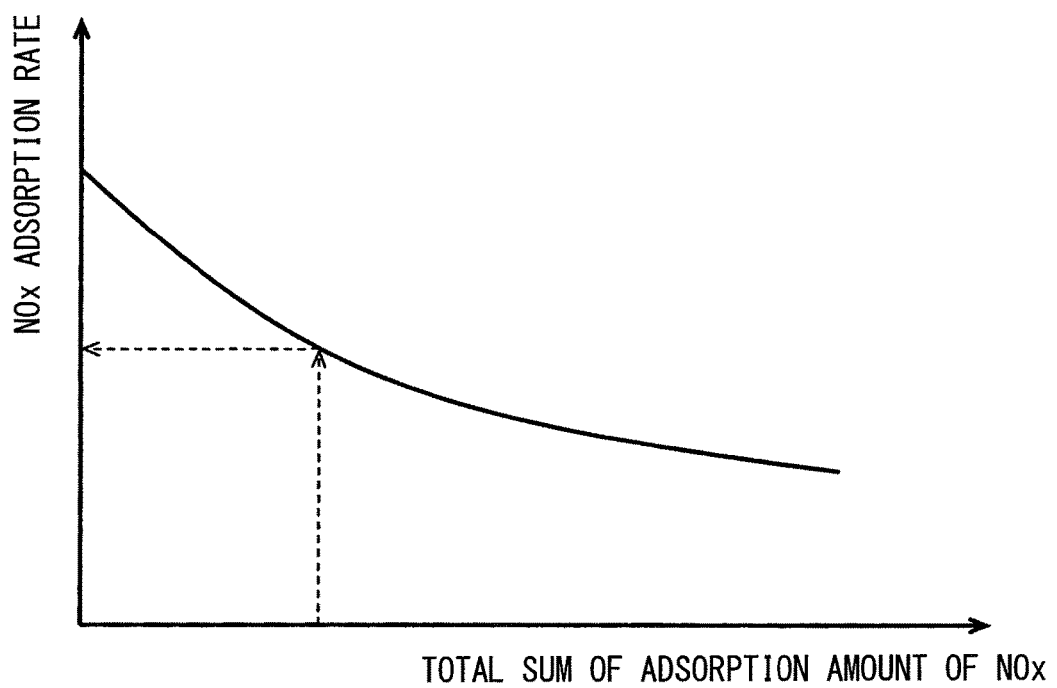
FIG. 36 is a graph to show an adsorption ratio calculation map used for calculating a NOx adsorption ratio of a NOx catalyst from a total sum of NOx adsorbed by a NOx catalyst.

In S123, the adsorption amount of NOx newly adsorbed is calculated, and the procedure proceeds to S124. In S123, an adsorption rate calculation map shown in FIG. 36 is used. In the adsorption rate calculation map is shown a correlation between the total amount of NOx adsorbed by the NOx catalyst 131 and a NOx adsorption rate of the NOx catalyst 131 at that time. A plurality of adsorption rate calculation maps are made in advance for each of the gas flow rate of the catalyst inflow gas, the NOx concentration, and the oxygen concentration and are stored in the storage medium 153. In S123, the adsorption rate calculation map corresponding to the present state of the NOx catalyst 131 is selected on the basis of the catalyst inflow gas information acquired in S121. Then, an adsorption rate of NOx is determined from the total adsorption amount of NOx acquired in S122 on the basis of the selected adsorption rate calculation map. Further, the adsorption amount of NOx which is to be newly adsorbed by the NOx catalyst 131 this time is calculated on the basis of the flow rate and the NOx concentration of the exhaust gas which are acquired in S121.

In S124 and S125 is determined the adsorption state of the NOx catalyst 131. Specifically, it is determined in S124 whether or not the adsorption amount of NOx adsorbed by the catalytic metal 133 is less than the first threshold value a1. In the case where it is determined in S124 that the adsorption amount of NOx adsorbed by the catalytic metal 133 is not less than the first threshold value at, the procedure proceeds to S125. In contrast to this, in the case where it is determined in S124 that the adsorption amount of NOx adsorbed by the catalytic metal 133 is less than the first threshold value, the procedure proceeds to S126. In S126, the adsorption amount of NOx, which is estimated to be adsorbed by the catalytic metal 133, is increased by the adsorption amount of NOx which is calculated in S123, and then the procedure returns to S121.

It is determined in S125 whether or not a value, which is acquired by adding the adsorption amount of NOx adsorbed by the carrier 132 to the adsorption amount of NOx adsorbed by the catalytic metal 133, is less than the second threshold value a2. In the case where the adsorption amount of NOx adsorbed by the carrier 132 is a value less than the second threshold value a2 in S125, the procedure proceeds to S127. In S127, the adsorption amount of NOx, which is estimated to be adsorbed by the carrier 132, is increased by the adsorption amount of NOx calculated in S123, and then procedure returns to S121.

In contrast to this, in S125, in the case where the adsorption amount of NOx adsorbed by the carrier 132 is a value not less than the second threshold value a2, the procedure proceeds to S128. In S128, the adsorption amount of NOx calculated in S122 is allotted to the catalytic metal 133 and the carrier 132 on the basis of the adsorption ratio set according to the adsorption state of the NOx catalyst 131, and the adsorption amount of NOx, which is estimated to be adsorbed by each of the catalytic metal 133 and the carrier 132, is increased. According to the processing procedures in S126 to S127, the adsorption amount of NOx, which is adsorbed by each of the catalytic metal 133 and the carrier 132, is counted individually as a cumulative value.

In this regard, the second threshold value a2 used in S125 is set as a threshold value to be compared with the total adsorption amount of the NOx catalyst 131. However, on the assumption that an amount of NOx corresponding to the first threshold value a1 is adsorbed by the catalytic metal 133, the second threshold value a2 may be set as a threshold value to be compared with the adsorption amount of NOx adsorbed by the carrier 132.

Figure 37:
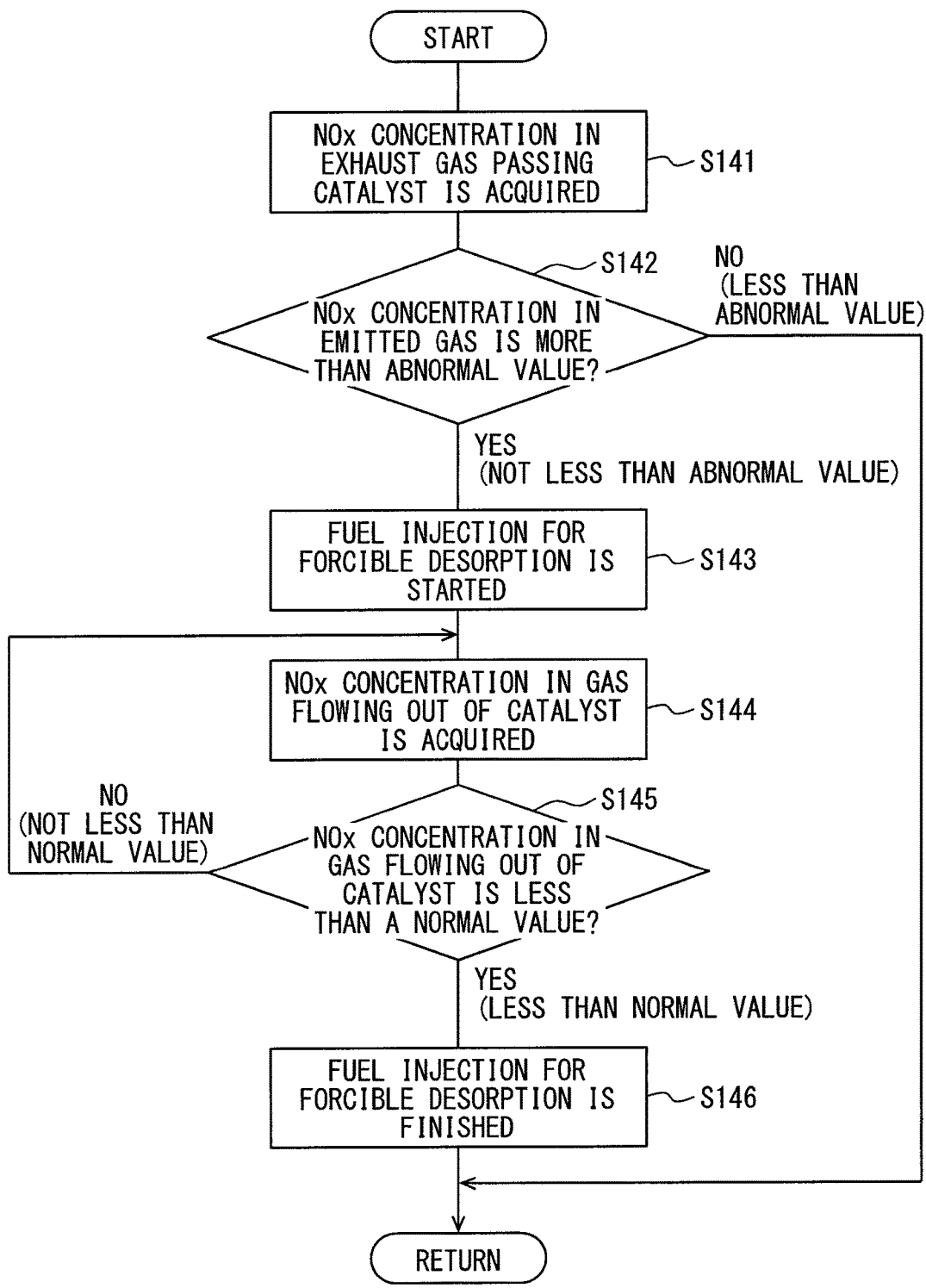
FIG. 37 is a flow chart to show a forcible desorption processing performed by a reduction control part.

Next, the forcible desorption processing will be described in detail on the basis of a flow chart shown in FIG. 37. This forcible desorption processing is performed by the reduction control part 163 in parallel to the reduction control processing (see FIG. 34) while the internal combustion engine ICE is driven.

In S141, the NOx concentration in the exhaust gas passing the NOx catalyst 131 is acquired from the NOx sensor 145, and then the procedure proceeds to S142. It is determined in S142 whether or not the NOx concentration acquired in S141 is more than an abnormal value. In the case where it is determined in S142 that the NOx concentration acquired in S141 is not more than the abnormal value, the procedure skips S143 to S146 and returns to S141. In contrast to this, in the case where it is determined in S142 that the NOx concentration acquired in S141 is more than the abnormal value, the procedure proceeds to S143.

In S143, the fuel injection valve 121 is made to start a fuel injection for forcible desorption, and then the procedure proceeds to S144. The reformed fuel supplied in S143 reduces a large amount of NOx emitted from the internal combustion engine ICE and actually desorbs all NOx from the NOx catalyst 131. In S144, just like S141, the NOx concentration in the exhaust gas emitted from the NOx catalyst 131 is acquired from the NOx sensor 145, and then the procedure proceeds to S145.

It is determined in S145 whether or not the NOx concentration acquired in S144 is returned to a normal value. The normal value is a value to indicate a NOx concentration greatly lower than the abnormal value. In the case where it is determined in S145 that the NOx concentration acquired in S144 is still not less than the normal value, S144 and S145 are repeatedly performed until the NOx concentration becomes less than the normal value. Then, in the case where the NOx concentration becomes less than normal value, the procedure proceeds to S146 where the fuel injection for the forcible desorption started in S143 is finished, and then the procedure returns to a normal after-treatment control. At this time, all of the total adsorption amount of NOx acquired in S122 and the cumulative adsorption amounts of the catalytic metal 133 and the carrier 132, which are counted in S126 to S128, are reset to zero.

In the 20th embodiment described so far, even if the NOx catalyst 131 has a plurality of adsorption states, the adsorption amount estimation part 161 can estimate the adsorption amount of NOx for each adsorption state of the NOx catalyst 131. The desorption amount of NOx estimated by the desorption amount estimation part 162 becomes a value reflecting the actual adsorption state of the NOx catalyst 131. Hence, the exhaust emission control system 100 can estimate the desorption amount of NOx with high accuracy.

In addition, the adsorption amount estimation part 161 of the 20th embodiment can switch an adsorption state to be assumed and can count the adsorption amount of NOx adsorbed by each of the catalytic metal 133 and the carrier 132 in accordance with the property of the NOx catalyst 131 in which as the total adsorption amount of NOx is increased, the adsorption state is changed. In this way, the adsorption amount estimation part 161 faithfully reflects an actual adsorption phenomenon caused in the NOx catalyst 131 to the estimation of the adsorption amount of NOx, so that the adsorption amount estimation part 161 can acquire a more correct adsorption amount of NOx.

Further, in the case where the total adsorption amount of NOx becomes more than the first threshold value a1, the adsorption amount estimation part 161 of the 20th embodiment switches the material which adsorbs NOx newly flowing in the NOx catalyst 131 from the catalytic metal 133 to the carrier 132. Still further, in the case where the total adsorption amount of NOx becomes more than the second threshold value a2, the adsorption amount estimation part 161 switches the material which adsorbs NOx newly flowing in the NOx catalyst 131 to both of the catalytic metal 133 and the carrier 132. As described above, the adsorption amount estimation part 161 employs an estimation technique to faithfully reproduce an actual adsorption state caused in the NOx catalyst 131, so that the adsorption amount estimation part 161 can estimate the adsorption amount of NOx of each of the catalytic metal 133 and the carrier 132 with higher accuracy.

Still further, the adsorption amount estimation part 161 of the 20th embodiment changes the adsorption ratios of the catalytic metal 133 and the carrier 132 according to the condition of the temperature and the like of the NOx catalyst 131. Hence, the adsorption amount estimation part 161 can estimate the adsorption amount of NOx of each of the catalytic metal 133 and the carrier 132 even in the adsorption state in which NOx is adsorbed by both of the catalytic metal 133 and the carrier 132.

In addition, in the 20th embodiment, the supply amount of the reformed fuel supplied to the NOx catalyst 131 is set by the use of the desorption amount of NOx estimated with high accuracy. Hence, the NOx catalyst 131 is supplied with an amount of reformed fuel which is suitable for reducing NOx in the exhaust gas flowing into the housing 135. According to the above description, it is possible to prevent a problem that a large amount of NOx passes the NOx catalyst 131 because of the shortage of the reducing agent and a problem that a fuel consumption is impaired because of an excess supply of the reducing agent.

Further, in the 20th embodiment, even in the case where a large amount of NOx is emitted from the internal combustion engine ICE because of an unexpected accident, the reduction control part 163 can increase the supply amount of reducing agent and hence can reduce NOx passing the NOx catalyst 131. Hence, the exhaust emission control system 100 can restrain the degradation of the exhaust gas caused by the unexpected accident to a minimum.

In addition, in the 20th embodiment, in the case where a large amount of NOx is emitted from the internal combustion engine ICE, all of the NOx adsorbed by the NOx catalyst 131 is actually desorbed and the value of the adsorption amount of NOx cumulated by the adsorption amount estimation part 161 is reset. According to the processing described above, it is possible to prevent the supply control of the reducing agent from being continuously performed on the basis of the estimated value of the adsorption amount of NOx deviated from an actual value. Hence, even if an abnormality is accidentally caused in the internal combustion engine ICE, the exhaust emission control system 100 can recover a NOx purification function to a normal state.

In this regard, in the 20th embodiment, the first threshold value a1 corresponds to "a catalytic metal threshold value", and the second threshold value a2 corresponds to "a carrier threshold value", and the internal combustion engine ICE corresponds to "an engine". Further, the fuel reformation device 120 corresponds to "a reducing agent supply device", and the NOx catalyst 131 corresponds to "a catalyst", and the NOx sensor 145 corresponds to "a sensing part", and the ECU 150 corresponds to "a purification control device", and the storage medium 153 corresponds to "a storage part".

21st Embodiment

In the 21st embodiment, a part of the processing performed by the ECU 150 shown in FIG. 31 is different from the 20th embodiment. The desorption amount estimation part 162 estimates the desorption amount of NOx desorbed from the NOx catalyst 131 (see FIG. 26) in S113 (see FIG. 34) by the use of a desorption speed map made in advance without using the mathematical expressions 1, 2 of the 20th embodiment.

The desorption speed map is desorption characteristic data to show a correlation between the catalyst temperature and the desorption speed of NOx per unit adsorption amount of NOx (see FIG. 30). In one desorption speed map are set individually a correlation line to show a desorption speed of NOx of the catalytic metal 133 (see FIG. 27) and a desorption speed of NOx of the carrier 132 (see FIG. 27). A plurality of desorption speed maps are made in advance for each of the gas flow rate of the catalyst inflow gas, the NOx concentration, and the oxygen concentration. In the storage medium 153 (see FIG. 26) of the ECU 150 are stored a plurality of desorption speed maps made for each of the states of the catalyst inflow gas.

Figure 34:
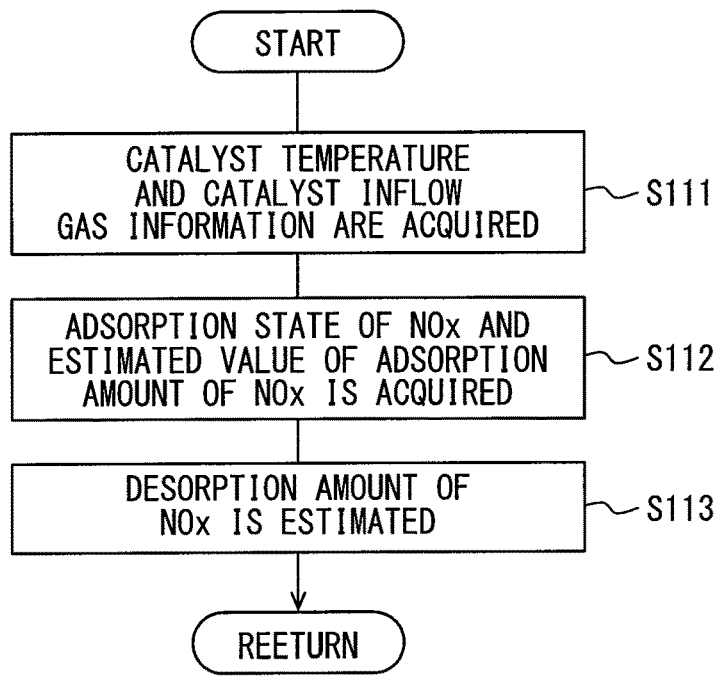
FIG. 34 is a flow chart to show a desorption amount estimation processing performed by a desorption amount estimation part.

In S113 of the desorption amount estimation processing shown in FIG. 34, the desorption amount estimation part 162 selects one desorption speed corresponding to the present state of the catalyst inflow gas from among the plurality of desorption speed maps on the basis of the catalyst inflow gas information acquired in S111. Next, the desorption amount estimation part 162 derives a NOx desorption speed per unit adsorption amount of NOx for each of the catalytic metal 133 and the carrier 132 (see FIG. 27) on the basis of the catalyst temperature acquired in S111 by the use of the selected desorption speed map. Then, the desorption amount estimation part 162 multiplies the derived NOx desorption speed by the adsorption amount of NOx acquired in S112 to thereby calculate the desorption amount of NOx desorbed from each of the catalytic metal 133 and the carrier 132.

Figure 38:
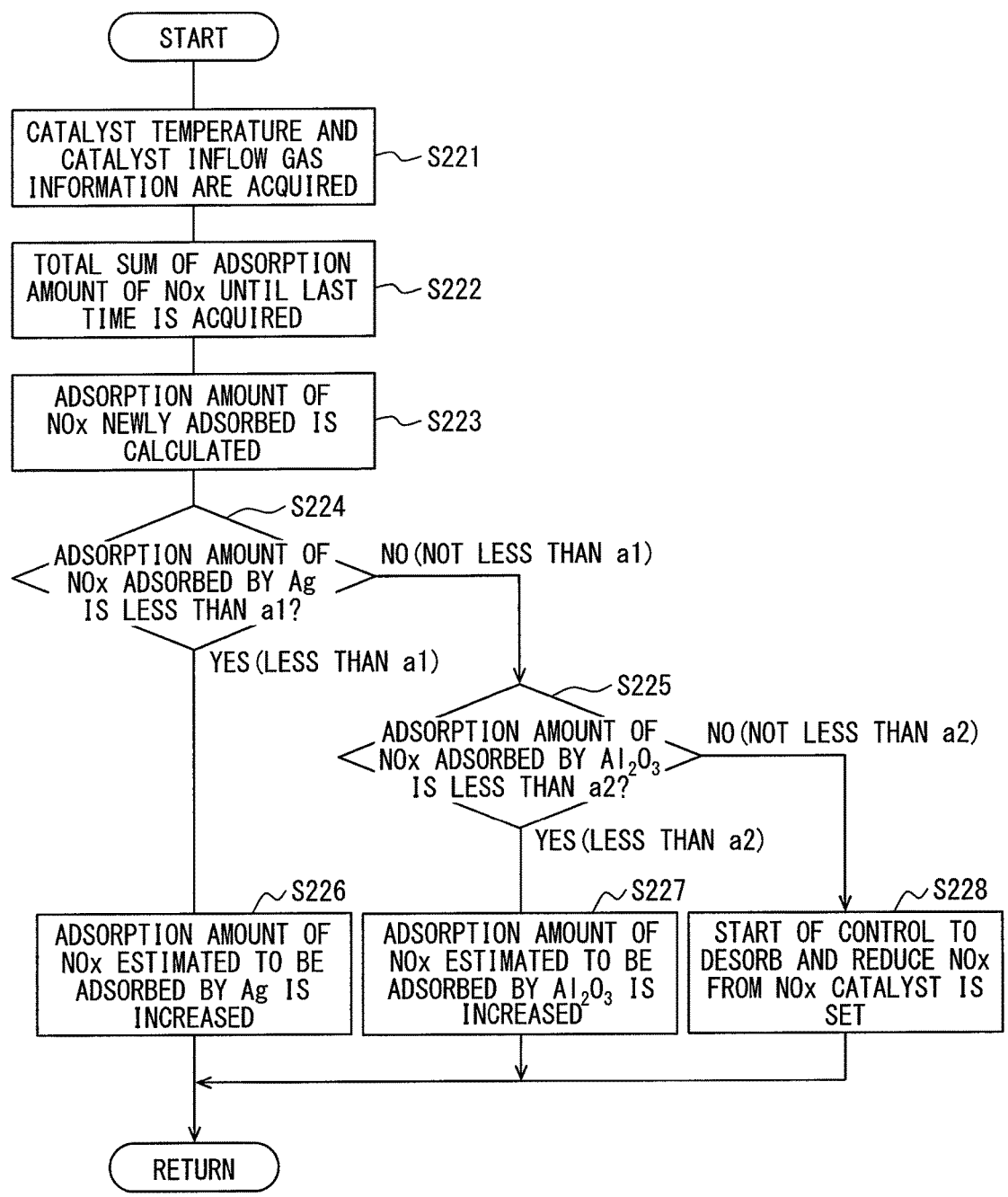
FIG. 38 is a flow chart to show an adsorption amount estimation processing in a 21st embodiment.

Next, the desorption amount estimation processing performed by the desorption amount estimation part 161 of the 21st embodiment will be described in detail on the basis of a flow chart shown in FIG. 38 with reference to FIG. 29 and FIG. 31. In this regard, S221 to S227 in the desorption amount estimation processing of the 21st embodiment is actually equal to S121 to S127 of the 20th embodiment (see FIG. 35).

The desorption amount estimation part 161 switches the adsorption state of the NOx catalyst 131, which is assumed, from the adsorption state in which NOx is adsorbed by only the carrier 132 to the adsorption state in which NOx is adsorbed by both of the catalytic metal 131 and the carrier 132 in S228 of the desorption amount estimation processing. At this time, the adsorption amount estimation part 161 sets a start of a control to desorb and reduce NOx from the NOx catalyst 131 without integrating the adsorption amount of NOx.

When the start of the control to desorb and reduce NOx from the NOx catalyst 131 is set, the desorption amount estimation part 162 does not estimate the desorption amount of NOx in S113 (see FIG. 34) of the desorption amount estimation processing. Then, the reduction control part 163 sets the supply amount of the reducing agent and starts the fuel injection in S103 (see FIG. 33) of the reduction control processing (see FIG. 33) in such a way that all NOx adsorbed by the NOx catalyst 131 is desorbed and reduced. The supply amount of the reducing agent is set on the basis of a control map different from the supply amount setting map of the 20th embodiment. By the processing described above, the use of the NOx catalyst 131 in the adsorption state in which both of the catalytic metal 133 and the carrier 132 are made to adsorb NOx is limited.

Also in the 21st embodiment described above, the actual adsorption state of the NOx catalyst 131 is reflected to the estimation of the desorption amount of NOx. Hence, the estimated desorption amount of NOx can be acquired with high accuracy.

In addition, the desorption amount estimation part 162 of the 21st embodiment estimates the desorption amount of NOx on the basis of the desorption speed map stored in advance. In this way, processing using the control map can contribute to a reduction in the load of the operation processing of the processor 151 (see FIG. 26) as compared with the processing using complex mathematical expressions. In addition, when the desorption speed map is made in consideration of an error inevitably caused under the actual use conditions, the adsorption amount estimation part 161 can estimate the desorption amount of NOx with higher accuracy.

Further, the NOx catalyst 131 of the 21st embodiment is limited in use in the adsorption state in which both of the catalytic metal 133 and the carrier 132 are made to adsorb NOx. The NOx adsorbed in the adsorption state in which both of the catalytic metal 133 and the carrier 132 are made to adsorb NOx tends to be hard to desorbed from the NOx catalyst 131. Hence, when both of the catalytic metal 133 and the carrier 132 are made to desorb NOx, a large amount of energy is consumed. For this reason, by starting the desorption control in the case where the adsorption amount of NOx of the carrier 132 is more than the second threshold value a2, an efficient purification of NOx can be realized.

22nd Embodiment

Figure 39:
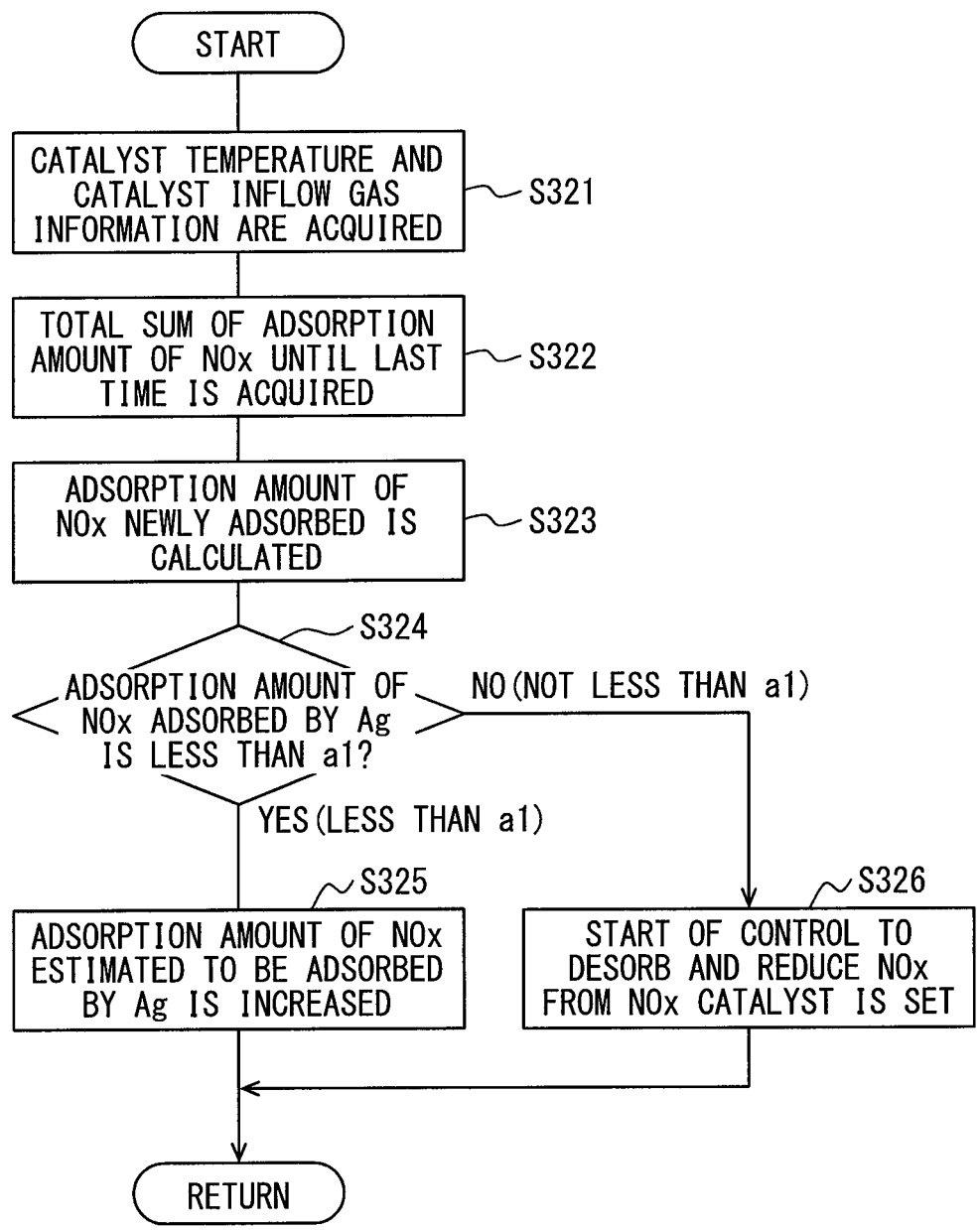
FIG. 39 is a flow chart to show an adsorption amount estimation processing in a 22nd embodiment.

A 22nd embodiment is a modified example of the 21st embodiment. In the 22nd embodiment, an adsorption amount estimation processing different from the 21st embodiment is performed. Hereinafter, the adsorption amount estimation processing of the 22nd embodiment will be described on the basis of a flow chart shown in FIG. 39 with reference to FIG. 3 and FIG. 31. In this regard, S321 to S325 of FIG. 39 are actually same as S221 to S224 and S226 of the 21st embodiment (see FIG. 38).

In S326, the adsorption amount estimation part 161 switches the adsorption state of the NOx catalyst 131, which is assumed, from the adsorption state in which NOx is adsorbed by only the catalytic metal 133 to the adsorption state in which NOx is adsorbed by only the carrier 132. At this time, the adsorption amount estimation part 161, like S228 of the 21st embodiment (see FIG. 38), sets the start of the control for desorbing and reducing NOx from the NOx catalyst 131 without integrating the adsorption amount of NOx.

As the result, the reduction control part 163 starts the control for desorbing and reducing all NOx adsorbed by the NOx catalyst 131 by the supply of the reducing agent by the fuel reformation device 120 in S103 (see FIG. 33) of the reduction control processing. By the processing described above, the use of the NOx catalyst 131 in the adsorption state in which only the carrier 132 is made to adsorb NOx is limited.

Also in the 22nd embodiment described above, the desorption amount of NOx on the assumption of the adsorption state in which NOx is adsorbed by only the catalytic metal 133 is estimated. As the result, the desorption amount of NOx can be estimated with high accuracy.

In addition, the NOx catalyst 131 of the 22nd embodiment is limited in use in the adsorption state in which the carrier 132 is made to adsorb NOx and is mainly used in the adsorption state in which only the catalytic metal 133 is made to adsorb NOx. Energy necessary for desorbing NOx from the catalytic metal 133 is lower than energy necessary for desorbing NOx from the carrier 132, so that an efficient purification of NOx can be realized.

In the adsorption amount estimation processing in the above embodiment, the adsorption amount of NOx of each of the catalytic metal 133 and the carrier 132 is compared with the first threshold value a1 and the second threshold value a2, whereby the adsorption state to be assumed is switched. However, the first threshold value a1 and the second threshold value a2 may be set as threshold values to be compared with the total adsorption value of NOx.

In the 20th embodiment described above, the change of the adsorption state in the NOx catalyst 131 is described on the basis of images shown in FIGS. 27 to 29 in which NOx is adsorbed by each surface of the catalytic metal 133 and the carrier 132. However, FIGS. 27 to 29 are examples of a schematic drawing to facilitate the comprehension of the change of the adsorption state and do not illustrate a phenomenon such that an actual NOx catalyst traps NOx. The phenomenon such that the actual NOx catalyst traps NOx may be comprehended in an image in which as the adsorption amount of NOx is increased, NOx is adsorbed at a deeper position of the carrier 132.

The fuel reformation device 120 of the above embodiment is provided in the middle of the exhaust pipe 113. However, the fuel reformation device may be constructed, for example, in such a way as to be arranged in parallel to the exhaust pipe and to have an end of a supply pipe, which supplies the reformed fuel, joined to the exhaust pipe. This construction can prevent the performances of the fuel injection valve, the temperature elevation part, the reforming catalyst from being reduced by components contained in the exhaust gas.

Further, the fuel reformation device 120 of the above embodiment is constructed in such a way as to supply the reformed fuel as the reducing agent. However, the fuel reformation device 120 may be constructed, for example, in such a way as to supply ozone as well as the reformed fuel. Still further, "a reducing agent supply device" that can supply ammonia generated from urea as the reducing agent may be provided in the exhaust emission control system.

The adsorption amount estimation part of the 20th embodiment adjusts the adsorption ratio of NOx adsorbed by the catalytic metal 133 and NOx adsorbed by the carrier 132 according to the catalyst temperature. However, the adsorption amount estimation part may integrate the adsorption amount adsorbed by each of the catalytic metal 133 and the carrier 132 at a specified adsorption ratio set in advance.

In the embodiment described above, in the case where the NOx concentration sensed by the NOx sensor provided on the downstream side of the NOx catalyst is more than the abnormal value, the control to supply a large amount of reducing agent is started as a fail-safe. However, this control for the fail-safe may be omitted.

Further, in the embodiment described above, an urgent supply of the reducing agent is continuously performed until all NOx is desorbed from the NOx catalyst. However, the exhaust emission control system can return the urgent supply of the reducing agent to a normal exhaust emission control when the NOx concentration is recovered to a normal value.

In the embodiment described above, the function provided by the processor 151 and the like of the ECU 150 can be provided by hardware and software, which are different from parts described above, or a combination of the hardware and the software. For example, a control circuit dedicated for the after-treatment provided separately from the ECU 150 for comprehensively controlling the operation of the internal combustion engine ICE may perform a part of all of the reduction control processing, the desorption amount control processing, the adsorption amount estimation processing, and the forcible desorption processing as "an exhaust emission control apparatus". Further, various unchangeable storage media such as a flash memory and a hard disc can be employed as the storage medium 153 to store programs and various control maps performed by the processor 151.

23rd Embodiment

Figure 40:
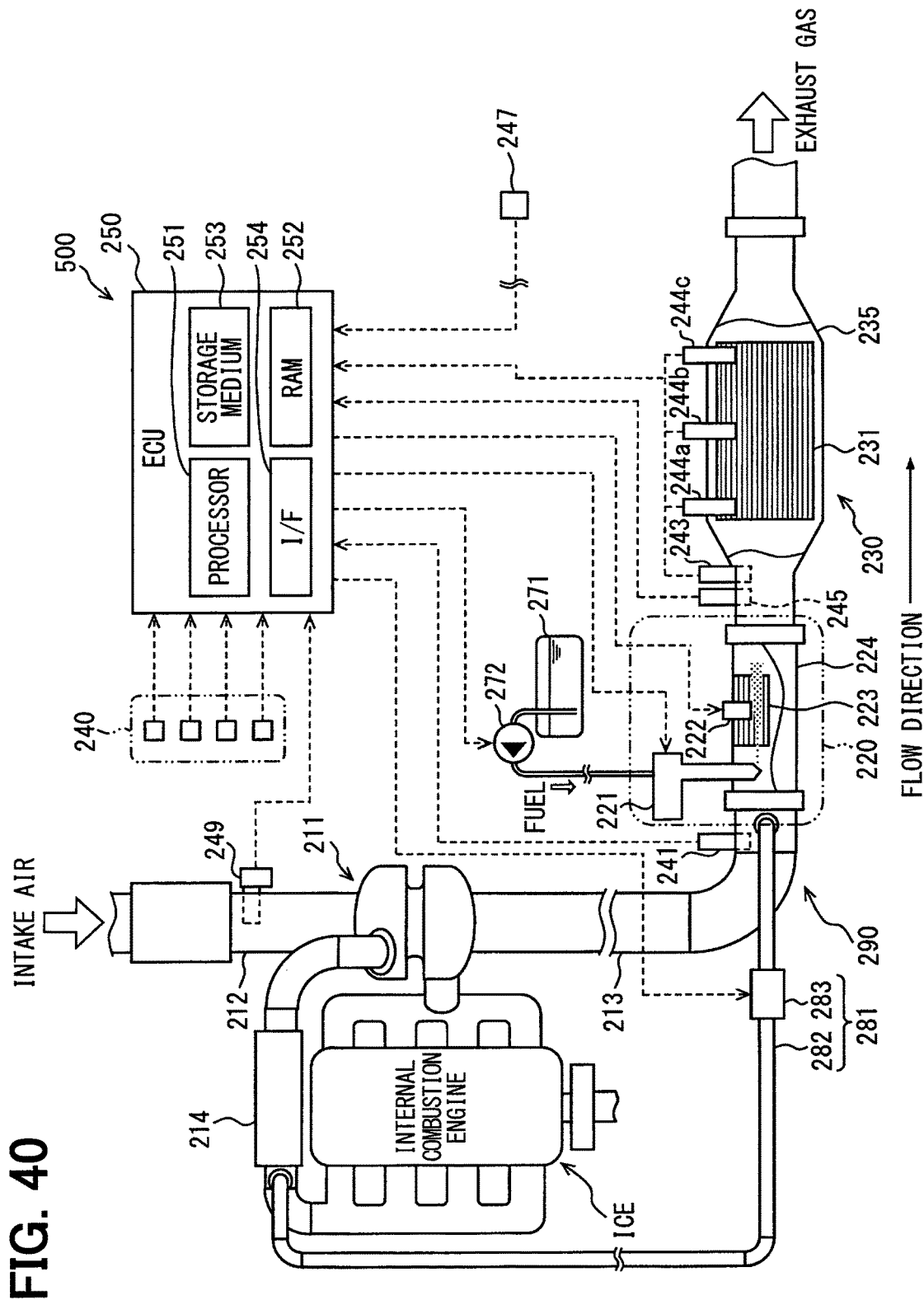
FIG. 40 is a general configuration, which is shown together with an internal combustion engine, of an exhaust emission control system according to a 23rd embodiment.

An exhaust emission control system 500 according to a 23rd embodiment shown in FIG. 40 is mounted in a vehicle together with the internal combustion engine ICE. The internal combustion engine ICE is a diesel engine of a compression self-ignition type and a power source to drive the vehicle. The internal combustion engine ICE combusts the light oil to thereby generate power.

The internal combustion engine ICE is provided with a supercharger 211 and an intercooler 214. The supercharger 211 has an intake pipe 212 and an exhaust pipe 213 coupled thereto. The intake pipe 212 forms an intake passage to pass air to a compressor part of the supercharger 211. The exhaust pipe 213 forms an exhaust passage to pass an exhaust gas to the exhaust emission control system 500 from a turbine part of the supercharger 211.

In this regard, in the following description, an upstream side and a downstream side will be specified on the basis of a flow direction of the air and a flow direction of the exhaust gas. In other words, the upstream side in the intake pipe 212 designates a side close to the compressor part, whereas the downstream side in the exhaust pipe 213 designates a side close to the turbine part.

The exhaust emission control system 500 is provided in an exhaust system 290 of the internal combustion engine ICE. The exhaust emission control system 500 is an after-treatment system to purify substances generated by the combustion of the light oil in the internal combustion engine ICE. The exhaust emission control system 500 decomposes nitrogen oxide (NOx), in particular, of the substances contained in the exhaust gas emitted from the internal combustion engine ICE into nitrogen ($N_2$), thereby purifying the exhaust gas. The exhaust emission control system 500 is provided with a fuel reformation device 220, a NOx purification device 230, a fresh air introduction device 281, and an engine control unit (hereinafter referred to as "ECU") 50.

The fuel reformation device 220 is provided in the middle of the exhaust pipe 213. In the exhaust pipe 213, an after-treatment device such as an oxidation catalyst and a diesel particulate trap filter is further provided between the supercharger 211 and the fuel reformation device 220. The fuel reformation device 220 reforms fuel (light oil) to thereby generate a reformed fuel. The reformed fuel is a reducing agent used for reducing NOx in the NOx purification device 230. The fuel used for generating the reducing agent in the fuel reformation device 220 is shared with the fuel used for generating power in the internal combustion engine ICE. The fuel reformation device 220 supplies the NOx purification device 230 with the reducing agent through the exhaust passage. The fuel reformation device 220 includes a fuel injection valve 221, a housing 224, a temperature elevation part 222, and a reforming catalyst 223.

The fuel injection valve 221 is positioned on the upstream side of the reforming catalyst 223 and is fixed to the exhaust pipe 213 or the housing 224. The fuel injection valve 221 is coupled to a fuel pump 272. The fuel injection valve 221 is supplied with the fuel stored in a fuel tank 271 by the fuel pump 272 being operated. The fuel injection valve 221 has one or a plurality of injection holes facing the exhaust passage. The fuel injection valve 221 generates an electromagnetic force in an electromagnetic solenoid to thereby inject the fuel from the injection holes. The fuel injection valve 221 supplies the fuel, which is passed through the injection holes and is atomized, to the reforming catalyst 223.

The housing 224 is formed of a thin metal plate in the shape of a container. The housing 224 houses the temperature elevation part 222 and the reforming catalyst 223. The housing 224 is coupled to the exhaust pipe 213 and forms a portion of the exhaust passage.

The temperature elevation part 222 is a heating body to generate heat when supplied with electric power. The temperature elevation part 222 is arranged integrally with the reforming catalyst 223. The quantity of heat generated by the temperature elevation part 222 is transmitted to the reforming catalyst 223 to thereby elevate the temperature of the reforming catalyst 223. The temperature elevation part 222 indirectly elevates the temperature of the fuel injected by the fuel injection valve 221, thereby bringing the fuel into a state in which the fuel is easily activated.

The reforming catalyst 223 is, for example, a monolith catalyst made by coating cordierite, which is formed for example in the shape of a honeycomb, with zeolite or aluminum oxide ($Al_2O_3$, hereinafter referred to as alumina). Hydrocarbon that is a main component of the fuel is partially oxidized by a catalytic action of the reforming catalyst 223. As the result, the reforming catalyst 223 is supplied with the reformed fuel, in which partial oxide (for example, aldehyde) oxidized to an aldehyde group (CHO) or carbon monoxide (CO) and hydrogen ($H_2$) function as a reducing agent, from the fuel reformation device 220.

The NOx purification device 230 is constructed of a NOx catalyst 231, a housing 235, which houses the NOx catalyst 231 and is made of metal, and the like. The NOx catalyst 231 is a monolith catalyst which has a carrier 232 and a catalytic metal 233 and which is formed in the shape of a honeycomb. The carrier 232 is made of, for example, alumina or the like. The carrier 232 becomes a base material to carry the catalytic metal 233. The catalytic metal 233 is, for example, silver (Ag). The catalytic metal 233 is positioned on the surface of the carrier 232 and accelerates the reduction reaction of NOx.

As the carrier 232 can be used not only alumina described above but also one substance or a plurality of substances of zeolite, silica, titania, ceria, and zirconia. Further, as the catalytic metal 233 can be used not only silver described above but also copper (Cu), platinum (Pt), palladium (Pd), nickel (Ni), iridium (Ir), and radium (Ra). Further, cobalt (Co), osmium (Os), ruthenium (Ru), iron (Fe), rhenium (Re), technetium (Tc), manganese (Mn), and titanium (Ti) may be used for the catalytic metal 233. In addition, the metals described above may be carried by the carrier 232 in the state of oxide. Further, a plurality of metals described above may be carried by the carrier 232 in the state of a simple substance or oxide.

In the case where a catalyst temperature is low (less than approximately 200° C.), the NOx catalyst 231 adsorbs NOx in the exhaust gas flowing into the NOx purification device 230. In contrast to this, in the case where the catalyst temperature is high (not less than approximately 200° C.), the NOx catalyst 231 desorbs the adsorbed NOx. The desorbed NOx reacts with the reformed fuel supplied from the fuel reformation device 220 by the catalytic operation of the NOx catalyst 231. NOx is reduced to nitrogen by the reformed fuel functioning as a reducing agent. Not only NOx but also oxygen ($O_2$) is contained in the exhaust gas and the reformed fuel selectively reacts with NOx also in the presence of oxygen.

The fresh air introduction device 281 is constructed of a fresh air introduction pipe 282, an introduction control valve 283, and the like. The fresh air introduction pipe 282 is formed of a reinforced hose member made of rubber or a curved pipe-shaped member made of metal. The fresh air introduction pipe 282 has its one end coupled to a portion positioned on the downstream side of the intercooler 214 of an intake system. The fresh air introduction pipe 282 has the other end coupled to a portion positioned on the upstream side of the reforming catalyst 223 of the exhaust pipe 213. The fresh air introduction pipe 282 forms an introduction passage to introduce air passing through the intercooler 214 into the fuel reformation device 220.

The introduction control valve 283 is provided in the middle of the fresh air introduction pipe 282. The introduction control valve 283 switches the introduction passage between the communication state and an interruption state. The introduction control valve 283 is constructed of a combination of an electromagnetic valve which is opened or closed by the ECU 250 and a check valve which prevents the air and the exhaust gas from reversely flowing from the exhaust passage to the intake passage The ECU 250 is a control unit that comprehensively performs a control relating to the internal combustion engine ICE. The ECU 250 is constructed mainly of a microcomputer including a processor 251, a RAM 252, a storage medium 253, and an input/output interface 254 of a measurement signal and a control signal. The ECU 250 is coupled to a plurality of in-vehicle sensors 240. The in-vehicle sensors 240 include sensors that sense operating information of a driver, which is inputted to an accelerator and a steering wheel, and sensors that sense driving information relating to the internal combustion engine ICE such as a revolution speed and an intake temperature.

In addition, the ECU 250 has the fuel injection valve 221, the temperature elevation part 222, and the fuel pump 272, and the introduction control valve 283 coupled thereto as a configuration relating to an after-treatment. Further, the ECU 250 has an exhaust gas sensor 241, an inlet temperature sensor 243, a plurality of (three) catalyst temperature sensors 244a to 244c, a reducing agent sensor 245, an outside air temperature sensor 247, and an airflow meter 249.

The exhaust gas sensor 241 is constructed of a combination of an $O_2$ sensor, which outputs a signal responsive to an oxygen concentration in the exhaust gas, and a NOx sensor which outputs a signal responsive to a NOx concentration in the exhaust gas. The exhaust gas sensor 241 is arranged on the upstream side of the reforming catalyst 223 and senses the oxygen concentration and the NOx concentration in the exhaust gas flowing into the reforming catalyst 223.

Each of the inlet temperature sensor 243 and the respective catalyst temperature sensors 244a to 244c is constructed of a thermocouple or a thermistor. The inlet temperature sensor 243 is arranged on the upstream side of the NOx catalyst 231 and outputs a measurement signal responsive to the temperature of the exhaust gas flowing into the NOx catalyst 231. The respective catalyst temperature sensors 244a to 244c are fixed to the housing 235. The temperature sensors 244a to 244c are plurality arranged at specified intervals along the flow direction of the exhaust gas. The respective temperature sensors 244a to 244c sense temperatures at a plurality of positions of the NOx catalyst 231 as physical quantities relating to the degradation of the catalyst and output the measurement signals responsive to the catalyst temperatures.

The reducing agent sensor 245 is fixed in a section between the fuel reformation device 220 and the NOx purification device 230 of the exhaust pipe 213. The reducing agent sensor 245 is positioned between the reforming catalyst 223 and the fuel injection valve 221 and senses a state of the reducing agent supplied from the reforming catalyst 223. For example, the reducing agent sensor 245 determines a kind of hydrocarbon passing through the reforming catalyst 223 and outputs a measurement signal corresponding to a result of the determination.

The outside air temperature sensor 247 outputs a measurement signal responsive to the temperature of the outside of the vehicle. The airflow meter 249 is provided on the intake pipe 212. The airflow meter 249 is a sensor having a platinum heating wire or the like and outputs a measurement signal responsive to a flow speed of the air flowing in the intake passage. A flow rate of an intake air supplied to the internal combustion engine ICE is acquired by the ECU 250 on the basis of the measurement signal of the airflow meter 249.

The ECU 250 performs exhaust emission control processing programs by the processor 251 to thereby construct an information acquisition part 262, a steadiness determination part 263, a degradation estimation part 264, and a reduction control part 265 as function blocks relating to an after-treatment of NOx. Hereinafter, each of the function blocks constructed in the ECU 250 will be described in detail on the basis of FIG. 41 and FIG. 40.

For example, as for information relating to the after-treatment, the information acquisition part 262 acquires sensed values of temperatures at respective positions of the NOx catalyst 231 as physical quantities relating to the degradation of the NOx catalyst 231 from the respective catalyst temperature sensors 244a to 244c. In addition, the information acquisition part 262 acquires a NOx concentration and an oxygen concentration contained in the exhaust gas on the basis of the measurement signal of the exhaust gas sensor 241. Further, the information acquisition part 262 acquires the temperature of the exhaust gas flowing into the NOx purification device 230 on the basis of the measurement signal of the inlet temperature sensor 243. Still further, the information acquisition part 262 acquires the kind and the supply amount of hydrocarbon of the reformed fuel supplied to the NOx catalyst 231 on the basis of the measurement signal of the reducing agent sensor 245.

The information acquisition part 262 acquires driving information to indicate a driving state of the internal combustion engine ICE in time series. The information acquisition part 262 can detect an abnormal state of the internal combustion engine ICE on the basis of the acquired driving information. The driving information includes a fuel injection amount injected into a combustion chamber in the internal combustion engine ICE and a gas flow rate of the exhaust gas. The gas flow rate is calculated by the information acquisition part 262 by the use of an intake flow rate that is a value detected by the airflow meter 249, an intake temperature that is acquired from the in-vehicle sensor 240, and an exhaust gas temperature that is a sensed value of the inlet temperature sensor 243. In this regard, the gas flow rate may be sensed directly by a flow rate sensor provided in the exhaust pipe 213.

The steadiness determination past 263 determines whether or not the internal combustion engine ICE is in a steady state on the basis of a transition of the driving information acquired by the information acquisition part 262. Specifically, the steadiness determination part 263 determines that in the case where variations in a flow rate of the intake air or the gas flow rate of the exhaust gas and variations in the fuel injection amount are within specified ranges by idling or constant-speed running, the internal combustion engine ICE is in the steady state.

Figure 42:
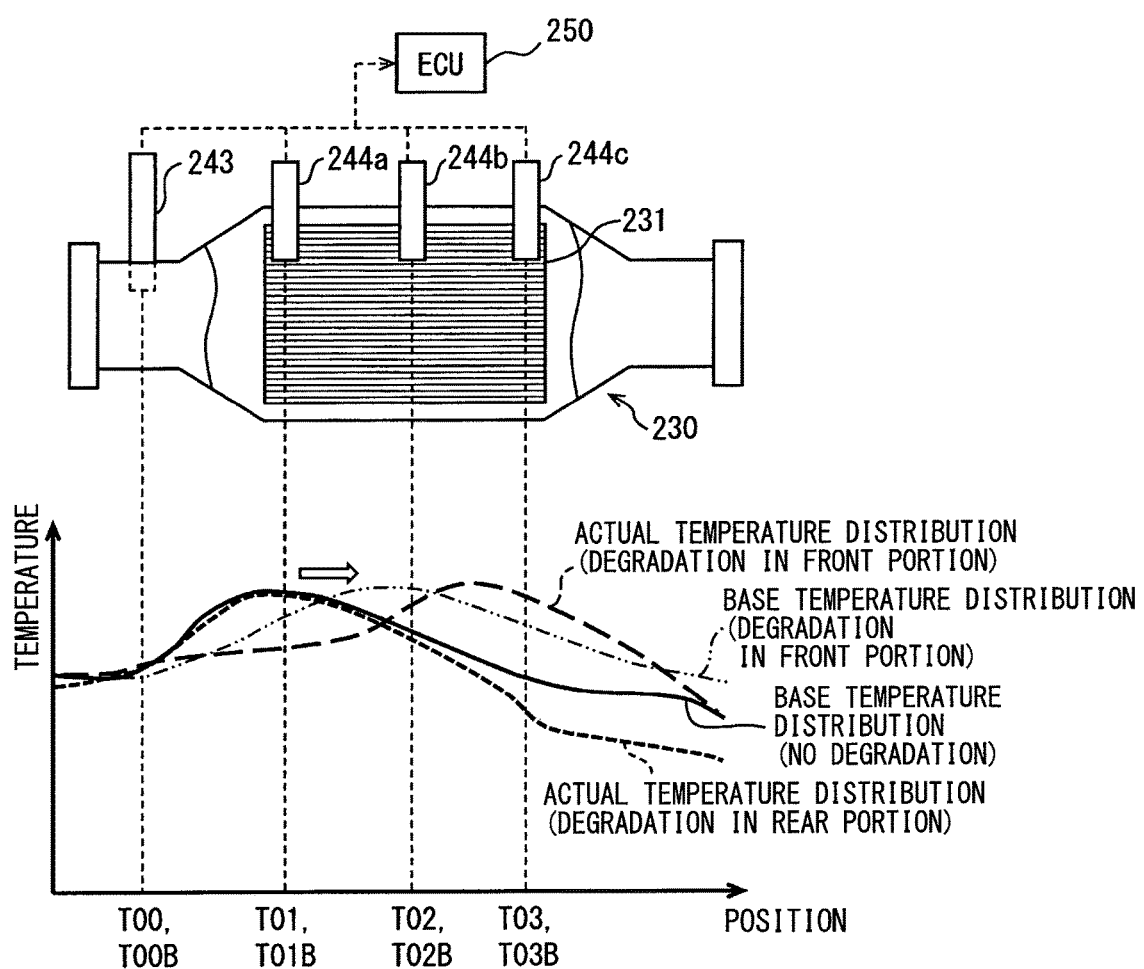
FIG. 42 illustrates specific modes of a base temperature distribution and an actually-measured temperature distribution of a NOx catalyst.

The degradation estimation part 264 performs a degradation distribution estimation processing (see FIG. 45), which will be described later, thereby estimating a portion in which degradation progresses in the NOx catalyst 231 and a portion in which degradation does not progress or little progresses in the NOx catalyst 231 by the use of temperatures at the respective portions of the NOx catalyst 231. The degradation estimation part 264 acquires a temperature distribution of the NOx catalyst 231 along the flow direction by the use of the exhaust gas temperature that is a sensed value of the inlet temperature sensor 243 and catalyst temperatures T01 to T03 that are the sensed values of the respective catalyst temperature sensors 244a to 244c. The reaction of the reducing agent is hard to be caused near a portion in which the degradation progresses in the NOx catalyst 231. For this reason, an actually measured temperature distribution can be assumed to be a degradation distribution to show a degree of degradation at the respective portions of the NOx catalyst 231. In the case where the degradation progresses in a portion on the upstream side in the flow direction (hereinafter referred to as a front portion) of the NOx catalyst 231, the temperature distribution is formed in a shape in which a peak position is shifted to a rear side (see a long broken line in FIG. 42). In contrast to this, in the case where the degradation progresses in a portion on the downstream side in the flow direction (hereinafter referred to as a rear portion) of the NOx catalyst 231, the temperature distribution is formed in a shape in which a rear portion goes down (see a short broken line in FIG. 42).

The degradation estimation part 264 compares the acquired temperature distribution with a base temperature distribution (see a solid line in FIG. 42), thereby determining the degree of degradation in the respective portions of the NOx catalyst 231. The base temperature distribution can be acquired by correcting standard data made in advance by the use of the exhaust gas temperature actually measured by the inlet temperature sensor 243. Hence, a value T00B of the base temperature distribution at a position of the inlet temperature sensor 243 is actually equal to a temperature T00 measured by the inlet temperature sensor 243. Further, the standard data of the base temperature distribution is a distribution of the catalyst temperature which, in the case where the internal combustion engine ICE is driven by injecting a specified amount of fuel under a specified operation condition, the NOx catalyst 231 which is not yet degraded is assumed to show. The standard data is stored in the storage medium 253 in a mode of map data or a mathematical expression.

Here, in the case where it is assumed that the whole of the NOx catalyst 231 is not degraded, the reducing agent causes many reduction reactions in the front portion of the NOx catalyst 231. Then, it is estimated that as a portion is closer to the rear portion of the NOx catalyst 231, the amount of consumption of the reducing agent is gradually degreased. In contrast to this, in the NOx catalyst 231 which is degraded in the front portion, the reducing agent to cause a reduction reaction is decreased in the front portion, as compared with the NOx catalyst 231 which is not degraded in the whole. Hence, the amount of the reducing agent reaching a middle portion of the NOx catalyst 231 is increased and hence the catalyst temperature is further elevated on the downstream side than in the middle portion. In order to reflect a change in the amount of the reducing agent reaching the middle portion of the NOx catalyst 231 and a change in the temperature of the exhaust gas, which are caused by the degradation in the front portion of the NOx catalyst 231, the degradation estimation part 264 can make a correction of shifting a peak position in the base temperature distribution to the downstream side (see a double dot and dash line in FIG. 42).

When describing the correction in more detail, the following mathematical expressions 4, 5 to calculate a catalyst temperature T_cat of each portion of the NOx catalyst 231 are stored in the storage medium 253.

$$T\_cat = T\_in - T\_loss + T\_rea \quad \text{(Mathematical expression 4)}$$

$$T\_rea = Q\_in \times \eta \quad \text{(Mathematical expression 5)}$$

Here, in the mathematical expression 4, T_in indicates the temperature of the exhaust gas flowing into the NOx catalyst 231, and T_loss indicates a temperature decrease caused by heat radiation, and T_rea indicates a temperature increase caused by the reduction reaction of the reducing agent. T_loss is corrected, for example, by the use of the outside air temperature measured by the outside air temperature sensor 247 and a running speed measured by the in-vehicle sensor 40. Further, Q_in indicates an inflow amount of the reducing agent reaching each portion of the NOx catalyst 231 and η indicates a reaction rate of the reducing agent. The reaction rate η is uniquely set from the temperature of each portion of the NOx catalyst 231 by the use of a function map set in advance.

According to the mathematical expressions 4, 5, in the case where the front portion of the NOx catalyst 231 is degraded, the temperature (T_in) of the exhaust gas flowing into the middle portion is decreased. Hence, the amount of heat lost by heat radiation is also decreased and hence a value of the temperature decrease (T_loss) is also decreased. In contrast to this, the inflow amount (Q_in) of reducing agent reaching the middle portion is increased and hence a value of the temperature increase (T_rea) caused by the reduction reaction is increased. As the result, the degradation estimation part 264, as described above, makes the base temperature distribution in which a peak position of the temperature is shifted to the rear portion of the NOx catalyst 231 (see the double dots and dash line in FIG. 42).

The reduction control part 265 controls the reformation of the fuel by the fuel reformation device 220 on the basis of a plurality of reformation control maps made in advance. The plurality of reformation control maps are stored in the storage medium 253. Each of the plurality of reformation control maps specifies the control amounts of the temperature elevation part 222, the fuel injection valve 221, the fuel pump 272, and the introduction control valve 283 for the catalyst temperature. The reduction control part 265 controls the respective configurations corresponding to the present catalyst temperature on the basis of the reformation control maps, thereby supplying the NOx catalyst 231 with the reducing agent in a reforming state most suitable for purifying NOx. In this regard, in the case where the NOx catalyst 231 is not actually degraded, the catalyst temperature used for the reference of the reformation control map may be, for example, a sensed value of the catalyst temperature sensor 244b in the middle portion or an average value of the sensed values of the respective catalyst temperature sensors 244a to 244c.

The reduction control part 265 can correct the reforming state of the fuel by the fuel reformation device 220 in accordance with the degradation of the NOx catalyst 231 by performing the reformation control processing (see FIG. 43) which will be described later. For this reason, the reduction control part 265 acquires an estimation result of the degree of degradation of the NOx catalyst 231 from the degradation estimation part 264. The reduction control part 265 controls the reformation of the fuel by the fuel reformation device 220 on the basis of the estimation result of the degradation estimation part 264 in such a way that the reducing agent reaches a portion which is little degraded of the NOx catalyst 231 in a state in which the reducing agent is activated.

Specifically, the reduction control part 265 controls the reformation of the fuel by the fuel reformation device 220 in such a way that as a portion in which degradation progresses of the NOx catalyst 231 is more expanded toward the downstream side along the flow direction of the exhaust gas, the activity of the reducing agent supplied from the fuel reformation device 220 is more reduced. According to this control, the position in which an active state of the reducing agent is suitable for reducing NOx is shifted to the downstream side of the NOx catalyst 231 along the flow direction of the exhaust gas. As the result, the reduction reaction of NOx is actively caused at a portion from the middle portion to the rear portion of the NOx catalyst 231 in which the NOx catalyst 231 is less degraded.

Further, for example, in the case where an abnormal temperature rise is caused on the rear portion of the NOx catalyst 231 and where the rear portion of the NOx catalyst 231 is degraded, the reduction control part 265 controls the reformation of the fuel by the fuel reformation device 220 in such a way that the activity of the reducing agent supplied from the fuel reformation device 220 is increased. According to this control, the position in which the active state of the reducing agent is suitable for the reduction of NOx is held on the upstream side of the NOx catalyst 231 along the flow direction of the exhaust gas. As the result, the reduction reaction of NOx is actively caused in the middle portion to the rear portion of the NOx catalyst 231 in which the NOx catalyst 231 is less degraded.

Figure 41:
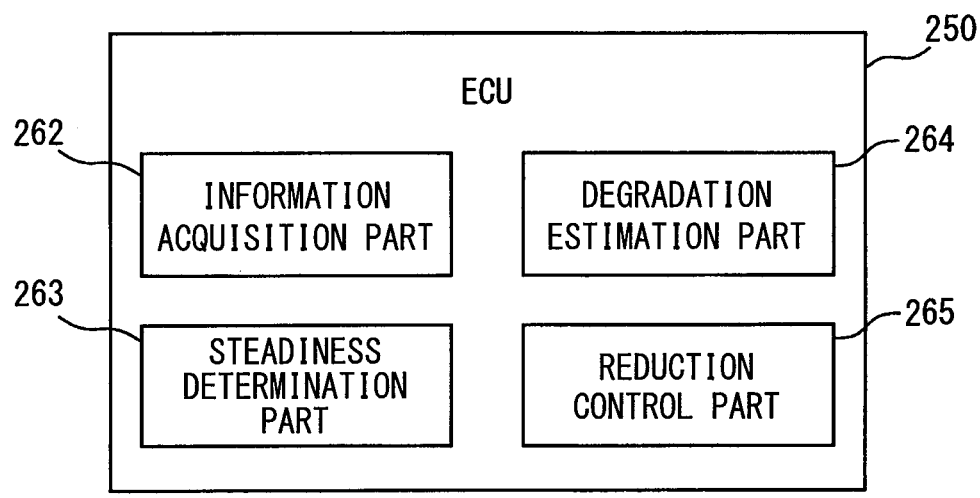
FIG. 41 illustrates function blocks for an after-treatment constructed in an ECU.
Figure 43:
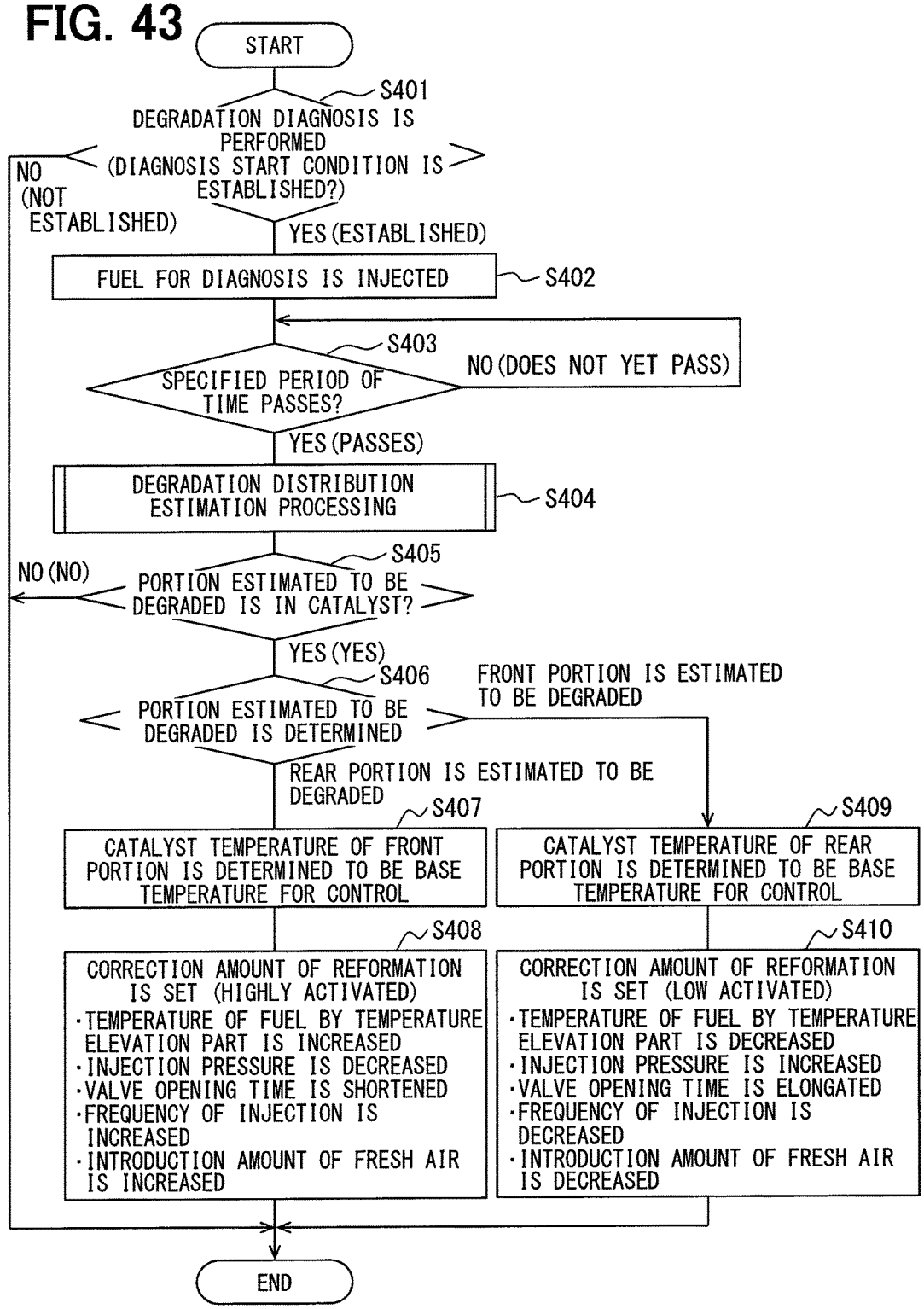
FIG. 43 is a flow chart to show a reformation control processing in detail.
Figure 44:
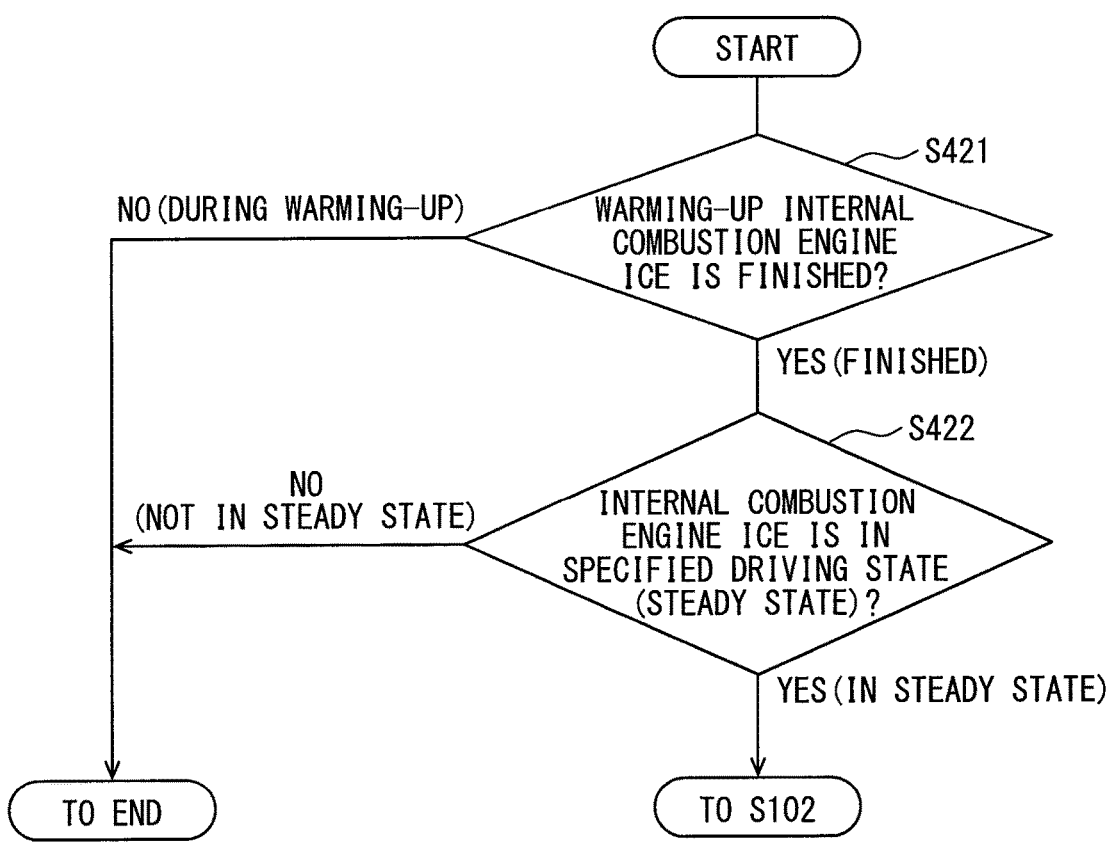
FIG. 44 is a flow chart to show a performance determination processing of a degradation diagnosis in detail.
Figure 45:
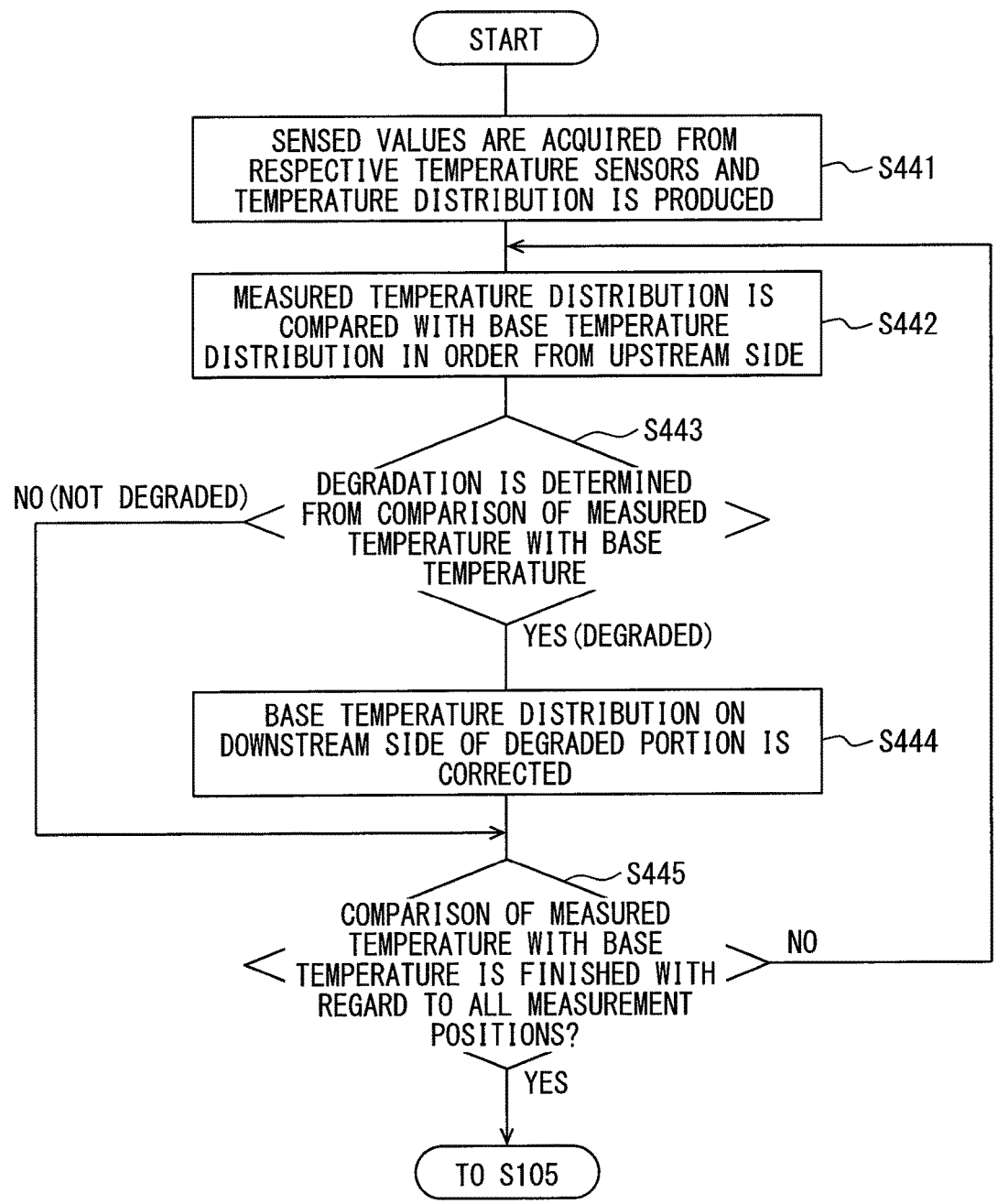
FIG. 45 is a flow chart to show a degradation distribution estimation processing in detail.

Next, each processing performed by the degradation estimation part 264 and the reduction control part 265 described above will be organized and will be described on the basis of flow charts shown in FIG. 43 to FIG. 45 with reference to FIG. 40 and FIG. 41. First, the reformation control processing will be described in detail on the basis of the flow chart shown in FIG. 43. The reformation control processing is started by the reduction control part 265 at a timing when a degradation diagnosis is required, for example, in the case where a specified period of time passes from the degradation diagnosis of the last time or in the case where an abnormal state of the internal combustion engine ICE is detected by the information acquisition part 262.

Here, the abnormal state of the internal combustion engine ICE means a state where an instantaneous degradation of the catalyst, for example, an abnormal temperature rise in the NOx catalyst 231 or an excessive drop in the oxygen concentration in the exhaust passage is liable to be caused. In the case where this abnormal state is caused, the reformation control processing is started so as to check whether or not the function of the NOx catalyst 231 is lost.

In S401 is performed performance determination processing of the degradation diagnosis (see FIG. 44), whereby it is determined whether or not the degradation diagnosis can be performed. In the case where it is determined by the performance determination processing in S401 that a diagnosis start condition is not established, the reformation control processing is finished. In contrast to this, in the case where it is determined in S401 that the diagnosis start condition is established, the procedure proceeds to S402. In S402, in order to diagnose the degree of degradation of the NOx catalyst 231, a specified amount of fuel is injected in a previously set pattern, and then the procedure proceeds to S403. In S402, the reducing agent used for diagnosis is supplied to the NOx catalyst 231. In this regard, a fuel injection pattern for diagnosis performed in S402 is made a fuel injection pattern that is actually equal to or correlated to a fuel injection pattern when the standard data of the base temperature distribution is produced.

It is determined in S403 whether or not a specified time passes from the time when the supply of the reducing agent is started in S402. The specified time in S403 is a period of time for waiting the reduction reaction in the NOx purification device 230 being stabilized and is set to a period of time of from, for example, several ten seconds to one minute. In the case where it is determined in S403 that the specified time passes and that the reduction reaction by the reducing agent for diagnosis is hence stabilized, the procedure proceeds to S404.

In S404, the degradation distribution estimation processing (see FIG. 45) is performed by the degradation estimation part 264, and then the procedure proceeds to S405. In S405, it is determined on the basis of the degradation distribution processing performed in S404 whether a catalyst portion estimated to be degraded is present or absent. In the case where it is determined in S405 that the portion estimated to be degraded is not in the NOx catalyst 231, the reformation control processing is finished. In contrast to this, in the case where it is determined in S405 that the portion estimated to be degraded is in the NOx catalyst 231, the procedure proceeds to S406.

It is determined in S406 whether the portion estimated to be degraded is in a rear portion of the NOx catalyst 231 or in a front portion of the NOx catalyst 231. In the case where it is determined in S406 that the rear portion of the NOx catalyst 231 is degraded (see a short broken line in FIG. 42), the procedure proceeds to S407. In this case, in order to make the front portion of the NOx catalyst 231, which is estimated to be not degraded or little degraded, positively function as the NOx catalyst, a control for optimizing a kind of the reducing agent after being reformed is started. For that purpose, in S407, a catalyst temperature used for referring to the reformation control map is set by the use of the sensed values of the respective catalyst temperature sensors 244a, 244b arranged in the front portion and in the middle portion of the NOx catalyst 231, and then the procedure proceeds to S408. The catalyst temperature may be an average value of the respective sensed values of the respective catalyst temperature sensors 244a, 244b or may be a value acquired by weighting the respective sensed values according to the degree of degradation in the front portion and in the middle portion.

In S408, a correction amount of the control for the fuel reformation device 220 and the like is set in such a way that the reducing agent is easily supplied from the fuel reformation device 220 in a state in which the reducing agent is reformed to hydrocarbon (for example, aldehyde or the like) highly activated in advance, and then the reformation control processing is finished. The setting of the correction amount in S408 is realized, for example, by changing the reformation control map to be referred to.

Figure 46:
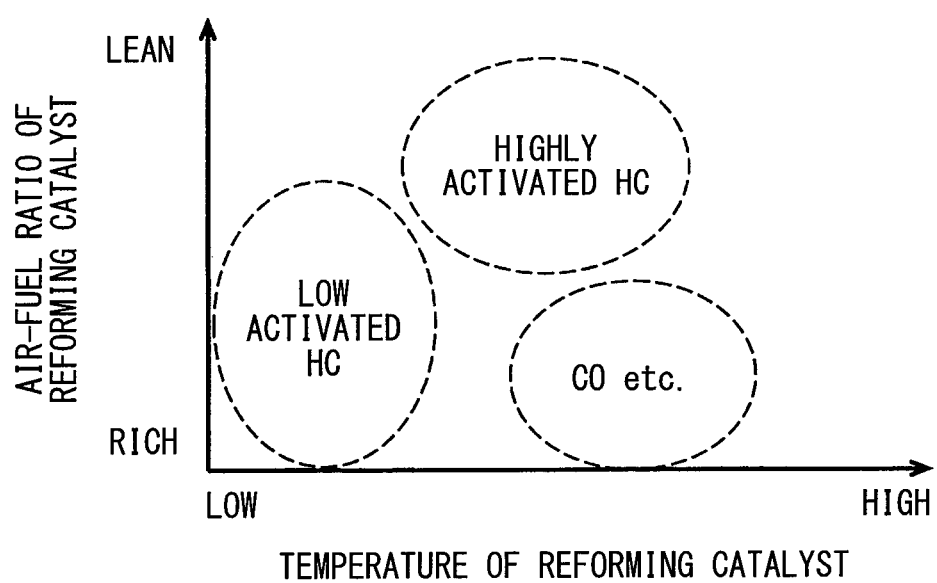
FIG. 46 is a graph to show a correlation between a temperature and an air-fuel ratio in a reforming catalyst and a reforming state of fuel.
Figure 47:
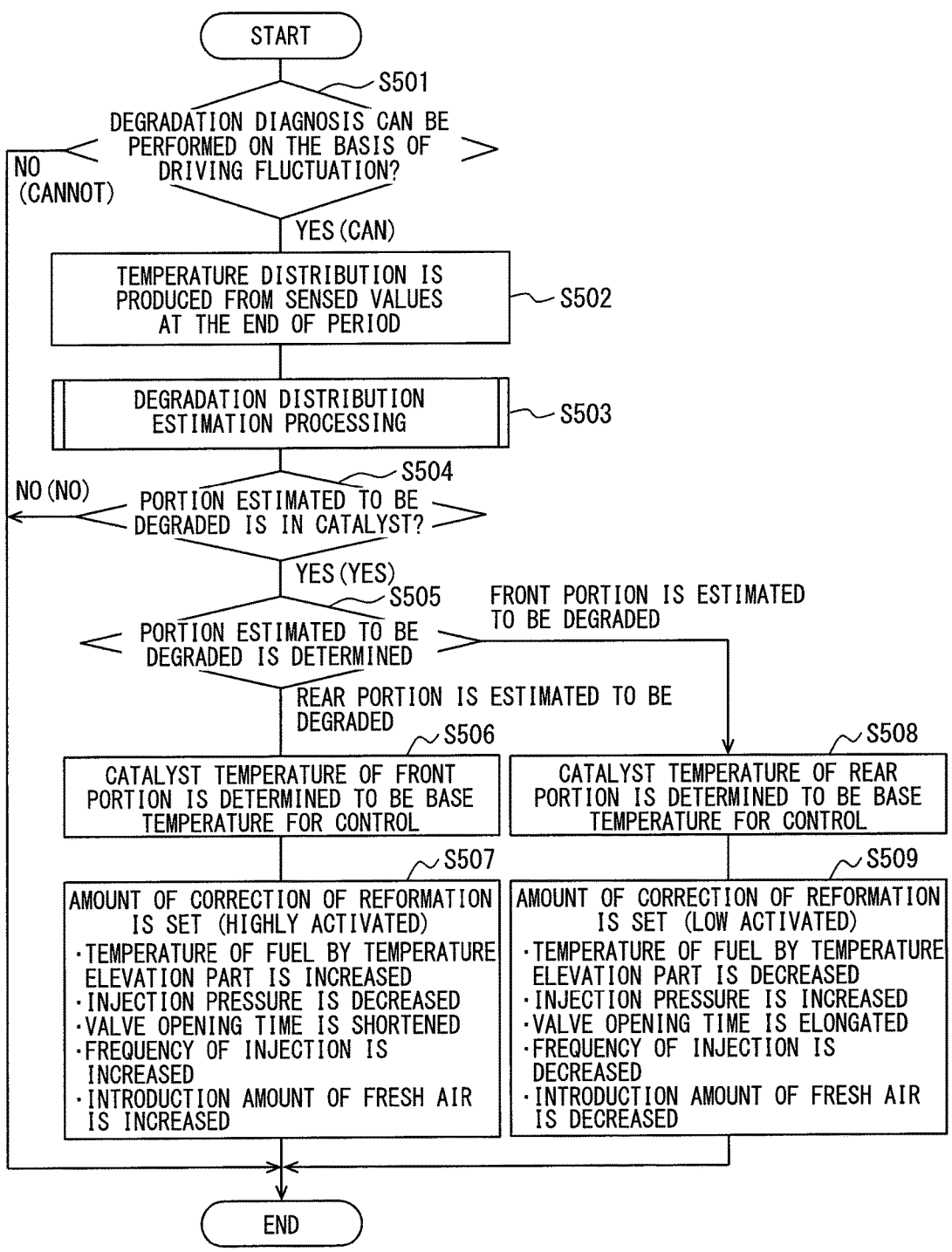
FIG. 47 is a flow chart to show a reformation control processing of a 24th embodiment in detail.
Figure 48:
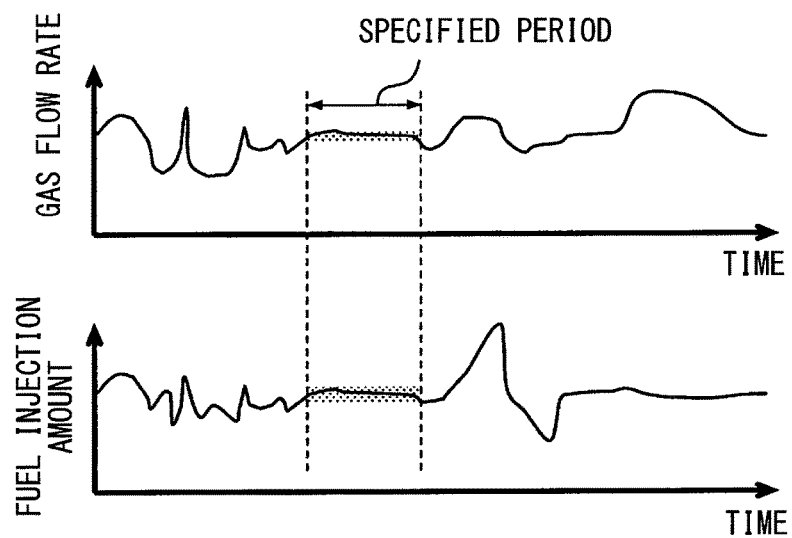
FIG. 48 is a graph to show a specific example of a steady state in which a degradation diagnosis is performed in the 24th embodiment.
Figure 49:
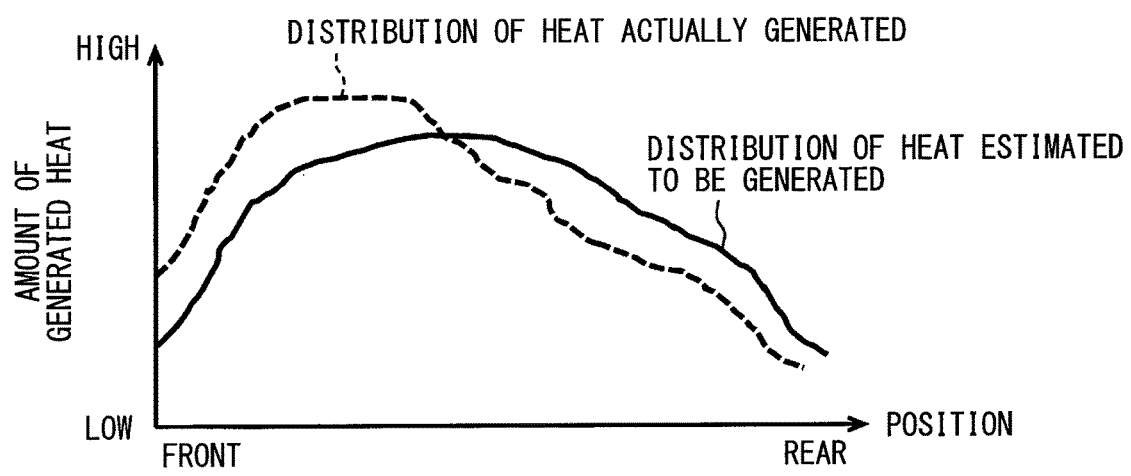
FIG. 49 is a graph to show a distribution of an amount of generated heat, which is actually measured in a NOx catalyst, and a distribution of an amount of generated heat, which is estimated.
Figure 50:
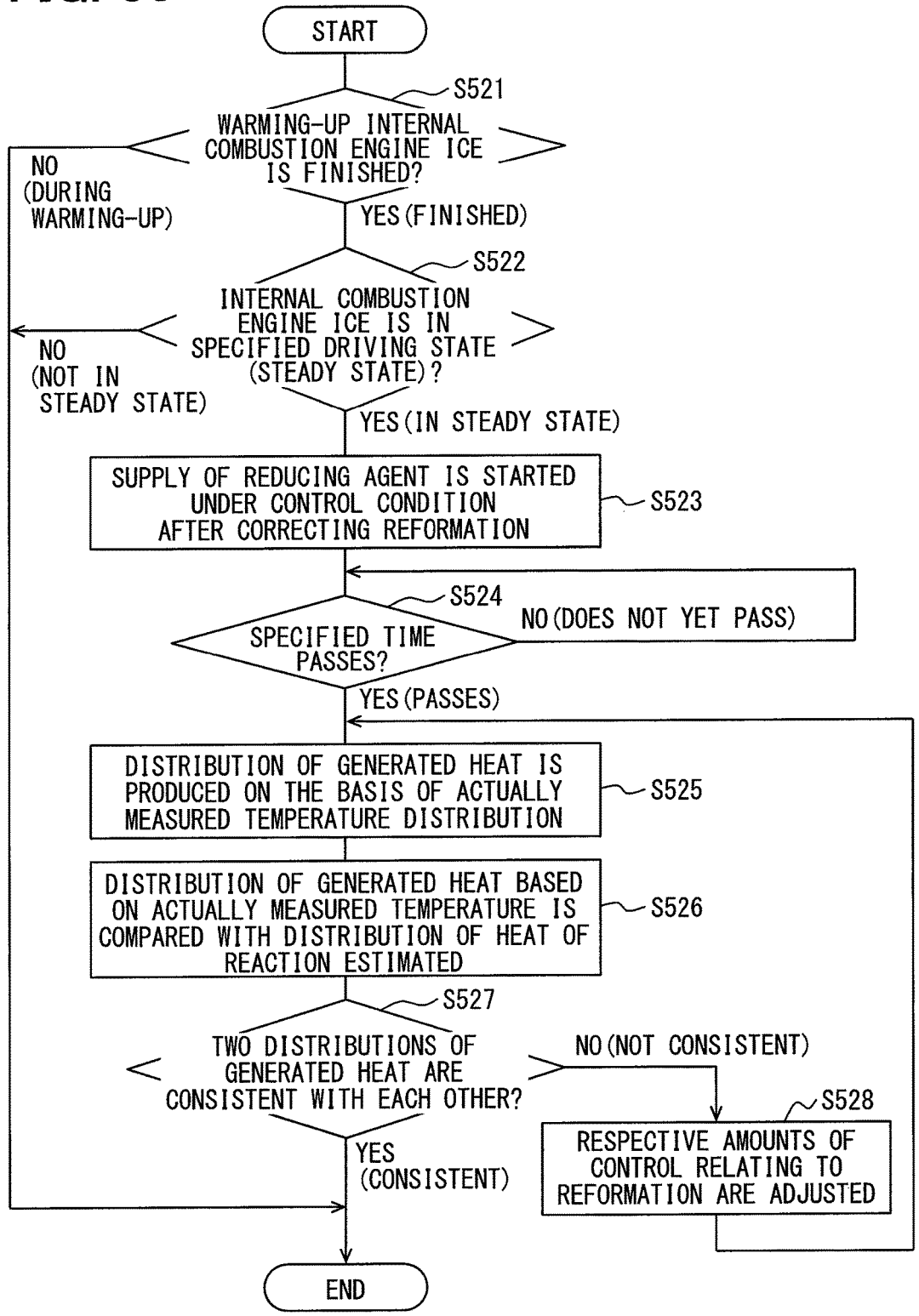
FIG. 50 is a flow chart to show a reformation adjustment processing in detail.

In S408, a control for elevating (increasing) the temperature of the fuel by the temperature elevation part 222 is performed in accordance with the property of the fuel (see FIG. 46) such that as the fuel is in a higher temperature, the fuel is easily reformed to a highly activated state. In addition, in S408, the amount of the fuel injected per unit time from the fuel injection valve 221 is adjusted to be small in accordance with the property of the fuel (see FIG. 46) such that as an air-fuel ratio is closer to a lean side, the fuel is easily reformed to a highly activated state. Specifically, an injection pressure of the fuel injection valve 221 is decreased by the control of the fuel pump 272 and a period of time during which the fuel injection valve 221 is opened is made shorter, whereby an injection amount of the fuel per one shot is made smaller. In addition, by controlling the frequency of the injection to a higher level, the supply amount of the fuel is secured. Further, in S408, the amount of the fresh air introduced by the control of the introduction control valve 283 is increased, whereby the air-fuel ratio near the reforming catalyst 223 is adjusted to the lean side.

In contrast to this, in the case where it is determined in S406 that the front portion of the NOx catalyst 231 is degraded (see a long broken line in FIG. 42), the procedure proceeds to S409. In this case, in order to make the rear portion of the NOx catalyst 231, which is estimated to be not degraded or little degraded, positively function as the NOx catalyst, the control for optimizing the kind of the reducing agent after being reformed is started. For that purpose, in S409, a catalyst temperature used for referring to the reformation control map is set by the use of the sensed values of the respective catalyst temperature sensors 244b, 244c arranged in the middle portion and in the rear portion of the NOx catalyst 231, and then the procedure proceeds to S410. The catalyst temperature may be an average value of the respective sensed values of the respective catalyst temperature sensors 244b, 244c or may be a value acquired by weighting the respective sensed values according to the degree of degradation in the middle portion and in the rear portion.

In S410, a correction amount of the control for the fuel reformation device 220 and the like is set in such a way that the fuel is supplied as it is in a low activity from the fuel reformation device 220, and then the reformation control processing is finished. The setting of the correction amount in S410 is realized, like S408, for example, by changing the reformation control map to be referred to.

In S410, a correction opposite to S408 is made. In other words, in S410, a control for lowering (decreasing) the temperature of the fuel by the temperature elevation part 222 is performed to thereby restrain a temperature rise in the fuel. Further, in S410, the amount of the fuel injected per unit time is adjusted to be a larger value. Specifically, the injection pressure of the fuel injection valve 221 is increased by the control of the fuel pump 272, and the amount of the fuel injected per one shot is increased by elongating a period of time during which the fuel injection valve 221 is opened. Further, in order to prevent an excessive fuel supply, the frequency of injection is adjusted to be low. Still further, the introduction amount of the fresh air is reduced by controlling the introduction control valve 283, whereby an air-fuel ratio near the reforming catalyst 223 is adjusted to a rich side.

In S408 and S410 described above, the reforming state of the reformed fuel that becomes a target is set. The reduction control part 265 performs a feedback control of the temperature elevation part 222 and the fuel injection valve 221 on the basis of the sensed values of the reducing agent sensor 245 in such a way that the state of the reducing agent acquired as the sensed value of the reducing agent sensor 245 comes closer to a reforming state which is set as a target. As the result of this control, in the case where the sensed value of the reducing agent sensor 245 does not gradually come closer to the reforming state which is set as the target, the reformation control part 265 diagnoses that degradation or abnormality is caused in the reforming catalyst 223.

Next, the performance determination processing of the degradation diagnosis performed in S401 of the reformation control processing will be described in detail on the basis of the flow chart shown in FIG. 44.

It is determined in S421 whether or not a warming-up operation of the internal combustion engine ICE is finished. In the case where it is determined in S421 that the internal combustion engine ICE is being warmed up, the performance determination processing and the reformation control processing are finished. In contrast to this, in the case where it is determined in S421 that the warming-up operation of the internal combustion engine ICE is finished, the procedure proceeds to S422.

In S422, it is determined by the steadiness determination part 263 whether or not the internal combustion engine ICE is in a specified driving state, that is, a steady state. In order to realize a degradation diagnosis of high accuracy, it is desired that the degradation diagnosis is performed in a state where a fluctuation in the driving state is small. In S422, in the case where it is determined from a transition of the gas flow rate of the exhaust gas and the fuel consumption that fluctuations in the gas flow rate and the fuel consumption are large and hence that the internal combustion engine ICE is not in the steady state (is in an abnormal state), the performance determination processing and the reformation control processing are finished. In contrast to this, in the case where it is determined in S422 that the internal combustion engine ICE is in the steady state, the performance determination processing is finished and the procedure proceeds to S402 of the reformation control processing.

Next, the degradation distribution estimation processing performed by the degradation estimation part 264 will be described in detail on the basis of S404 of the reformation control processing with reference to the flow chart shown in FIG. 45.

In S441, sensed values are acquired from the inlet temperature sensor 243 and the respective catalyst temperature sensors 244a to 244c. Then, a temperature distribution of the NOx catalyst 231 along the flow direction of the exhaust gas (see respective broken lines shown in FIG. 42) is made on the basis of the acquired sensed values of the respective temperature sensors 243, 244a to 244c, and then the procedure proceeds to S442. In S442, a base temperature distribution is calculated on the basis of the exhaust gas temperatures acquired in S441 (see solid line shown in FIG. 42). Then, the catalyst temperatures T01 to T03 at the respective positions in an actual temperature distribution made in S441 are individually compared with the temperatures T01B to T03B on the calculated base temperature distribution calculated in S442, and then the procedure proceeds to S443.

In S442 described above, the comparisons of the actually measured catalyst temperatures T01 to T03 with the calculated base temperatures T01B to T03B are made in order from the upstream side. In other words, in S442 of the first time, with regard to a measurement position of the catalyst temperature sensor 244a arranged on the most upstream side, the catalyst temperature T01 is compared with the base temperature T01B. In S442 of the second time, with regard to a measurement position of the catalyst temperature sensor 244b arranged in the middle portion, the catalyst temperature T02 is compared with the base temperature T02B. In S442 of the third time, with regard to a measurement position of the catalyst temperature sensor 244c arranged on the most downstream side, the catalyst temperature T03 is compared with the base temperature T03B.

In S443, it is determined on the basis of a comparison result in S442, in other words, from a temperature difference between the actually measured catalyst temperature and the calculated base temperature whether a portion of the catalyst in which the actually measured catalyst temperature is compared with the calculated base temperature is degraded or not. In the case where it is determined in S443 that the respective actually measured catalyst temperatures T01 to T03 are nearly equal to the respective base temperatures T00B to T03B, it is determined that the portion of the catalyst in which the actually measured catalyst temperature is compared with the calculated base temperature is not degraded or little degraded, and then the procedure proceeds to S445. In contrast to this, in the case where it is determined from the result of the comparison of the temperatures in S443 that the respective actually measured catalyst temperatures T01 to T03 are lower than the respective base temperatures T00B to T03B, it is determined that the portion of the catalyst in which the actually measured catalyst temperature is compared with the calculated base temperature is degraded, and then the procedure proceeds to S444.

In S444, on the basis of a determination such that the front portion of the NOx catalyst 231 is degraded, it is assumed that the reducing agent to cause a reaction in the middle portion or the rear portion of the NOx catalyst 231 is increased and the base temperature distribution is corrected (see a double dot and dash line in FIG. 422), and then the procedure proceeds to S445.

In S445, with regard to all measurement positions in which the respective catalyst temperature sensors 244a to 244c are arranged, it is determined whether or not the comparison of the actually measured catalyst temperature with the calculated base temperature is finished.

In the case where it is determined in S445 that there is the measurement position in which the comparison of the actually measured catalyst temperature with the calculated base temperature is not finished, the procedure returns to S442 where the actually measured catalyst temperature on the most upstream side among the remaining measurement positions is compared with the calculated base temperature. Then, in the case where the comparison of the actually measured catalyst temperature with the calculated base temperature is finished with regard to all measurement positions by the repetition of S442 to S444, the degradation distribution estimation processing is finished, and then the procedure proceeds to S405.

In the 23rd embodiment described so far, the reducing agent is generated by the reformation of the fuel by the fuel reformation device 220. Hence, a level of the activity can be controlled for the reducing agent supplied from the fuel reformation device 220. Further, the degradation estimation part 264 can produce the temperature distribution of the NOx catalyst 231 and can estimate the portion of the catalyst which is little degraded from the produced temperature distribution. When the fuel reformation device 220 is controlled in such a way that the reducing agent in an activated state reaches the portion of the catalyst which is little degraded, the portion of the catalyst which is little degraded can sufficiently exert an operation to purify NOx in the exhaust gas by preferentially using the reducing agent in the activated state. As the result, it is possible to realize the exhaust emission control system 500 that can restrain the performance of the NOx catalyst 231 from being reduced by the degradation of the NOx catalyst 231.

In addition, the degradation of the NOx catalyst 231 is expanded usually from the upstream side to the downstream side along the flow direction of the exhaust gas. Further, the reformed fuel is gradually activated even in the exhaust gas in the process in which the reformed fuel flows from the fuel reformation device 220 to the NOx catalyst 231. Hence, like the 23rd embodiment, when the activity of the reformed fuel supplied from the fuel reformation device 220 is adjusted to be reduced as a range in which the NOx catalyst 231 is degraded is expanded, the reformed fuel as the reducing agent can be brought into an active state suitable for reducing NOx at the time when the reformed fuel reaches the portion of the catalyst which is not degraded. Hence, the portion of the catalyst which is little degraded can exert the operation of purifying NOx in the exhaust gas.

Further, in the 23rd embodiment, the amount of the fuel injected per unit time from the fuel injection valve 221 is increased so as to reduce the activity of the reformed fuel. Still further, in the 23rd embodiment, the temperature of the fuel by the temperature elevation part 222 is lowered so as to reduce the activity of the reformed fuel. According to this control, the reformed fuel can be delayed in activation in the exhaust gas and can be brought into the active state suitable for reducing NOx at the time when the reformed fuel reaches the portion of the catalyst which is little degraded. Hence, the portion of the catalyst which is little degraded can purify NOx in the exhaust gas by the use of the reducing agent brought into the active state suitable for reducing NOx.

In addition, in the 23rd embodiment, the temperature distribution by the respective catalyst temperature sensors 244a to 244c is used as a degradation distribution to show a degree of progress in degradation. In the NOx catalyst 231, the reduction reaction is hard to be caused near the portion in which the degradation progresses and hence the catalyst temperature becomes low as compared with a state in which the NOx catalyst 231 is not yet degraded. For this reason, by sensing the temperatures at the plurality of positions of the NOx catalyst 231 and by comparing the sensed temperatures with the base temperature distribution based on the present temperature of the exhaust gas, a portion in which the degradation progresses in the NOx catalyst 231 can be easily and surely estimated.

Further, in the 23rd embodiment, when the previously set diagnosis condition is established, the supply of the reducing agent for diagnosis is started. According to this configuration, the degradation estimation part 264 can estimate the degree of degradation of the NOx catalyst 23 under a condition in which the driving state of the internal combustion engine ICE is stabilized. As the result, the reducing agent in which the reforming state is adjusted to be most suitable for the present degradation state of the NOx catalyst 231 reaches the NOx catalyst 231.

Still further, the reduction control part 265 of the 23rd embodiment determines the kind of hydrocarbon from the sensed value of the reducing agent sensor 245 and produces a target reforming state by performing the feedback control. Hence, the reduction control part 265 can correctly control a degree of activity of the reformed fuel discharged from the fuel reformation device 220. According to the configuration described above, the reducing agent in a state suitable for reducing NOx can reach the portion which is little degraded of the NOx catalyst 231. Further, the degradation diagnosis of the reforming catalyst 223 can be made on the basis of the sensed value of the reducing agent sensor 245.

Still further, in the 23rd embodiment, air can be introduced into the fuel reformation device 220 by the fresh air introduction device 281. According to this configuration, adjustment ranges of the air-fuel ratio and the temperature of the exhaust gas flowing into the fuel reformation device 220 can be expanded. As the result, the reduction control part 265 can more freely control the degree of activity of the reformed fuel emitted from the fuel reformation device 220.

Still further, in the 23rd embodiment, the air can be introduced into the fuel reformation device 220 by the fresh air introduction pipe 282 branched from a pipe on the downstream side of the intercooler 214. According to this configuration, even if a configuration for pressure-feeding the air of a pump or the like is not additionally provided, the air can be introduced into the intake passage of high pressure.

In this regard, in the 23rd embodiment, the internal combustion engine ICE corresponds to "an engine", the fuel reformation device 220 corresponds to "a fuel reformation device", the fuel injection valve 221 corresponds to "a fuel injection part", the temperature elevation part 222 corresponds to "a temperature elevation part", and the NOx catalyst 231 corresponds to "a catalyst". Further, the reducing agent sensor 245 corresponds to "a reducing agent sensing part", the ECU 250 corresponds to "a purification control device", the reduction control part 265 corresponds to "a reformation control part", and the fresh air introduction device 281 corresponds to "a fresh air introduction part".

24th Embodiment

A 24th embodiment shown in FIG. 47 to FIG. 50 is a modified example of the 23rd embodiment. In the reformation control processing according to the 24th embodiment, the degree of degradation of the NOx catalyst 231 is estimated in a period in which the internal combustion engine ICE is driven in the steady state. Hereinafter, the reformation control processing according to the 24th embodiment will be described in detail on the basis of a flow chart shown in FIG. 47 with reference to FIG. 40 and FIG. 41. This reformation control processing, like the 23rd embodiment, is started by the reduction control part 265 in the case where a specified time passes from the degradation diagnosis of the last time or in the case where an abnormal state of the internal combustion engine ICE is detected.

In S501, it is determined on the basis of a driving fluctuation in the internal combustion engine ICE whether or not a degradation diagnosis can be started. Specifically, in S501, the gas flow rate of the exhaust gas and the fuel injection amount are continuously monitored as the driving information to show the driving fluctuation in the internal combustion engine ICE by the steadiness determination part 263 for a specified monitoring time. Then, it is determined whether or not the fluctuations in the gas flow rate and the fuel injection amount fall within specified fluctuation ranges set as threshold values for a specified period set in advance (see a dotted range shown in FIG. 48). As the result, in the case where a state in which the respective fluctuations in the gas flow and the fuel injection amount fall within the respective threshold values continue for a period more than the specified period, it is determined that the degradation diagnosis can be started, and then the procedure proceeds to S502. In contrast to this, in the case where it is determined because the respective fluctuations in the gas flow and the fuel injection amount are large that the degradation diagnosis cannot be started, the reformation control processing is finished.

In S502, at the end of a period in which the internal combustion engine ICE keeps the steady state, a temperature distribution along the flow direction of the exhaust gas in the NOx catalyst 231 is produced by the use of the sensed values sensed by the inlet temperature sensor 243 and the respective temperature sensors 244a to 244c, and then the procedure proceeds to S503. Also in the 24th embodiment, the temperature distribution based on the sensed values sensed by the respective temperature sensors 243, 244a to 244c can be considered as the degradation distribution of the NOx catalyst 231.

In S503, like S404 of the 23rd embodiment (see FIG. 43), the degradation estimation part 264 is made to perform the degradation distribution estimation processing. The degradation estimation part 264 performs the actually same processing as S442 to S445 of the 23rd embodiment on the basis of this S503, thereby estimating a portion which is degraded of the NOx catalyst 231. Then, the reduction control part 265 performs the respective processing of S504 to S509 on the basis of the information of the portion which is estimated to be degraded by the degradation estimation part 264. The respective processing of S504 to S509 is actually same as S405 to S410 in the 23rd embodiment (see FIG. 43).

In the case where a correction of reformation set in S507 and S509 is made, the reduction control part 265 can adjust the reforming state of the fuel to a target reforming state by the feedback control using the catalyst temperatures sensed by the respective temperature sensors 244a to 244c. In order to realize this control, the reduction control part 265 estimates a distribution of generated heat which is generated by the reduction reaction in the NOx catalyst 231 (see a solid line shown in FIG. 49). The reduction control part 265 can produce the distribution of the generated heat by considering the heat of reaction of by-products (methane, ethylene, ethane, acetaldehyde, and the like) which are produced at the time of reforming the fuel. Hereinafter, a reformation adjustment processing for adjusting the reforming state of the fuel so as to realize the distribution of the generated heat, which is estimated by the reduction control part 265, will be described in detail on the basis of a flow chart shown in FIG. 50 with reference to FIG. 40 and FIG. 41.

In S521, it is determined whether or not a warming-up of operation of the internal combustion engine ICE is finished. In the case where it is determined in S521 that the warming-up operation of the internal combustion engine ICE is being performed, the reformation adjustment processing is finished. In contrast to this, in the case where it is determined in S521 that the warming-up operation of the internal combustion engine ICE is finished, the procedure proceeds to S522.

In S522, the steadiness determination part 263 is made to determine whether or not the internal combustion engine ICE is in a specified driving state, that is, in the steady state. In the case where it is determined in S522 that the internal combustion engine ICE is not in the steady state, the reformation adjustment processing is finished. In contrast to this, in the case where it is determined in S522 that the internal combustion engine ICE is in the steady state, the procedure proceeds to S523.

In S523, the supply of the reducing agent is started under the control conditions after the correction of reformation which is set by the reformation control processing, and then the procedure proceeds to S524. In S524, it is determined whether or not a previously specified time passes from the supply of the reducing agent is started in S523. The previously specified time in S523 is a period of time during which a reduction reaction is stabilized in the NOx purification device 230. In the case where it is determined in S524 that the previously specified time passes and hence where the reduction reaction by the reducing agent fed after the correction of reformation is stabilized, the procedure proceeds to S525.

In S525, the distribution of generated heat (see a solid line shown in FIG. 49) generated by the reaction of the reducing agent at the respective positions of the NOx catalyst 231 is produced on the basis of the temperature distribution of the NOx catalyst 231, and then the procedure proceeds to S526.

In S526, the distribution of generated heat, which is produced in S525 on the basis of the actually measured temperatures, is compared with the distribution of generated heat (see a broken line shown in FIG. 49), which is estimated by the reduction control part 265, and then the procedure proceeds to S527.

In S527, it is determined whether or not two distributions of generated heat which are compared with each other in S526 are consistent with each other. In the case where it is determined in S527 that the distribution of generated heat which is based on the actually measured temperatures is consistent with the distribution of generated heat which is estimated, the reformation adjustment processing is finished without performing a reformation adjustment. In contrast to this, in the case where it is determined in S527 that the distribution of generated heat which is based on the actually measured temperatures deviates from the distribution of generated heat which is estimated, the procedure proceeds to S528.

In S528, the amounts of control of the respective configurations relating to the reformation, specifically, the fuel injection valve 221, the temperature elevation part 222, the fuel pump 272, and the introduction control valve 283 are adjusted in such a way that the distribution of generated heat which is based on the actually measured temperatures comes close to the distribution of generated heat which is estimated, and then the procedure returns to S525. Then, the processing in S525 to S528 is repeatedly performed until the distribution of generated heat which is based on the actually measured temperatures is consistent with the distribution of generated heat which is estimated.

Also in the 24th embodiment described so far, like the 23rd embodiment, the catalyst portion which is little degraded can sufficiently perform the operation of purifying NOx in the exhaust gas, so that it is possible to restrain the performance of the NOx catalyst 231 from being reduced by the NOx catalyst 231 being degraded.

In addition, in the case where it is determined by the steadiness determination part 263 that the internal combustion engine ICE is in the steady state, the degradation estimation part 264 of the 24th embodiment can estimate the degree of degradation of the NOx catalyst 231. According to the configuration described so far, the supply of the fuel only for diagnosis by a specified fuel injection pattern is not necessary. In addition, the degradation estimation part 264 can complete the estimation of the degree of degradation of the NOx catalyst 231 while the internal combustion engine ICE is usually driven.

Further, in the case where the reduction control part 265 of the 24th embodiment corrects the reforming state of the fuel, the reduction control part 265 of the 24th embodiment can adjust the reforming state of the fuel to the target reforming state by the feedback control using the sensed values of the respective temperature sensors 244a to 244c. Hence, the reducing agent which has the reforming state adjusted most suitably in such a way as to meet the present degree of degradation reaches the NOx catalyst 231.

In addition, in the 24th embodiment, the heat of reaction caused by the by-products is added to the distribution of generated heat that is made the target in the feedback control. When the reforming state of the fuel is adjusted in such a way as to be consistent with the distribution of generated heat like this, the portion of the catalyst which is little degraded can surely perform the operation of purifying NOx.

In the embodiment described above, the degraded portion is estimated by comparing the actually measured catalyst temperatures T01 to T03 with the base temperatures T01B to T03B, but the threshold value for determining degradation, in other words, a temperature difference ΔT between the actually measured catalyst temperature and the base temperature can be changed as appropriate. The temperature difference ΔT may be, for example, zero. Further, the temperature difference ΔT may be set to a constant value over the whole of the NOx catalyst or may be set in such a way as to be gradually increased or decreased from the front portion to the rear portion.

In the embodiment described above, the continuous linear temperature distribution is specified as the degradation distribution on the basis of the sensed values of the respective catalyst temperature sensors 244a to 244c. However, a mode of degradation distribution is not limited to the mode described above. For example, a data table in which the measurement position of the catalyst temperature is simply linked to the actually measured catalyst temperature may be the degradation distribution.

In the embodiment described above, the respective catalyst temperature sensors 244a to 244c measure the catalyst temperatures as physical quantities relating to the degradation of the NOx catalyst 231. However, the physical quantity relating to the degradation of the NOx catalyst 231 is not limited to the catalyst temperature. For example, the information of the oxygen concentration, the NOx concentration, the state of hydrocarbon, and the like in the catalyst can correspond to the physical quantities relating to degradation. Then, as configurations of sensing these physical quantities, a plurality of $O_2$ sensor, NOx sensor, and HC sensor can be provided as degradation sensing parts in the NOx purification device.

Further, the number and the arrangement of the degradation sensing parts such as the catalyst temperature sensor may be changed as appropriate. For example, the NOx purification device may have only two degradation sensing parts provided therein or may have four or more degradation sensing parts provided therein. Still further, the plurality of degradation sensing parts may be arranged at equal intervals or at unequal intervals along the flow direction of the exhaust gas. In addition, the plurality of degradation sensing parts may be arranged on a linear line along the flow direction of the exhaust gas, or a part of the degradation sensing parts may be offset with respect to the other part of the degradation sensing parts.

The steadiness determination part 263 of the embodiment acquires the transition of the gas flow rate of the exhaust gas and in the fuel injection amount as the driving information used for determining the steady state of the internal combustion engine ICE. However, the driving information used for determining the steady state can be changed as appropriate. For example, a revolution speed of an output shaft and an intake flow rate of the internal combustion engine ICE may be used for the determination of the steady state. Further, in the case where all fluctuations in the plurality of driving information fall within the threshold value, the steadiness determination part may determine that the internal combustion engine ICE is in the steady state. Alternatively, in the case where fluctuations in the specified driving information fall within the threshold value, the steadiness determination part may determine that the internal combustion engine ICE is in the steady state.

The reduction control part 265 of the embodiment described above adjusts the level of activity in the reformed fuel by a comprehensive control of the temperature of the reformed fuel and the air-fuel ratio. However, the reduction control part may be able to control only the temperature of the reformed fuel or only the air-fuel ratio. Further, like the 24th embodiment described above, if a configuration of feedback controlling the reforming state by the use of the distribution of generated heat of the NOx catalyst is employed, a configuration corresponding to the reducing agent sensor 245 (see FIG. 40) may be omitted.

In the embodiment described above, the air whose pressure is increased by the compressor part of the supercharger 211 is supplied to the reforming catalyst. However, air which is pressure-fed by an electric pump may be supplied to the reforming catalyst against pressure in the exhaust pipe. According to this configuration, the ECU can increase or decrease an amount of air supplied to the reforming catalyst by controlling a discharge amount of the electric pump. Further, a configuration to introduce air into the reforming catalyst may be omitted.

In the embodiment described above, the function supplied by the processor 251 and the like of the ECU 250 can be supplied by hardware and software, which are different from the parts described above, or by a combination of the hardware and the software. For example, a control circuit, which is provided separately from the ECU 250 for comprehensively controlling the driving of the internal combustion engine ICE and is dedicated for the after-treatment, may perform a part or all of the reformation control processing, the degradation distribution estimation processing, and the reformation adjustment processing as "a purification control device". Further, various kinds of non-transitive substantial storage media such as a flash memory and a hard disk can be employed as the storage medium 253 for storing the programs executed by the processor 251 and the respective control maps.

In the embodiments described above have been described examples in which the special configuration of the present disclosure is applied to the exhaust emission control system for purifying the exhaust gas emitted from the internal combustion engine mounted in the vehicle. However, the configuration of the present disclosure can be applied to an exhaust emission control system for purifying an exhaust gas of not only the internal combustion engine mounted in the vehicle but also an internal combustion engine or an external combustion engine mounted in a ship, a railway vehicle, or an airplane. Further, the configuration of the present disclosure can be applied to an exhaust emission control system for purifying an exhaust gas of an internal combustion engine or an external combustion engine provided for power generation.

What is claimed is:

1. An exhaust emission control system comprising:
   a fuel reformation device that generates a reducing agent to reduce nitrogen oxide contained in an exhaust gas emitted from an engine by reforming fuel used for the engine;
   a catalyst that purifies the nitrogen oxide in the exhaust gas by the use of the reducing agent supplied by the fuel reformation device;
   a plurality of degradation sensing parts that are arranged in the catalyst along a flow direction of the exhaust gas and that sense a physical quantity relating to degradation of the catalyst;
   a degradation estimation part that produces a degradation distribution of the catalyst in the flow direction on the basis of sensed values of the plurality of degradation sensing parts and that estimates a portion which is less degraded of the catalyst from the degradation distribution; and
   a reformation control part that controls reformation of the fuel by the fuel reformation device to have the reducing agent to reach the portion of the catalyst, which is estimated to be less degraded by the degradation estimation part, in an active state,
   wherein the reformation control part controls the reformation of the fuel to control, as a portion, in which degradation progresses, of the catalyst expands to a downstream side along the flow direction, activity of the reducing agent supplied from the fuel reformation device to be reduced.

2. The exhaust emission control system according to claim 1,
   wherein the fuel reformation device has a fuel injection part that injects the fuel, and
   wherein the reformation control part reduces the activity of the reducing agent by a control to increase a fuel amount injected per unit time from the fuel injection part.

3. The exhaust emission control system according to claim 1,
   wherein the fuel reformation device has a temperature elevation part that elevates a temperature of the fuel, and
   wherein the reformation control part reduces the activity of the reducing agent by a control to decrease the temperature of the fuel by the temperature elevation part.

4. The exhaust emission control system according to claim 1,
   wherein the plurality of degradation sensing parts sense temperatures of a plurality of portions of the catalyst, respectively, and
   wherein the degradation estimation part compares catalyst temperatures sensed by the respective degradation sensing parts with base temperatures indicated by the catalyst which is not yet degraded and estimates a portion in which the sensed catalyst temperature is low as a portion in which degradation progresses.

5. The exhaust emission control system according to claim 4,
   wherein in the case where the reformation control part corrects a reforming state of the fuel in accordance with a degree of degradation of the catalyst which is estimated by the degradation estimation part, the reformation control part adjusts the reforming state of the fuel supplied to the catalyst by the use of the catalyst temperatures sensed by the respective degradation sensing parts.

6. The exhaust emission control system according to claim 1,
   wherein in the case where a previously set diagnosis start condition is established, the reformation control part makes the fuel reformation device start a supply of the reducing agent so as to estimate degradation of the catalyst.

7. The exhaust emission control system according to claim 1, further comprising:
   an information acquisition part that acquires driving information to indicate a driving state of the engine in time series; and
   a steadiness determination part that determines whether or not the engine is in a steady state on the basis of a transition of the driving information acquired by the information acquisition part,
   wherein in the case where the steadiness determination part determines that the engine is in the steady state, the degradation estimation part starts to estimate degradation of the catalyst.

8. The exhaust emission control system according to claim 1, further comprising:
   a fresh air introduction part that introduces air into the fuel reformation device, wherein the reformation control part controls an introduction of the air by the fresh air introduction part in such a way that the reducing agent in an active state reaches a portion which is less degraded of the catalyst.

9. An exhaust emission control system comprising:
a fuel reformation device that generates a reducing agent to reduce nitrogen oxide contained in an exhaust gas emitted from an engine by reforming fuel used for the engine;
a catalyst that purifies the nitrogen oxide in the exhaust gas by the use of the reducing agent supplied by the fuel reformation device;
a plurality of degradation sensing parts that are arranged in the catalyst along a flow direction of the exhaust gas and that sense a physical quantity relating to degradation of the catalyst;
a degradation estimation part that produces a degradation distribution of the catalyst in the flow direction on the basis of sensed values of the plurality of degradation sensing parts and that estimates a portion which is less degraded of the catalyst from the degradation distribution; and
a reformation control part that controls reformation of the fuel by the fuel reformation device to have the reducing agent to reach the portion of the catalyst, which is estimated to be less degraded by the degradation estimation part, in an active state;
wherein when the degradation estimation part estimates that a portion on a downstream side in the flow direction of the catalyst degrades, the reformation control part controls the reformation of the fuel to increase the activity of the reducing agent supplied from the fuel reformation device.

10. The exhaust emission control system according to claim 9,
wherein the fuel reformation device has a fuel injection part that injects the fuel, and
wherein the reformation control part increases the activity of the reducing agent by a control to decrease a fuel amount injected per unit time from the fuel injection part.

11. The exhaust emission control system according to claim 9,
wherein the fuel reformation device has a temperature elevation part that elevates a temperature of the fuel, and
wherein the reformation control part increases the activity of the reducing agent by a control to increase the temperature of the fuel by the temperature elevation part.

12. An exhaust emission control system comprising:
a fuel reformation device that generates a reducing agent to reduce nitrogen oxide contained in an exhaust gas emitted from an engine by reforming fuel used for the engine;
a catalyst that purifies the nitrogen oxide in the exhaust gas by the use of the reducing agent supplied by the fuel reformation device;
a plurality of degradation sensing parts that are arranged in the catalyst along a flow direction of the exhaust gas and that sense a physical quantity relating to degradation of the catalyst;
a degradation estimation part that produces a degradation distribution of the catalyst in the flow direction on the basis of sensed values of the plurality of degradation sensing parts and that estimates a portion which is less degraded of the catalyst from the degradation distribution;
a reformation control part that controls reformation of the fuel by the fuel reformation device to have the reducing agent to reach the portion of the catalyst, which is estimated to be less degraded by the degradation estimation part, in an active state; and
a reducing agent sensing part that is positioned between the fuel reformation device and the catalyst and that senses a state of the reducing agent supplied from the fuel reformation device,
wherein the reformation control part corrects a degree of activity of the reducing agent supplied from the fuel reformation device on the basis of a sensing result of the reducing agent sensing part to have the reducing agent in an active state to reach a portion which is less degraded of the catalyst.

* * * * *